US010239797B2

(12) United States Patent
Varadachari

(10) Patent No.: US 10,239,797 B2
(45) Date of Patent: Mar. 26, 2019

(54) MICRONUTRIENT FERTILIZERS AND METHODS OF MAKING AND USING THE SAME

(71) Applicant: Agtec Innovations, Inc., Los Altos, CA (US)

(72) Inventor: Chandrika Varadachari, Kolkata (IN)

(73) Assignee: AGTEC INNOVATIONS, INC., Los Altos, CA (US)

(*) Notice: Subject to any disclaimer, the term of this patent is extended or adjusted under 35 U.S.C. 154(b) by 0 days.

(21) Appl. No.: 14/920,957

(22) Filed: Oct. 23, 2015

(65) Prior Publication Data
US 2016/0272549 A1 Sep. 22, 2016

Related U.S. Application Data

(63) Continuation of application No. 12/727,561, filed on Mar. 19, 2010, now Pat. No. 9,181,137.

(60) Provisional application No. 61/266,729, filed on Dec. 4, 2009, provisional application No. 61/161,816, filed on Mar. 20, 2009.

(51) Int. Cl.
C05B 17/00 (2006.01)
C05B 13/04 (2006.01)
C05D 9/02 (2006.01)
C05B 17/02 (2006.01)

(52) U.S. Cl.
CPC .............. C05B 17/00 (2013.01); C05B 13/04 (2013.01); C05B 17/02 (2013.01); C05D 9/02 (2013.01)

(58) Field of Classification Search
CPC ............ C05B 11/10; C05B 13/04; C05D 9/02
See application file for complete search history.

(56) References Cited

U.S. PATENT DOCUMENTS

| 2,370,472 A | 2/1945 | King |
| 2,713,536 A | 1/1955 | Driskell |
| 3,201,222 A | 8/1965 | Wilson |
| 3,208,821 A | 9/1965 | Lehr et al. |

(Continued)

FOREIGN PATENT DOCUMENTS

| EP | 2393381 | 12/2011 |
| GB | 800417 | 8/1958 |

(Continued)

OTHER PUBLICATIONS

Vardachari et al. "Novel Slow-Releasing Micronutrient Fertilizers. 1.Zinc Compounds", ind. Eng. Chem.Res. 1993, 32, 1218-1227.*

(Continued)

Primary Examiner — Amber R Orlando
Assistant Examiner — Syed T Iqbal
(74) Attorney, Agent, or Firm — Bryan Cave Leighton Paisner LLP

(57) ABSTRACT

A water insoluble micronutrient fertilizer, methods of producing, and methods of using the same are provided. The fertilizer may comprise at least one first micronutrient selected from the group consisting of chromium, cobalt, copper, iron, manganese, and zinc; a polyphosphate; and optionally at least one second micronutrient selected from the group consisting of boron, chlorine, iodine, molybdenum or selenium. The fertilizer compounds are preferably water insoluble, dilute acid soluble, and free-flowing powders.

25 Claims, 22 Drawing Sheets

(56) References Cited

U.S. PATENT DOCUMENTS

| | | | |
|---|---|---|---|
| 3,244,500 | A | 4/1966 | Stinson et al. |
| 3,453,074 | A | 7/1969 | Mustian et al. |
| 3,533,737 | A | 10/1970 | Farr et al. |
| 3,574,591 | A | 4/1971 | Lyons et al. |
| 3,656,931 | A | 4/1972 | Dancy |
| 3,762,909 | A | 10/1973 | Davie et al. |
| 3,856,500 | A | 12/1974 | Cox |
| 3,917,475 | A * | 11/1975 | Moore ............... C05B 1/06 71/34 |
| 3,956,464 | A | 5/1976 | Dreschel et al. |
| 4,321,078 | A | 3/1982 | Michaud |
| 4,585,751 | A | 4/1986 | Kukes et al. |
| 5,433,766 | A | 7/1995 | Ming et al. |
| 5,749,935 | A | 5/1998 | Takahara et al. |
| 6,322,607 | B1 | 11/2001 | Brown et al. |
| 6,575,155 | B2 | 6/2003 | Brennan |
| 7,497,891 | B2 | 3/2009 | Peacock |
| 7,670,405 | B2 | 3/2010 | Varadachari |
| 7,691,171 | B2 | 4/2010 | Varadachari |
| 8,506,670 | B2 | 8/2013 | Varadachari |
| 2006/0196240 | A1 | 9/2006 | Varadachari |
| 2006/0260372 | A1 | 11/2006 | Liu et al. |
| 2007/0062232 | A1 | 3/2007 | Urano et al. |
| 2007/0062233 | A1 * | 3/2007 | Burnham ............ C02F 11/14 71/11 |
| 2007/0095119 | A1 | 5/2007 | Varadachari |
| 2008/0236033 | A1 | 10/2008 | Sun et al. |

FOREIGN PATENT DOCUMENTS

| | | |
|---|---|---|
| IN | 172800 | 12/1993 |
| IN | 175597 | 7/1995 |
| IN | 177205 | 12/1996 |
| IN | 194747 | 7/2009 |
| SU | 1270148 | 11/1986 |
| WO | 8100010 | 1/1981 |
| WO | 9426660 | 11/1994 |
| WO | 2005014505 | 2/2005 |
| WO | 2005014506 | 2/2005 |
| WO | 2006137084 | 12/2006 |
| WO | WO 2006137084 A2 * | 12/2006 ............ C05B 13/04 |
| WO | 2007095393 | 8/2007 |
| WO | 2008069676 | 6/2008 |
| WO | 2008083390 | 7/2008 |
| WO | 2008131535 | 11/2008 |
| WO | 2010089766 | 8/2010 |

OTHER PUBLICATIONS

Ray et al. "Novel Slow-Releasing Micronutrient Fertilizers. 1. Zinc Compounds" 1993, Ind. Eng. Chem. Res, 32, 1218-1227.*

Varadachari et al., Bio-Release Multinutrient Fertilizers for High-Altitude Agriculture; Mountain Research & Development (Switzerland), 2009, 29(3): 241-249 Jan. 1, 2009.

Varadachari, Phosphoric Acids, Phosphates and Fertilizers for the Future, Indian Nat. Sci. Academy Proceedings (Part B), 1992, 58: 119-126 Jan. 1, 1992.

Varadachari, Novel Slow-Releasing Micronutrient Fertilizers, Fertilizer News, 1992, 37: 49-53 Jan. 1, 1992.

Varadachari et al., Polyphosphates: The Future of Fertilizer Development, Everyman's Science, 1993, 28: 64-66 Jan. 1, 1993.

Roberts, G.J., FeO—K2O—P2O5 Glasses as a Source of Micronutrient Iron in Soil, Amer. Ceramic Society Bulletin, 1975, 54: 1069 Jan. 1, 1975.

Database WPI Week and SU 833927 A1, May 30, 1981 abstract, Thomson Scientific, London, Great Britian May 30, 1981.

Patent Cooperation Treaty, International Search Report for PCT/IN2010/000062, dated Jun. 24, 2010, 6 pages Jun. 24, 2010.

Bandyopadhyay et al., A New Slow-Releasing Molybdenum Fertilizer, Journal of Agricultural & Food Chemistry, 2008, 56: 1343-1349 Jan. 1, 2008.

Bhattacharya et al., Development of a Novel Slow-Releasing Iron-Manganese Fertilizer Compound, Ind. Eng. Chem. Res., 2007, 46: 2870-2876 Jan. 1, 2007.

Chandra et al., A New Slow-Releasing Iron Fertilizer, Chemical Eng. Journal, 2009, 155: 451-456 Jan. 1, 2009.

Mortvedt et al., Macronutrients in Agriculture, Soil Science Society of America, 1972, 356-365 Jan. 1, 1972.

Ray et al., Novel Slow-Releasing Micronutrient Fertilizers 2, Journal of Agriculture & Food Chemistry, 1997, 1447-1453 Jan. 1, 1997.

Ray et al., Novel Slow-Releasing Micronutrient Fertilizers, American Chemical Society, 1993, 32: 1218-1227 Jan. 1, 1993.

Ray et al., Removing Micronutrient Metal Cation Interferences Prior to Titrimetric Determination of Polyphosphate Chain Length, Journal of Agriculture & Food Chemistry, 1998, 46: 2222-2226 Jan. 1, 1998.

Roberts, G.J., Preparation and Properties of Glasses in the System FeO—K2O—P2O5, Amer. Ceramic Society Bulletin, 1973, 52: 383 Jan. 1, 1973.

Volfkovich, S. I. Polymeric Fertilizers, J. Appl. Chem. (USSR) 1972, 45.2479-2487 Jan. 1, 1972.

Varadachari et al., Phosphoric Acid Polymerization and its Role in Fertilizer Development, Indian Fertilizer Scene Annual, 1992, 125-126 Jan. 1, 1992.

Patent Cooperation Treaty, International Search Report issued for PCT/IN2004/000234, 3 pages Dec. 16, 2004.

Patent Cooperation Treaty, International Search Report issued for PCT/IN2004/000235, 3 pages Jan. 31, 2005.

Patent Cooperation Treaty, International Search Report issued for PCT/IN2004/000210, 2 pages Dec. 21, 2006.

* cited by examiner

MICRONUTRIENT FERTILIZERS AND METHODS OF MAKING AND USING THE SAME

CROSS REFERENCE TO RELATED APPLICATIONS

This application claims the benefit, and priority, of U.S. Patent Application Ser. No. 61/161,816 filed Mar. 20, 2009 and U.S. Patent Application Ser. No. 61/266,729, filed Dec. 4, 2009, the contents of each of which is incorporated by reference in its entirety.

FIELD OF THE INVENTION

The present inventions generally relate to fertilizers, and in particular to water insoluble slow-release micronutrient fertilizers, produced by incomplete polymerization of metal orthophosphate.

BACKGROUND OF THE INVENTION

Micronutrients are generally thought to be essential building blocks for plants and animals. Such micronutrients may include boron, chlorine, chromium, cobalt, copper, iodine, iron, manganese, molybdenum, selenium, and zinc. Micronutrient plant fertilization, alone or in combination with nitrogen, phosphorus, and potash fertilization, generally results in better crop yields and more nutritious food.

Prior micronutrient fertilizers include sulfate salts of the micronutrients, such as zinc sulfate, ferrous sulfate, manganese sulfate and cuprous sulfate or chelates such as zinc EDTA, iron EDTA and copper EDTA. These water-soluble compounds, however, can be leached out of the soil and contaminate water bodies. Other water soluble micronutrient fertilizers have been impregnated with an organic polymer membrane. The nutrients may be released into a solution by diffusion. Still further micronutrient fertilizers have been produced having relatively low micronutrients.

Iron and manganese fertilizers are widely used in many parts of the world particularly in soils of high pH, such as the black soils. They are also widely used in horticultural and cash crops to improve yields and quality of produce. The compounds most popularly used for correcting deficiencies of iron and manganese in crops are ferrous sulphate and manganous sulphate (J. J. Mortvedt, P. M. Giordano & W. L. Lindsay, 1972, Micronutrients in Agriculture, Soil Sci. Soc. Am., Madison). Chelated forms of these micronutrients, e.g., iron-EDTA, and manganese—EDTA compounds are also in use as liquid sprays (V. Saucheli, 1967, Chemistry and technology of fertilizers, Reinhold, N.Y.; G. H. Collins, 1955, Commercial fertilizers, Mc-Graw Hill, N.Y.).

There are, however, several drawbacks in the use of such soluble compounds as fertilizers, e.g., leaching losses, chemical transformation losses, ground water contamination, etc. This results in excess dosages which are often several times the actual crop uptake, leading to poor fertilize-use efficiency. Moreover, such wastages also affect the economics, thereby discouraging their widespread usage.

In an attempt to overcome these shortcomings, slow-release fertilizers incorporating micronutrients have been prepared. One such type is the fertilizer based on phosphate glasses known as frits. Frits are prepared by fusing sodium, potassium or ammonium dihydrogen phosphates together with micronutrient salts at temperatures between 800° and 1400° C. and then rapidly quenching the melt to produce a glass (G. J. Roberts 1973, Am. Ceram. Soc. Bull. Vol 52, p 383; ibid, idem, Vol 54, p 1069; Austrian Patent No 326160 of 1975; U.S. Pat. No. 3,574,591 of 1971; U.S. Pat. No. 2,713,536 of 1974).

The major disadvantage of the phosphate glass frits is that the availability of the nutrients is by slow hydrolysis of the glass and is highly dependent on the soil (pH, moisture content, temperature, etc.,) and on the crop (rate of growth, physiological factors, variety, etc). Consequently, where nutrient release by hydrolysis does not match plant uptake, the fertilizer is not effective. Moreover, the high temperatures involved in the synthesis of frits together with the corrosive conditions make these materials fairly expensive and unsuitable for general use.

Another type of phosphate based water insoluble fertilizer is the metaphosphate. Metaphosphates of calcium and potassium together with micronutrients have been proposed (S I Volfkovich, 1972, J Appl. Chem. (USSR) Vol 45, p 2479). A Russian patent (SU 1270148 of 1986) describes the production of mixed metaphosphates based fertilizers produced at 500-880° C. Drawbacks in the use of metaphosphates as fertilizers are similar to those with the frits. Metaphosphates may be more insoluble and hydrolyse even slower, producing compounds with very poor nutrient availability. Metaphosphates of the heavy metals are extremely insoluble and of little use as fertilizers.

An additional type of slow-release fertilizer has been produced in which the micronutrient ions are in a chemical form wherein they are insoluble but also plant available. These belong to the bio-release types of slow-release fertilizers. The processes for producing such phosphate based zinc and copper fertilizers are described in two Indian patents (Nos 172800 of 1990 and 177205 of 1991). The chemistry of zinc and copper phosphate polymerisation and the chemical nature of these fertilizers have also been described (S K Ray, C Varadachari & K Ghosh, 1993, Ind. Eng. Chem. Res. Vol. 32, p. 1218; S K Ray, C Varadachari & K Ghosh, 1997, J. Agric. Food Chem., vol. 45, p. 1447). A patent (C. Varadachari, Indian Patent Application No. 10/CAL/99) describes the processes for production of slow-release fertilizers and describes methods for assessing limits of polymerisation.

SUMMARY OF THE INVENTION

Among the various aspects of the present invention is the provision of fertilizer compounds having at least one primary micronutrient selected from the group consisting of chromium, cobalt, copper, iron, manganese, and zinc; and a polyphosphate; and optionally at least one secondary micronutrient selected from the group consisting of boron, chlorine, iodine, molybdenum or selenium. The fertilizer compounds are preferably water insoluble, dilute acid soluble, and free-flowing powders.

Another aspect of the invention is a method of producing a fertilizer. The method may include combining at least one lesser reactive metal compound, phosphoric acid optionally heated, and optionally sulfuric acid and optionally water, and optionally at least a first secondary micronutrient to form a first mixture, and heating the first mixture to a temperature between about 90° C. and about 165° C. Then, optionally at least one higher reactive metal compound, and optionally secondary micronutrients and optionally water are combined with the first mixture to form a second mixture. Then, the second mixture may be heated to a temperature between about 90° C. and about 165° C. Optionally at least one higher reactive metal compound, and optionally at least a second secondary micronutrient and optionally water may be combined with the second mixture to for a third mixture. The third mixture may be heated to between about 90° C. and about 165° C.

In accordance with another illustrative embodiment, a method of producing a fertilizer may include pre-heating a first phosphoric acid to a temperature between about 60° C. and about 160° C. The pre-heated first phosphoric acid may be combined with at least one lesser reactive primary metal compound, and optionally sulfuric acid and optionally water, to form a first mixture. The first mixture may be heated to a temperature between about 90° C. and about 165° C. to form a second mixture. Then, the second mixture may be combined with at least one first higher reactive primary metal compound, and optionally water, and optionally a second phosphoric acid to form a third mixture. The third mixture may be heated a temperature between about 90° C. and about 165° C. to form a fourth mixture. Optionally, the fourth mixture may be combined with at least one second higher primary reactive metal compound, and optionally water, and optionally a third phosphoric acid to form a fifth mixture. In embodiments including the fifth mixture, the fifth mixture is then preferably heated to a temperature between about 90° C. and about 165° C. In various other embodiments, at least one secondary micronutrient, selected from the group consisting of boron, chlorine, iodine, molybdenum or selenium, may be incorporated into the fertilizer by adding a solution of the at least one secondary micronutrient with a solution of sodium, potassium, ammonium or hydrogen compounds in water to the first mixture, the second mixture, the third mixture, the fourth mixture, or the fifth mixture.

In accordance with a still further illustrative embodiment, a method of using a fertilizer may comprise adding the fertilizer to soil or animal feed. The fertilizer preferably includes at least one primary micronutrient selected from the group consisting of chromium, cobalt, copper, iron, manganese, and zinc; and a polyphosphate; and optionally at least one secondary micronutrient selected from the group consisting of boron, chlorine, iodine, molybdenum or selenium. The fertilizer compounds are preferably water insoluble, dilute acid soluble, and free-flowing powders.

Another aspect of the present invention is a fertilizer comprising: (a) at least one first micronutrient selected from the group consisting of chromium, cobalt, copper, iron, manganese, and zinc; (b) a polyphosphate, wherein the fertilizer is water insoluble, dilute acid soluble, and free-flowing powder; and (c) optionally at least one second micronutrient selected from the group consisting of boron, chlorine, iodine, molybdenum or selenium.

Another aspect of the present invention is a fertilizer in solid form, the fertilizer comprising a micronutrient metal polyphosphate composition, the micronutrient metal polyphosphate composition being water-insoluble and 2 wt. % citric acid soluble. The micronutrient metal(s) are selected from the group consisting of chromium, cobalt, copper, iron, manganese, zinc and combinations thereof with the ratio of the number of equivalents of the micronutrient metal(s), M, to the number of equivalents of phosphorous, P, in the micronutrient metal polyphosphate composition having a value of M:P wherein (i) M:P is greater than 0.33:1 when the micronutrient metal polyphosphate composition contains zinc but not chromium, cobalt, copper, iron, or manganese as micronutrients, (ii) M:P is greater than 0.12:1 when the micronutrient metal polyphosphate composition contains iron but not chromium, cobalt, copper, zinc, or manganese as micronutrients, (iii) M:P is greater than 0.2:1 when the micronutrient metal polyphosphate composition contains manganese but not chromium, cobalt, copper, iron, or zinc as micronutrients, (iv) M:P is greater than 0.12:1 when the micronutrient metal polyphosphate composition contains iron and manganese but not chromium, cobalt, copper, or zinc as micronutrients, (v) M:P is greater than 0.15:1 when the micronutrient metal polyphosphate composition contains iron, manganese and copper but not chromium, cobalt, or zinc as micronutrients, (vi) M:P is greater than 0.2:1 when the micronutrient metal polyphosphate composition contains zinc, iron and manganese but not chromium, cobalt, or copper as micronutrients, or (vii) M:P is greater than 0.23:1 when the micronutrient metal polyphosphate composition contains zinc, iron manganese, and copper but not chromium or cobalt.

Another aspect of the present invention is a fertilizer in solid form, the fertilizer comprising a micronutrient metal polyphosphate composition, the micronutrient metal polyphosphate composition being water-insoluble and 2 wt. % citric acid soluble, the micronutrient metal polyphosphate comprising zinc and, optionally, one or more micronutrient metals selected from the group consisting of chromium, cobalt, copper, iron, and manganese as micronutrients wherein the micronutrient metal polyphosphate composition is characterized by having an X-ray diffraction reflection at one or more of the following positions: 8.72 (±0.09), 6.88 (±0.07), 4.834 (±0.025), 4.710 (±0.025), 4.24 (±0.02), 4.20 (±0.02), 3.969 (±0.0175), 3.68 (±0.01), 3.58 (±0.01), 3.38 (±0.01), 2.848 (±0.009), 2.585 (±0.007), 2.430 (±0.007), 2.071 (±0.005), 1.934 (±0.004), 1.80 (±0.003), 1.721 (±0.0029), 1.667 (±0.0028), 1.660 (±0.0027), 1.620 (±0.0027), 1.615 (±0.0026), 1.594 (±0.0025), and 1.564 (±0.0024) Å.

A further aspect of the present invention is a fertilizer in solid form, the fertilizer comprising a micronutrient metal polyphosphate composition, the micronutrient metal polyphosphate composition being water-insoluble and 2 wt. % citric acid soluble, the micronutrient metal polyphosphate composition comprising iron, manganese or copper as micronutrients, wherein the micronutrient metal polyphosphate composition is characterized by having an X-ray diffraction reflection at one or more of the following positions: 8.17 (±0.09), 5.98 (±0.03), 5.16 (±0.03), 4.82 (±0.025), 4.52 (±0.025), 4.27 (±0.02), 4.16 (±0.02), 3.48 (±0.01), 3.44 (±0.01), 2.87 (±0.009), 2.85 (±0.009), 2.59 (±0.007), 2.57 (±0.007), 2.52 (±0.007), 2.15 (±0.005), 1.96 (±0.004), and 1.75 (±0.003) Å.

Other objects and features will be in part apparent and in part pointed out hereinafter.

DETAILED DESCRIPTION OF THE PREFERRED EMBODIMENTS

Fertilizer Compositions

Figure 1:
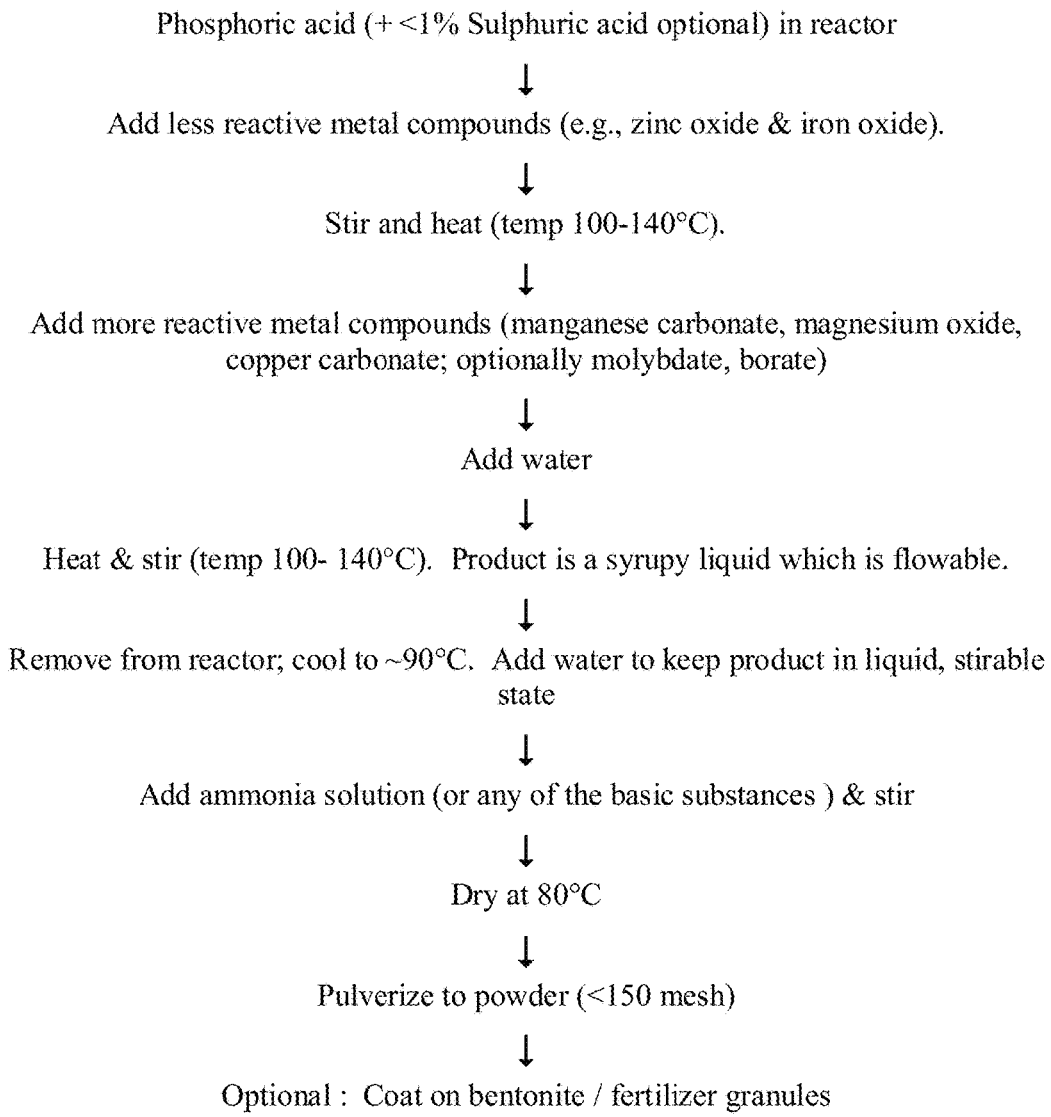
FIG. 1 is a flow diagram of one exemplary embodiment of a process for the preparation of a micronutrient metal polyphosphate composition of the present invention.

An illustrative embodiment of the present invention includes water insoluble compounds having at least one primary micronutrient, and optionally at least one secondary micronutrient, for use as a plant fertilizer. Suitable primary micronutrients may include cationics such as chromium, cobalt, copper, iron, manganese, and zinc. For the purposes of this disclosure, the term primary metal compounds means compounds that contain at least one primary micronutrient. Optional secondary micronutrients may include anionics such as boron, chlorine, iodine, molybdenum or selenium. For the purposes of this disclosure, the term secondary metal compounds means compounds that contain at least one secondary micronutrient. Preferably, the fertilizer compounds are short-chain polyphosphates produced by incomplete polymerization of metal orthophosphates.

In an embodiment, the fertilizer contains zinc as the only micronutrient. In this embodiment, the fertilizer includes at least about 10 weight percent zinc, based on the total weight of the fertilizer. In another embodiment, the fertilizer contains iron as the only micronutrient. In this embodiment, the fertilizer includes at least about 7 weight percent iron, based on the total weight of the fertilizer. In another embodiment, the fertilizer contains manganese as the only micronutrient. In this embodiment, the fertilizer includes at least about 5 weight percent manganese, based on the total weight of the fertilizer. In another embodiment, the fertilizer contains copper as the only micronutrient. In this embodiment, the fertilizer includes at least about 5 weight percent copper, based on the total weight of the fertilizer. In another embodiment, the fertilizer contains chromium as the only micronutrient. In this embodiment, the fertilizer includes at least about 3 weight percent chromium, based on the total weight of the fertilizer. In another embodiment, the fertilizer contains cobalt as the only micronutrient. In this embodiment, the fertilizer includes at least 1 weight percent cobalt, based on the total weight of the fertilizer. In another embodiment, the fertilizer contains at least two different micronutrients. In this embodiment, the fertilizer includes at least about 8 weight percent total micronutrient, based on the total weight of the fertilizer. Alternatively, the fertilizer preferably comprises at least about 10 weight percent, alternatively at least about 15 weight percent, alternatively at least about 20 weight percent, alternatively at least about 22 weight percent, alternatively at least about 25 weight percent, alternatively at least about 30 weight percent, alternatively at least about 35 weight percent, micronutrients based on the total weight of the fertilizer.

The fertilizer compositions of the present invention contain, as a component thereof, a micronutrient metal polyphosphate composition, the micronutrient metal being one or more of the primary micronutrients described herein. Such fertilizer compositions may optionally contain other components that contribute to the nutritional, material handling, or other characteristics of the fertilizer. For example, the fertilizer composition may contain a water-soluble N-P-K macronutrient fertilizer composition that has been blended or otherwise combined with the micronutrient metal polyphosphate composition. By way of further example, the fertilizer may contain micronutrient compositions other than the micronutrient metal polyphosphate that have been blended or otherwise combined with the micronutrient metal polyphosphate composition. By way of further example, the fertilizer may contain organic materials like plant residues that have been blended or otherwise combined with the micronutrient metal polyphosphate composition to improve the material handling characteristics of the fertilizer.

Micronutrient Metal Polyphosphates

In general, the micronutrient metal polyphosphates of the present invention may be polymerized to various degrees. For example, the average chain length (number average) may be in the range of about 1.5 and 30 phosphate units (phosphorus atoms) per chain. In one embodiment, the average chain length (number average) is about 2 to 20 phosphate units (phosphorus atoms) per chain. In general, it is preferred that the chain length be at the shorter end of the range. For example, in certain embodiments it is preferred that the average chain length (number average) be between 5 and 8 phosphate units (phosphorus atoms) per chain.

Advantageously, the micronutrient metal polyphosphates of the present invention are water-insoluble. That is, the micronutrient metal polyphosphates do not appreciably dissolve in water at room temperature (25° C.) water and neutral pH; for example, the micronutrient metal polyphosphates will not release more than 15% of their micronutrient metals in water within 10 minutes, and preferably within an hour. The micronutrient metal polyphosphates, however, dissolve relatively rapidly at room temperature in dilute acids such as 2 wt. % citric acid and 0.005M diethylenetriaminepentaacetic acid (DTPA). In addition, the extent of dissolution in a one hour period in dilute acids such as 2 wt.

% citric acid and 0.005M DTPA at room temperature is a substantial fraction of the extent of dissolution in significantly stronger acids such as 0.1N HCl acid at room temperature. For example, the extent of dissolution in dilute acids such as 2 wt. % citric acid and 0.005M DTPA will typically be at least 50% of the extent of dissolution in 0.1N HCl in a one-hour period at room temperature. In certain preferred embodiments, the extent of dissolution in a one hour period in dilute acids such as 2 wt. % citric acid and 0.005M DTPA at room temperature will be at least 60% of the extent of dissolution in significantly stronger acids such as 0.1N HCl in a one-hour period at room temperature. In certain more preferred embodiments, the extent of dissolution in a one hour period in dilute acids such as 2 wt. % citric acid and 0.005M DTPA at room temperature will be at least 70% of the extent of dissolution in significantly stronger acids such as 0.1N HCl in a one-hour period at room temperature. In certain more preferred embodiments, the extent of dissolution in a one hour period in dilute acids such as 2 wt. % citric acid and 0.005M DTPA at room temperature will be at least 90% of the extent of dissolution in significantly stronger acids such as 0.1N HCl in a one-hour period at room temperature.

In certain embodiments, zinc polyphosphates of the present invention are particularly soluble in dilute acids. For example, within ten minutes at room temperature, micronutrient metal polyphosphates containing zinc as the only primary micronutrient will dissolve to the same extent in dilute acids such as 2 wt. % citric acid and 0.005M DTPA as in significantly stronger acids such as 0.1N HCl acid.

In addition to being soluble in dilute acids, the micronutrient polyphosphate compositions of the present invention contain relatively large proportions of primary micronutrient metal concentrations. One manner of viewing this capacity is to compare the amount of primary micronutrient metal in the polyphosphate composition to the amount of phosphate (phosphorous atoms) in the polyphosphate composition.

In one embodiment, the micronutrient metal polyphosphate composition comprises zinc as the only primary micronutrient metal. In such embodiments, the ratio of the equivalents of zinc to phosphorous in the zinc polyphosphate may be greater than 0.33:1, respectively. By way of further example, in one embodiment in which zinc is the only primary micronutrient metal, the ratio of the equivalents of zinc to phosphorous in the zinc polyphosphate may be greater than 0.35:1, respectively. By way of further example, in one embodiment in which zinc is the only primary micronutrient metal, the ratio of the equivalents of zinc to phosphorous in the zinc polyphosphate may be greater than 0.375:1, respectively. By way of further example, in one embodiment in which zinc is the only primary micronutrient metal, the ratio of the equivalents of zinc to phosphorous in the zinc polyphosphate may be greater than 0.4:1, respectively. In general, however, the upper limit of zinc is the amount that would lead to the formation of the corresponding monohydrogen orthophosphate.

In another embodiment, the micronutrient metal polyphosphate composition comprises iron as the only primary micronutrient metal. In such embodiments, the ratio of the equivalents of iron to phosphorous in the iron polyphosphate may be greater than 0.12:1, respectively. By way of further example, the ratio of the equivalents of iron to phosphorous in the iron polyphosphate may be greater than 0.15:1, respectively. By way of further example, the ratio of the equivalents of iron to phosphorous in the iron polyphosphate may be greater than 0.2:1, respectively. By way of further example, in one embodiment in which iron is the only primary micronutrient metal, the ratio of the equivalents of iron to phosphorous in the iron polyphosphate may be greater than 0.25:1, respectively. By way of further example, in one embodiment in which iron is the only primary micronutrient metal, the ratio of the equivalents of iron to phosphorous in the iron polyphosphate may be greater than 0.3:1, respectively. By way of further example, in one embodiment in which iron is the only primary micronutrient metal, the ratio of the equivalents of iron to phosphorous in the iron polyphosphate may be greater than 0.35:1, respectively. In general, however, the upper limit of iron is the amount that would lead to the formation of the corresponding monohydrogen orthophosphate.

In another embodiment, the micronutrient metal polyphosphate composition comprises manganese as the only primary micronutrient metal. In such embodiments, the ratio of the equivalents of manganese to phosphorous in the iron polyphosphate may be greater than 0.2:1, respectively. By way of further example, in one embodiment in which manganese is the only primary micronutrient metal, the ratio of the equivalents of manganese to phosphorous in the manganese polyphosphate may be greater than 0.25:1, respectively. By way of further example, in one embodiment in which manganese is the only primary micronutrient metal, the ratio of the equivalents of manganese to phosphorous in the iron polyphosphate may be greater than 0.3:1, respectively. By way of further example, in one embodiment in which manganese is the only primary micronutrient metal, the ratio of the equivalents of manganese to phosphorous in the manganese polyphosphate may be greater than 0.35:1, respectively. By way of further example, in one embodiment in which manganese is the only primary micronutrient metal, the ratio of the equivalents of manganese to phosphorous in the manganese polyphosphate may be greater than 0.4:1, respectively. In general, however, the upper limit of manganese is the amount that would lead to the formation of the corresponding monohydrogen orthophosphate.

In another embodiment, the micronutrient metal polyphosphate composition comprises at least two of the primary micronutrients in micronutrient concentrations. For example, as illustrated in the following examples, the micronutrient metal polyphosphate may comprise a combination of primary micronutrients selected from among the following combinations: (i) zinc and manganese; (ii) zinc and iron; (iii) zinc, iron and manganese; (iv) zinc, iron, manganese and copper; and (v) iron, manganese and copper.

In one embodiment, the micronutrient metal polyphosphate composition comprises iron and manganese in micronutrient concentrations. For example, the ratio of the equivalents of iron and manganese (in combination) to phosphorous in the micronutrient metal polyphosphate may be greater than 0.12:1, respectively. By way of further example, the ratio of the equivalents of iron and manganese (in combination) to phosphorous in the micronutrient metal polyphosphate may be greater than 0.15:1, respectively. By way of further example, the ratio of the equivalents of iron and manganese (in combination) to phosphorous in the micronutrient metal polyphosphate may be greater than 0.2:1, respectively. By way of further example, the ratio of the equivalents of iron and manganese (in combination) to phosphorous in the micronutrient metal polyphosphate may be greater than 0.25:1, respectively. By way of further example, the ratio of the equivalents of iron and manganese (in combination) to phosphorous in the micronutrient metal polyphosphate may be greater than 0.3:1, respectively. By way of further example, the ratio of the equivalents of iron and manganese (in combination) to phosphorous in the micronutrient metal polyphosphate may be greater than 0.35:1, respectively. In general, however, the upper limit of each of these metals is the amount that would lead to the formation of the corresponding monohydrogen orthophosphate.

In one embodiment, the micronutrient metal polyphosphate composition comprises iron, manganese and copper in micronutrient concentrations. For example, the ratio of the equivalents of iron, manganese and copper (in combination) to phosphorous in the micronutrient metal polyphosphate may be greater than 0.15:1, respectively. By way of further example, the ratio of the equivalents of iron, manganese and copper (in combination) to phosphorous in the micronutrient metal polyphosphate may be greater than 0.2:1, respectively. By way of further example, the ratio of the equivalents of iron, manganese and copper (in combination) to phosphorous in the micronutrient metal polyphosphate may be greater than 0.25:1, respectively. By way of further example, the ratio of the equivalents of iron, manganese and copper (in combination) to phosphorous in the micronutrient metal polyphosphate may be greater than 0.3:1, respectively. By way of further example, the ratio of the equivalents of iron, manganese and copper (in combination) to phosphorous in the micronutrient metal polyphosphate may be greater than 0.35:1, respectively. In general, however, the upper limit of each of these metals is the amount that would lead to the formation of the corresponding monohydrogen orthophosphate.

In one embodiment, the micronutrient metal polyphosphate composition comprises zinc, iron, and manganese in micronutrient concentrations. For example, the ratio of the equivalents of zinc, iron, and manganese (in combination) to phosphorous in the micronutrient metal polyphosphate may be greater than 0.2:1, respectively. By way of further example, the ratio of the equivalents of zinc, iron, and manganese (in combination) to phosphorous in the micronutrient metal polyphosphate may be greater than 0.25:1, respectively. By way of further example, the ratio of the equivalents of zinc, iron, and manganese (in combination) to phosphorous in the micronutrient metal polyphosphate may be greater than 0.3:1, respectively. By way of further example, the ratio of the equivalents of zinc, iron, and manganese (in combination) to phosphorous in the micronutrient metal polyphosphate may be greater than 0.35:1, respectively. In general, however, the upper limit of each of these metals is the amount that would lead to the formation of the corresponding monohydrogen orthophosphate.

In one embodiment, the micronutrient metal polyphosphate composition comprises zinc, iron, manganese and copper in micronutrient concentrations. For example, the ratio of the equivalents of zinc, iron, manganese and copper (in combination) to phosphorous in the micronutrient metal polyphosphate may be greater than 0.23:1, respectively. By way of further example, the ratio of the equivalents of zinc, iron, manganese and copper (in combination) to phosphorous in the micronutrient metal polyphosphate may be greater than 0.25:1, respectively. By way of further example, the ratio of the equivalents of zinc, iron, manganese and copper (in combination) to phosphorous in the micronutrient metal polyphosphate may be greater than 0.3:1, respectively. By way of further example, the ratio of the equivalents of zinc, iron, manganese and copper (in combination) to phosphorous in the micronutrient metal polyphosphate may be greater than 0.35:1, respectively. In general, however, the upper limit of each of these metals is the amount that would lead to the formation of the corresponding monohydrogen orthophosphate.

More generally, in certain embodiments the ratio of the equivalents of the primary micronutrient metals (in combination) to phosphorous in the micronutrient metal polyphosphate will be greater than 0.23:1, respectively. For example, in one embodiment in which micronutrient metal polyphosphate comprises two or more primary micronutrient metals, the ratio of the equivalents of the primary micronutrient metals (in combination) to phosphorous in the micronutrient metal polyphosphate will be greater than 0.25:1, respectively. By way of further example, in one embodiment in which micronutrient metal polyphosphate comprises two or more primary micronutrient metals, the ratio of the equivalents of the primary micronutrient metals (in combination) to phosphorous in the micronutrient metal polyphosphate may be greater than 0.275:1, respectively. By way of further example, in one embodiment in which micronutrient metal polyphosphate comprises two or more primary micronutrient metals, the ratio of the equivalents of the primary micronutrient metals (in combination) to phosphorous in the micronutrient metal polyphosphate may be greater than 0.3:1, respectively. By way of further example, in one embodiment in which micronutrient metal polyphosphate comprises two or more primary micronutrient metals, the ratio of the equivalents of the primary micronutrient metals (in combination) to phosphorous in the micronutrient metal polyphosphate may be greater than 0.35:1, respectively. By way of further example, in one embodiment in which micronutrient metal polyphosphate comprises two or more primary micronutrient metals, the ratio of the equivalents of the primary micronutrient metals (in combination) to phosphorous in the micronutrient metal polyphosphate may be greater than 0.4:1, respectively. By way of further example, in one embodiment in which micronutrient metal polyphosphate comprises two or more primary micronutrient metals, the ratio of the equivalents of the primary micronutrient metals (in combination) to phosphorous in the micronutrient metal polyphosphate may be greater than 0.5:1, respectively. In general, however, the upper limit of each of these metals is the amount that would lead to the formation of the corresponding monohydrogen orthophosphate.

Depending upon their composition, certain of the micronutrient metal polyphosphates can be characterized by their X-ray diffraction reflections. For example, certain zinc polyphosphate compositions of the present invention, with or without iron, manganese, copper, boron or molybdenum, may be characterized by having an X-ray diffraction reflection at one or more of the following positions: 8.72 ($\pm$0.09), 6.88 ($\pm$0.07), 4.834 ($\pm$0.025), 4.710 ($\pm$0.025), 4.24 ($\pm$0.02), 4.20 ($\pm$0.02), 3.969 ($\pm$0.0175), 3.68 ($\pm$0.01), 3.58 ($\pm$0.01), 3.38 ($\pm$0.01), 2.848 ($\pm$0.009), 2.585 ($\pm$0.007), 2.430 ($\pm$0.007), 2.071 ($\pm$0.005), 1.934 ($\pm$0.004), 1.80 ($\pm$0.003), 1.721 ($\pm$0.0029), 1.667 ($\pm$0.0028), 1.660 ($\pm$0.0027), 1.620 ($\pm$0.0027), 1.615 ($\pm$0.0026), 1.594 ($\pm$0.0025), and 1.564 ($\pm$0.0024) Å. In one embodiment, zinc polyphosphate compositions of the present invention, with or without iron, manganese, copper, boron or molybdenum, may be characterized by having an X-ray diffraction reflection at two or more of said positions. In another embodiment, zinc polyphosphate compositions of the present invention, with or without iron, manganese, copper, boron or molybdenum, may be characterized by having an X-ray diffraction reflection at three or more of said positions. In another embodiment, zinc polyphosphate compositions of the present invention, with or without iron, manganese, copper, boron or molybdenum, may be characterized by having an X-ray diffraction reflection at four or more of said positions. In another embodiment, zinc polyphosphate compositions of the present invention, with or without iron, manganese, copper, boron or molybdenum, may be characterized by having an X-ray diffraction reflection at five or more of said positions.

Similarly, certain iron, manganese or copper polyphosphate composition of the present invention may be characterized by having an X-ray diffraction reflection at one or more of the following positions: 8.17 (±0.09), 5.98 (±0.03), 5.16 (±0.03), 4.82 (±0.025), 4.52 (±0.025), 4.27 (±0.02), 4.16 (±0.02), 3.48 (±0.01), 3.44 (±0.01), 2.87 (±0.009), 2.85 (±0.009), 2.59 (±0.007), 2.57 (±0.007), 2.52 (±0.007), 2.15 (±0.005), 1.96 (±0.004), and 1.75 (±0.003) Å. In one embodiment, certain iron, manganese or copper polyphosphate composition of the present invention may be characterized by having an X-ray diffraction reflection at two or more of said positions. In one embodiment, certain iron, manganese or copper polyphosphate composition of the present invention may be characterized by having an X-ray diffraction reflection at three or more of said positions. In one embodiment, certain iron, manganese or copper polyphosphate composition of the present invention may be characterized by having an X-ray diffraction reflection at four or more of said positions. In one embodiment, certain iron, manganese or copper polyphosphate composition of the present invention may be characterized by having an X-ray diffraction reflection at five or more of said positions.

As described elsewhere herein, the micronutrient metal polyphosphate is neutralized post-polymerization for improved material handling characteristics. In general, it is preferred that the equilibrium pH of an aqueous mixture of ten parts by weight of water at neutral pH and one part by weight of the neutralized micronutrient metal polyphosphate be at least pH 2. More preferably, the equilibrium pH of an aqueous mixture of ten parts by weight of water at neutral pH and one part by weight of the neutralized micronutrient metal polyphosphate be at least pH 3. Still more preferably, the equilibrium pH of an aqueous mixture of ten parts by weight of water at neutral pH and one part by weight of the neutralized micronutrient metal polyphosphate be at least pH 4. Still more preferably, the equilibrium pH of an aqueous mixture of ten parts by weight of water at neutral pH and one part by weight of the neutralized micronutrient metal polyphosphate be at least pH 5. In certain embodiments, the equilibrium pH of an aqueous mixture of ten parts by weight of water at neutral pH and one part by weight of the neutralized micronutrient metal polyphosphate be at least pH 6. For example, in one embodiment, the equilibrium pH of an aqueous mixture of ten parts by weight of water at neutral pH and one part by weight of the neutralized micronutrient metal polyphosphate will be in the range of pH 5-8.

In general, the micronutrient metal polyphosphate is preferably a solid, free-flowing particulate material. Particle size is not narrowly critical but is generally preferably in the range of about 80 mesh to about 150 mesh. Still preferably the particle size is in the range of 150 mesh to 300 mesh. Still preferably the particle size is in less than 300 mesh.

Cobalt Micronutrient Fertilizers

In one embodiment, the micronutrient fertilizer of the present invention comprises cobalt as a micronutrient. In general, fertilizers containing cobalt as a micronutrient contain at least 0.1 wt. % cobalt. Typically, fertilizers containing cobalt as a micronutrient contain at least 1 wt. % cobalt. In certain embodiments, fertilizers containing cobalt as a micronutrient contain at least 2 wt. % cobalt. In other embodiments, fertilizers containing cobalt as a micronutrient contain at least 3 wt. % cobalt. For example, in one embodiment, the fertilizers containing cobalt as a micronutrient contain 1-5 wt. % cobalt. In each of these embodiments, the cobalt micronutrient fertilizer may optionally contain one or more of the other primary nutrients described herein, one or more of the secondary micronutrients described herein, other macronutrients or micronutrients, or yet other compositions that may contribute to the nutritional, material or handling characteristics of the fertilizer.

Cobalt micronutrient fertilizers compositions of the present invention contain, as a component thereof, a micronutrient metal polyphosphate composition of the present invention, containing cobalt as a micronutrient. Such cobalt micronutrient fertilizer compositions may optionally contain other components that contribute to the nutritional, material handling, or other characteristics of the fertilizer. For example, the cobalt micronutrient fertilizer may contain a water-soluble N-P-K macronutrient fertilizer that has been blended or otherwise combined with the cobalt polyphosphate composition. By way of further example, the cobalt micronutrient fertilizer may contain water-soluble or even water-insoluble micronutrient compounds that has been blended or otherwise combined with the cobalt polyphosphate composition. By way of further example, the cobalt micronutrient fertilizer may contain organic materials like plant residues that have been blended or otherwise combined with the cobalt polyphosphate composition to improve the material handling characteristics of the cobalt micronutrient fertilizer.

Cobalt polyphosphate compositions may be prepared by combining a cobalt source material, phosphoric acid (preferably containing no more than 60% $P_2O_5$), and, optionally, one or more additional materials to form a reaction mixture and reacting the components of the mixture to form the cobalt polyphosphate. The optional additional materials include, for example, one or more of the other primary micronutrients described herein, one or more of the secondary micronutrients described herein and other macronutrient or micronutrient compositions desirably included in the polyphosphate composition. The cobalt source material may be any source of cobalt that is compatible with the polymerization process of the present invention. Such sources include, for example, cobaltous oxide cobaltic oxide, cobalt sulfate, and cobalt chloride.

Chromium Micronutrient Fertilizers

In one embodiment, the micronutrient fertilizer of the present invention comprises chromium as a micronutrient. In general, fertilizers containing chromium as a micronutrient contain at least 0.1 wt. % chromium. Typically, fertilizers containing chromium as a micronutrient contain at least 1 wt. % chromium. In certain embodiments, fertilizers containing chromium as a micronutrient contain at least 2 wt. % chromium. In certain embodiments, fertilizers containing chromium as a micronutrient contain at least 3 wt. % chromium. In other embodiments, fertilizers containing chromium as a micronutrient contain at least 5 wt. % chromium. For example, in one embodiment, the fertilizers containing chromium as a micronutrient contain 3-7 wt. % chromium. In each of these embodiments, the chromium micronutrient fertilizer may optionally contain one or more of the other primary nutrients described herein, one or more of the secondary micronutrients described herein, other macronutrients or micronutrients, or yet other compositions that may contribute to the nutritional, material or handling characteristics of the fertilizer.

Chromium micronutrient fertilizers compositions of the present invention contain, as a component thereof, a micronutrient metal polyphosphate composition of the present invention, containing chromium as a micronutrient. Such chromium micronutrient fertilizer compositions may optionally contain other components that contribute to the nutritional, material handling, or other characteristics of the fertilizer. For example, the chromium micronutrient fertilizer may contain a water-soluble N-P-K macronutrient fertilizer that has been blended or otherwise combined with the chromium polyphosphate composition. By way of further example, the chromium micronutrient fertilizer may contain water-soluble or even water-insoluble micronutrient compounds that has been blended or otherwise combined with the chromium polyphosphate composition. By way of further example, the chromium micronutrient fertilizer may contain organic materials like plant residues that have been blended or otherwise combined with the chromium polyphosphate composition to improve the material handling characteristics of the chromium micronutrient fertilizer.

Chromium polyphosphate compositions may be prepared by combining a chromium source material, phosphoric acid (preferably containing no more than 60% $P_2O_5$), and, optionally, one or more additional materials to form a reaction mixture and reacting the components of the mixture to form the chromium polyphosphate. The optional additional materials include, for example, one or more of the other primary micronutrients described herein, one or more of the secondary micronutrients described herein and other macronutrient or micronutrient compositions desirably included in the polyphosphate composition. The chromium source material may be any source of chromium that is compatible with the polymerization process of the present invention. Such sources include, for example, chromium (III) oxides, chromium (VI) oxide, chromium(III) sulfate, chromium(III) chloride, and dichromate salts.

Copper Micronutrient Fertilizers

In one embodiment, the micronutrient fertilizer of the present invention comprises copper as a micronutrient. In general, fertilizers containing copper as a micronutrient contain at least 0.1 wt. % copper. Typically, fertilizers containing copper as a micronutrient contain at least 1 wt. % copper. In certain embodiments, fertilizers containing copper as a micronutrient contain at least 5 wt. % copper. In other embodiments, fertilizers containing copper as a micronutrient contain at least 10 wt. % copper. For example, in one embodiment, the fertilizers containing copper as a micronutrient contain 14-20 wt. % copper. In each of these embodiments, the copper micronutrient fertilizer may optionally contain one or more of the other primary nutrients described herein, one or more of the secondary micronutrients described herein, other macronutrients or micronutrients, or yet other compositions that may contribute to the nutritional, material or handling characteristics of the fertilizer.

Copper micronutrient fertilizers compositions of the present invention contain, as a component thereof, a micronutrient metal polyphosphate composition of the present invention, containing copper as a micronutrient. Such copper micronutrient fertilizer compositions may optionally contain other components that contribute to the nutritional, material handling, or other characteristics of the fertilizer. For example, the copper micronutrient fertilizer may contain a water-soluble N-P-K macronutrient fertilizer that has been blended or otherwise combined with the copper polyphosphate composition. By way of further example, the copper micronutrient fertilizer may contain water-soluble or even water-insoluble micronutrient compounds that has been blended or otherwise combined with the copper polyphosphate composition. By way of further example, the copper micronutrient fertilizer may contain organic materials like plant residues that have been blended or otherwise combined with the copper polyphosphate composition to improve the material handling characteristics of the copper micronutrient fertilizer.

Copper polyphosphate compositions may be prepared by combining a copper source material, phosphoric acid (preferably containing no more than 60% $P_2O_5$), and, optionally, one or more additional materials to form a reaction mixture and reacting the components of the mixture to form the copper polyphosphate. The optional additional materials include, for example, one or more of the other primary micronutrients described herein, one or more of the secondary micronutrients described herein and other macronutrient or micronutrient compositions desirably included in the polyphosphate composition. The copper source material may be any source of copper that is compatible with the polymerization process of the present invention. Such sources include, for example, cupric carbonate, cupric hydroxide, cupric hydroxide carbonate, cupric sulfate, cupric chloride, and cupric oxide.

Manganese Micronutrient Fertilizers

In one embodiment, the micronutrient fertilizer of the present invention comprises manganese as a micronutrient. In general, fertilizers containing manganese as a micronutrient contain at least 0.1 wt. % manganese. Typically, fertilizers containing manganese as a micronutrient contain at least 1 wt. % manganese. In certain embodiments, fertilizers containing manganese as a micronutrient contain at least 5 wt. % manganese. In other embodiments, fertilizers containing manganese as a micronutrient contain at least 8 wt. % manganese. For example, in one embodiment, the fertilizers containing manganese as a micronutrient contain 10-20 wt. % manganese. In each of these embodiments, the manganese micronutrient fertilizer may optionally contain one or more of the other primary nutrients described herein, one or more of the secondary micronutrients described herein, other macronutrients or micronutrients, or yet other compositions that may contribute to the nutritional, material or handling characteristics of the fertilizer.

Manganese micronutrient fertilizers compositions of the present invention contain, as a component thereof, a micronutrient metal polyphosphate composition of the present invention, containing manganese as a micronutrient. Such manganese micronutrient fertilizer compositions may optionally contain other components that contribute to the nutritional, material handling, or other characteristics of the fertilizer. For example, the manganese micronutrient fertilizer may contain a water-soluble N-P-K macronutrient fertilizer that has been blended or otherwise combined with the manganese polyphosphate composition. By way of further example, the manganese micronutrient fertilizer may contain water-soluble or even water-insoluble micronutrient compounds that has been blended or otherwise combined with the manganese polyphosphate composition. By way of further example, the manganese micronutrient fertilizer may contain organic materials like plant residues that have been blended or otherwise combined with the manganese polyphosphate composition to improve the material handling characteristics of the manganese micronutrient fertilizer.

Manganese polyphosphate compositions may be prepared by combining a manganese source material, phosphoric acid (preferably containing no more than 60% $P_2O_5$), and, optionally, one or more additional materials to form a reaction mixture and reacting the components of the mixture to form the manganese polyphosphate. The optional additional materials include, for example, one or more of the other primary micronutrients described herein, one or more of the secondary micronutrients described herein and other macronutrient or micronutrient compositions desirably included in the polyphosphate composition. The manganese source material may be any source of manganese that is compatible with the polymerization process of the present invention. Such sources include, for example, manganous carbonate, manganous oxide, manganese dioxide, manganous sulfate, and manganous chloride.

Zinc Micronutrient Fertilizers

In one embodiment, the micronutrient fertilizer of the present invention comprises zinc as a micronutrient. In general, fertilizers containing zinc as a micronutrient contain at least 0.1 wt. % zinc. Typically, fertilizers containing zinc as a micronutrient contain at least 1 wt. % zinc. In certain embodiments, fertilizers containing zinc as a micronutrient contain at least 10 wt. % zinc. In other embodiments, fertilizers containing zinc as a micronutrient contain 20-30 wt. % zinc. For example, in one embodiment, the fertilizers containing zinc as a micronutrient contain 20-25 wt. % zinc. By way of further example, in one embodiment, the fertilizers containing zinc as a micronutrient contain 24-30 wt. % zinc. In each of these embodiments, the zinc micronutrient fertilizer may optionally contain one or more of the other primary nutrients described herein, one or more of the secondary micronutrients described herein, other macronutrients or micronutrients, or yet other compositions that may contribute to the nutritional, material or handling characteristics of the fertilizer.

Zinc micronutrient fertilizers compositions of the present invention contain, as a component thereof, a micronutrient metal polyphosphate composition of the present invention, containing zinc as a micronutrient. Such zinc micronutrient fertilizer compositions may optionally contain other components that contribute to the nutritional, material handling, or other characteristics of the fertilizer. For example, the zinc micronutrient fertilizer may contain a water-soluble N-P-K macronutrient fertilizer that has been blended or otherwise combined with the zinc polyphosphate composition. By way of further example, the zinc micronutrient fertilizer may contain water-soluble or even water-insoluble micronutrient compounds that has been blended or otherwise combined with the zinc polyphosphate composition. By way of further example, the zinc micronutrient fertilizer may contain organic materials like plant residues that have been blended or otherwise combined with the zinc polyphosphate composition to improve the material handling characteristics of the zinc micronutrient fertilizer.

Zinc polyphosphate compositions may be prepared by combining a zinc source material, phosphoric acid (preferably containing no more than 60% $P_2O_5$), and, optionally, one or more additional materials to form a reaction mixture and reacting the components of the mixture to form the zinc polyphosphate. The optional additional materials include, for example, one or more of the other primary micronutrients described herein, one or more of the secondary micronutrients described herein and other macronutrient or micronutrient compositions desirably included in the polyphosphate composition. The zinc source material may be any source of zinc that is compatible with the polymerization process of the present invention. Such sources include, for example, zinc oxide, zinc metal, zinc ash, zinc sulfate, zinc carbonate and zinc chloride.

Iron Micronutrient Fertilizers

In one embodiment, the micronutrient fertilizer of the present invention comprises iron as a micronutrient. In general, fertilizers containing iron as a micronutrient contain at least 0.1 wt. % iron. Typically, fertilizers containing iron as a micronutrient contain at least 1 wt. % iron. In certain embodiments, fertilizers containing iron as a micronutrient contain at least 3 wt. % iron. In other embodiments, fertilizers containing iron as a micronutrient contain at least 4 wt. % iron. For example, in one embodiment, the fertilizers containing iron as a micronutrient contain 5-15 wt. % iron. In each of these embodiments, the iron micronutrient fertilizer may optionally contain one or more of the other primary nutrients described herein, one or more of the secondary micronutrients described herein, other macronutrients or micronutrients, or yet other compositions that may contribute to the nutritional, material or handling characteristics of the fertilizer.

Iron micronutrient fertilizers compositions of the present invention contain, as a component thereof, a micronutrient metal polyphosphate composition of the present invention, containing iron as a micronutrient. Such iron micronutrient fertilizer compositions may optionally contain other components that contribute to the nutritional, material handling, or other characteristics of the fertilizer. For example, the iron micronutrient fertilizer may contain a water-soluble N-P-K macronutrient fertilizer that has been blended or otherwise combined with the iron polyphosphate composition. By way of further example, the iron micronutrient fertilizer may contain water-soluble or even water-insoluble micronutrient compounds that has been blended or otherwise combined with the iron polyphosphate composition. By way of further example, the iron micronutrient fertilizer may contain organic materials like plant residues that have been blended or otherwise combined with the iron polyphosphate composition to improve the material handling characteristics of the iron micronutrient fertilizer.

Iron polyphosphate compositions may be prepared by combining an iron source material, phosphoric acid (preferably containing no more than 60% $P_2O_5$), and, optionally, one or more additional materials to form a reaction mixture and reacting the components of the mixture to form the iron polyphosphate. The optional additional materials include, for example, one or more of the other primary micronutrients described herein, one or more of the secondary micronutrients described herein and other macronutrient or micronutrient compositions desirably included in the polyphosphate composition. The iron source material may be any source of iron that is compatible with the polymerization process of the present invention. Such sources include, for example, goethite, hematite iron hydroxide, ferrous oxide, ferric sulfate, ferrous sulfate, ferric chloride, and ferric sulfate.

Fertilizers Containing Two or More Micronutrients

As noted, the micronutrient metal polyphosphate may contain two or more primary micronutrients, one or more primary micronutrients and one or more secondary micronutrients. In general fertilizers that contain two or more primary micronutrients contain at least 0.1 wt. % primary nutrients, more typically at least 1 wt. % of each of the primary micronutrients. Additionally, the primary micronutrient metals may be present in any of the concentrations recited herein in connection with the cobalt micronutrient fertilizers, chromium micronutrient fertilizers, copper micronutrient fertilizers, iron micronutrient fertilizers, manganese micronutrient fertilizers, and zinc micronutrient fertilizers. For example, the fertilizer may contain 1-5 wt. % cobalt, 1-20 wt. % copper, 1-7 wt. % chromium, 1-15 wt. % iron, 1-20 wt. % manganese, and/or 1-30 wt. % zinc. In addition, the fertilizer may optionally comprise one or more of the secondary micronutrients such as one or more of boron, molybdenum and selenium.

For certain applications, it is preferred that the micronutrient metal polyphosphate contain a combination of primary micronutrient metals. In one such embodiment, the micronutrient metal polyphosphate contains zinc, iron, and manganese as micronutrient metals. For example, in one such embodiment, the zinc, iron and manganese, in combination, constitute at least 5 wt. % of the micronutrient metal polyphosphate composition. By way of further example, in one such embodiment, the zinc, iron and manganese, in combination, constitute at least 12 wt. % of the micronutrient metal polyphosphate composition.

For other applications it is preferred that the micronutrient metal polyphosphate contain zinc, iron, manganese and copper as micronutrient metals. For example, in one such embodiment, the zinc, iron, manganese, and copper, in combination, constitute at least 10 wt. % of the micronutrient metal polyphosphate composition. By way of further example, in one such embodiment, the zinc, iron, manganese, and copper, in combination, constitute at least 14 wt. % of the micronutrient metal polyphosphate composition. By way of further example, in one such embodiment, the zinc, iron, manganese, and copper, in combination, constitute about 15-25 wt. % of the micronutrient metal polyphosphate composition. Individually, zinc may constitute about 5-15 wt %, iron may constitute about 3-5 wt. %, manganese may constitute about 1-2 wt. % and copper may constitute about 0.5-1 wt. % of the composition.

For other applications it is preferred that the micronutrient metal polyphosphate contain iron and manganese as micronutrient metals. For example, in one such embodiment, the iron and manganese, in combination, constitute at least 5 wt. % of the micronutrient metal polyphosphate composition. By way of further example, in one such embodiment, the iron and manganese, in combination, constitute at least 10 wt. % of the micronutrient metal polyphosphate composition. Individually, for example, iron may constitute about 3-10 wt % and manganese may constitute about 3-10 wt. % of the composition.

For other applications it is preferred that the micronutrient metal polyphosphate contain iron, manganese and copper as micronutrient metals. For example, in one such embodiment, the iron, manganese, and copper, in combination, constitute at least 6 wt. % of the micronutrient metal polyphosphate composition. By way of further example, in one such embodiment, the iron, manganese, and copper, in combination, constitute at least 12 wt. % of the micronutrient metal polyphosphate composition.

For other applications it is preferred that the micronutrient metal polyphosphate contain one or more of the primary micronutrients and one or more of the secondary micronutrients disclosed herein. For example, in one embodiment the micronutrient metal polyphosphate may contain at least 2 wt. % zinc and at least 0.1 wt. % boron. By way of further example, in one embodiment the micronutrient metal polyphosphate may contain at least 22 wt. % zinc and at least 2 wt. % boron.

For other applications it is preferred that the micronutrient metal polyphosphate contain zinc, iron, manganese and molybdenum as micronutrients. For example, in one such embodiment, the zinc, iron, and manganese, in combination, constitute at least 5 wt. % and molybdenum constitutes at least 0.01 wt. % of the micronutrient metal polyphosphate composition. By way of further example, in one such embodiment, the zinc, iron, and manganese, in combination, constitute at least 13 wt. % and molybdenum constitutes at least 0.3 wt. % of the micronutrient metal polyphosphate composition.

For other applications it is preferred that the micronutrient metal polyphosphate contain zinc, iron, manganese, copper and boron as micronutrients. For example, in one such embodiment, the zinc, iron, copper, and manganese, in combination, constitute at least 5 wt. % and boron constitutes at least 0.05 wt. % of the micronutrient metal polyphosphate composition. By way of further example, in one such embodiment, the zinc, iron, copper, and manganese, in combination, constitute at least 14 wt. % and boron constitutes at least 0.9 wt. % of the micronutrient metal polyphosphate composition.

Methods of Producing Fertilizers

In an illustrative embodiment, the fertilizers are produced by heating metal containing compounds such as metal oxides, metal carbonates, or combinations thereof, with phosphoric acid, and optionally sulfuric acid and optionally water. In an embodiment, heating metal containing compounds such as metal oxides, metal carbonates, or combinations thereof, with phosphoric acid, and optionally sulfuric acid and optionally water, produces polyphosphates and either does not produce orthophosphates or produces a relatively insubstantial amount of orthophosphates. In an alternative embodiment, the fertilizers are produced by pre-heating phosphoric acid, and optionally sulfuric acid and optionally water to between about 60° C. and 140° C., and then combining metal containing compounds such as metal oxides, metal carbonates, or combinations thereof. In an embodiment, the polymerization step does not include a condensing agent such as urea. In an embodiment utilizing sulfuric acid, preferably there is less than about 5 weight percent sulfuric acid, alternatively less than about 3 weight percent sulfuric acid, alternatively less than about 1 weight percent sulfuric acid, based on the weight of phosphoric acid and sulfuric acid.

Without wishing to be bound by the theory, Applicant believes that if the metal containing compounds are first dissolved in phosphoric acid, and/or sulfuric acid, at molar ratios less than that required to produce the dihydrogen phosphates, the condensation polymerization of polyphosphate can occur at relatively low temperatures, about 100° C. to 160° C., alternatively between about 100° C. to 140° C., when water is added, which eases processability. Further, without wishing to be bound by the theory, the addition of water maintains the fluidity of the polyphosphate intermediate(s), which also eases processability.

Still further, without wishing to be bound by the theory, Applicant believes that if the metal containing compounds are dissolved in a pre-heated phosphoric acid, formation of metal orthophosphates precipitates is minimized because the polymerization reaction takes place within a shorter time span after the metal compound is added. This enables polymerization temperatures to be attained faster, which permits polymerization to occur before a substantial amount of the metal phosphate is able to precipitate, i.e., the rate of polymerization of metal phosphate is faster than the rate of precipitation of metal phosphate. Further, without wishing to be bound by the theory, the addition of water may partially dissolve any orthophosphate precipitate produced. The process of pre-heating phosphoric acid prior to the addition of metal compound is preferred with metal compounds that precipitate as orthophosphates and which orthophosphates have cementing properties and where the amount of phosphoric acid is less than the stoichiometric amount required to produce the dihydrogen orthophosphate of that metal ion. As a non-limiting prophetic example, if zinc polyphosphate is produced at Zn:P molar ratios less than 1:2, by adding zinc oxide to phosphoric acid and then heating the mixture, a substantial amount of zinc orthophosphate may precipitate when heating rates are slow. Zinc orthophosphate has cementing properties and is generally not soluble in dilute HCl. If left for a few hours, the mixture of zinc-phosphoric acid could form a relatively large amount of white precipitate, which can form a cement-like layer at the bottom of the vessel. The cement-like layer would be generally insoluble and could choke the reaction vessel and the stirrer. In contrast, a relatively minor amount of zinc phosphate white precipitate would form if the reaction were carried out by adding the zinc compound to a pre-heated phosphoric acid, and then heating the mixture in the presence of water.

In an embodiment, the addition of primary metal containing reactants is accomplished in two steps: first the lesser reactive primary metal compounds are dissolved in phosphoric acid by heating, and then the more reactive primary metal compounds are added to the mixture. As used herein, the terms "lesser reactive" and "more reactive" are relative terms used to compare the reactivity of a compound with phosphoric acid. As a non-limiting example, iron carbonate is more reactive than iron oxide and manganese carbonate is more reactive than manganese oxide. Without wishing to be bound by the theory, often the lesser reactive compound is the lesser basic compound; however, this general rule does not always follow. For example, precipitated iron oxide and the natural iron oxide ore vary widely in their reactivity, and have nearly the same pH. As used herein, the terms "lesser basic," "higher basic," and the like, are relative terms used to compare two or more bases. As a non-limiting example, a compound having a pH of 8 is a lesser base, lesser basic, or less basic, as compared to a compound having a higher pH, for example 10. As used herein, the term mixture means the combination of two or more components. The two or more components may, or may not, react with each other or other components once added.

Continuing with the foregoing illustrative embodiment, lesser reactive primary metal compounds may include zinc oxides, iron oxides, copper oxides, chromium oxides, and mixtures thereof. Higher reactive primary metal compounds may include magnesium oxides, carbonates of magnesium, carbonates of copper, carbonates of zinc, carbonates of iron, and mixtures thereof. However, any oxide or carbonate or metal of a micronutrient may be utilized, and the order of their addition depends on the relative reactivity of the metal compounds with phosphoric acid. Further, while dissolution of the primary metal containing compounds in two steps is preferred, dissolution of the primary metal containing compounds may be conducted in any numbers of steps, including one, two, three, four or more.

After the lesser reactive primary metal compound is added to the phosphoric acid, and optionally sulfuric acid and optionally water, the mixture may be heated to between about 100° C. and about 160° C., alternatively between about 100° C. and about 140° C., alternatively between about 120° C. and about 140° C., alternatively to about 130° C., alternatively to about 120° C. Then, the higher reactive primary metal compound may be added to the mixture of the lesser reactive metal compound and phosphoric acid. Contemporaneously with the addition of the higher reactive primary metal compound, or after the addition of the higher reactive primary metal, water is preferably added to the mixture of the lesser reactive primary metal compound, phosphoric acid, and optionally sulfuric acid, and optionally the higher reactive primary metal compound. The mixture of the lesser reactive primary metal compound, phosphoric acid, optionally sulfuric acid, higher reactive primary metal compound, and water is preferably heated to between about 100° C. and about 140° C., alternatively between about 120° C. and about 140° C., alternatively to about 130° C., alternatively to about 120° C., and polymerization occurs.

In one embodiment, the amount of water added to the reaction mixture to produce the polyphosphate is at least about 4 moles water for every mole of micronutrient. In some embodiments, the amount of water added to the reaction mixture to produce the polyphosphate is even greater. For example, in one embodiment at least 5 moles water are added for every mole of micronutrient. By way of further example, in one embodiment at least 6 moles water are added for every mole of micronutrient. In general, the source of the water may be any aqueous composition that does not interfere with the reaction. Thus, for example, it may be water, itself, it may be a dilute acid such as dilute sulfuric acid, or it may be a dilute base such as sodium hydroxide or carbonate. In one such embodiment, the phosphoric acid itself is the source of the water. Based upon evidence to date, and without being bound by any particular theory, it presently appears that both free water and structural water of the $H_3PO_4$ molecule help in the reaction. Therefore if more phosphoric acid is added, less water is required. As an example, if one mole of zinc is reacted with 2.5 moles of phosphate from phosphoric acid of strength 56% $P_2O_5$ then sufficient $H_2O$ molecules are present for the reaction. If the quantity of acid is reduced to the extent that one mole of zinc is reacted with 1.7 moles of phosphate from phosphoric acid of strength 56% $P_2O_5$ then extra water is preferably added. Since there is a reduction in acid by 0.8 mole phosphorus, water associated with 0.8 mole phosphorus in phosphoric acid is added. This amount is about 32 grams. Somewhat greater amounts of water are preferred for manganese; typically about 10 moles of water are added to the reaction mixture for every mole of manganese. Similarly, somewhat greater amounts of water are preferred for iron depending upon the iron source; about 10 moles of water are preferably added to the reaction mixture for every mole of iron if goethite is used in reaction and about 20 moles of water are preferably added for every mole of iron if hematite is used in reaction. Hematite requires more water than goethite because hematite is a resistant mineral and dissolves only partially in less than stoichiometric amounts of phosphoric acid. Water aids in the dissolution of the hematite before polymerization occurs. If sufficient water is not present, only a fraction of the hematite dissolves and polymerizes leaving unreacted residue. Further, based upon evidence obtained to date and without wishing to be bound by theory, it appears that additional water also positively influences the physical nature of the reaction system. In general, as the proportion of water decreases, the reaction system increases in viscosity upon heating and may harden before polymerization temperatures are reached. With sufficient water, the reaction system is a nearly homogenous liquid which retains its fluidity up to polymerization temperatures and the product so formed has better solubility in 2% citrate and 0.005M DTPA.

In embodiments including secondary micronutrient anionics such as boron, chlorine, iodine, molybdenum and selenium, the phosphoric acid may be added in two stages. Preferably, the secondary micronutrients are added as a solution of their sodium, potassium, ammonium or hydrogen salts in water. Without wishing to be bound by the theory, Applicant believes that if all of the phosphoric is added to the first mixture then sufficient orthophosphates may not be available to form polyphosphates with the compounds added at the later reaction stages. If all of the phosphoric is added to the first mixture, a pasty mass may be obtained, which could solidify before the required polymerization temperatures, as opposed to a clear polyphosphate liquid. Therefore, some amount of phosphoric acid, as estimated to be required for bonding with the anionics, is preferably added to the final reaction mixture, before heating to the final stage of polymerization. Further without wishing to be bound by the theory, Applicant believes that because the anionics may form precipitates with phosphate or other micronutrients in the reaction system, adding them as a solution may aid in making a homogenous mixture of the anionics in the phosphate liquid and more evenly disperse them in the polyphosphate chain, which yields a more uniform product.

Preferably, for any metal ion $M^{n+}$, where n+ is the valance of the metal ion, the molar ratio of phosphorous to metal is less than about n:1. For example, if the metal ion has a valence of +2, the molar ratio of phosphorous to the metal is less than 2:1 (e.g., 1.9 moles or less of phosphorous for every mole of metal). Thus, for a zinc fertilizer the molar ratio of phosphorous to zinc is less than 2:1, preferably about 1.67:1. For a micronutrient iron fertilizer the molar ratio of phosphorous to ferric iron is less than 3:1, preferably about 2.85:1. Without wishing to be bound by the theory, by carrying out the reaction at phosphorus ratios less than that required to produce the dihydrogen orthophosphate, the polymerization reaction occurs at a lower temperature and at a faster rate, which reduces the energy requirements and increases processability.

In an alternative embodiment, for any metal ion $M^{n+}$, where n+ is the valance of the metal ion, the molar ratio of phosphorous to metal is greater than about n:1. For example, if the metal ion has a valence of +3, the molar ratio of phosphorous to the metal is greater than 3:1 (e.g., 3.1 moles or more of phosphorous for every mole of metal).

In a still further embodiment, for any metal ion $M^{n+}$, where n+ is the valance of the metal ion, the molar ratio of phosphorous to the metal is equal to about n:1. For example, if the metal ion has a valence of +2, the molar ratio of phosphorous to the metal is equal to 2:1 (e.g., 2 moles of phosphorous for every mole of metal).

In one embodiment, the micronutrient phosphate is derived from a reaction mixture containing phosphoric acid and cations (other than protons) in the stoichiometric amount required for the complete conversion of the cations and phosphoric acid to the corresponding dihydrogen phosphates. By way of example, if a polyphosphate is derived from a reaction mixture containing the stoichiometric amount of phosphoric acid and zinc (a divalent cation) as the only cation (other than protons), the molar ratio of phosphorous to zinc in the reaction mixture will be 2:1. By way of further example, if a polyphosphate is derived from a reaction mixture containing the stoichiometric amount of phosphoric acid and zinc and iron (in its divalent state) as the only cations (other than protons), the molar ratio of the phosphorous to the combined amounts of the two cations, zinc and iron, in the reaction mixture will be 2:1, respectively. By way of further example, if a polyphosphate is derived from a reaction mixture containing the stoichiometric amount of phosphoric acid and an equal number of moles of each of zinc and iron (in its trivalent state) as the only cations (other than protons), the molar ratio of phosphorous to the combined amounts of the two cations, zinc and iron, in the reaction mixture will be 2.5:1, respectively.

Although generally less preferred, in certain embodiments the micronutrient phosphate is derived from a reaction mixture containing phosphoric acid and cations (other than protons) with the amount of phosphoric acid being greater than the stoichiometric amount required for the complete conversion of the cations to the corresponding dihydrogen phosphates. By way of example, if a polyphosphate is derived from a reaction mixture containing phosphoric acid and zinc with zinc being the only cation (other than protons) and the amount of the phosphoric acid being greater than the stoichiometric amount, the molar ratio of phosphorous to zinc in the reaction mixture will be greater than 2:1. By way of further example, if a polyphosphate is derived from a reaction mixture containing phosphoric acid, zinc and iron (in its divalent state) with zinc and iron being the only cations (other than protons) and the amount of the phosphoric acid being greater than the stoichiometric amount, the molar ratio of phosphorous to the combined amounts of the two cations, zinc and iron, in the reaction mixture will be greater than 2:1, respectively. By way of further example, if a polyphosphate is derived from a reaction mixture containing phosphoric acid and equimolar amounts of zinc and iron (in its trivalent state), with zinc and iron being the only cations (other than protons) and the amount of the phosphoric acid being greater than the stoichiometric amount, the molar ratio of phosphorous to the combined amounts of the two cations, zinc and iron, in the reaction mixture will be greater than 2.5:1, respectively.

In other, more preferred embodiments, the micronutrient phosphate is derived from a reaction mixture containing phosphoric acid and cations (other than protons) with the amount of phosphoric acid being less than the stoichiometric amount required for the complete conversion of the cations to the corresponding dihydrogen phosphates. By way of example, if a polyphosphate is derived from a reaction mixture containing phosphoric acid and zinc with zinc being the only cation (other than protons) and the amount of the phosphoric acid being less than the stoichiometric amount, the molar ratio of phosphorous to zinc in the reaction mixture will be less than 2:1. By way of further example, if a polyphosphate is derived from a reaction mixture containing phosphoric acid, and zinc and iron (in its divalent state), with zinc and iron being the only cations (other than protons) and the amount of the phosphoric acid being less than the stoichiometric amount, the molar ratio of phosphorous to the combined amounts of the two cations, zinc and iron, in the reaction mixture will be less than 2:1, respectively. By way of further example, if a polyphosphate is derived from a reaction mixture containing phosphoric acid and equimolar amounts of zinc and iron (in its trivalent state), with zinc and iron being the only cations (other than protons) and the amount of the phosphoric acid being less than the stoichiometric amount, the molar ratio of phosphorous to the combined amounts of the two cations, zinc and iron, in the reaction mixture will be less than 2.5:1, respectively.

In one preferred embodiment the reaction mixture contains less phosphoric acid than the stoichiometric amount required for the formation of zinc dihydrogen orthophosphate, the molar ratio of phosphorous to zinc in the reaction mixture being less than 2:1, and, in some embodiments, less than 1.9:1, respectively. In another exemplary embodiment, the molar ratio of phosphorous to zinc in the reaction mixture is less than 1.7:1, e.g., 1.67:1, respectively.

In another preferred embodiment the reaction mixture contains less phosphoric acid than the stoichiometric amount required for the formation of manganese dihydrogen orthophosphate, the molar ratio of phosphorous to manganese in the reaction mixture is less than 2:1, and, in some embodiments, less than 1.9:1, respectively.

In yet another preferred embodiment the reaction mixture contains less phosphoric acid than the stoichiometric amount required for the formation of iron dihydrogen orthophosphate, the molar ratio of phosphorous to iron in the reaction mixture being less than 3:1, and, in some embodiments, less than 2.95:1, respectively. In another exemplary embodiment, the molar ratio of phosphorous to iron in the reaction mixture is 2.85:1.

In one more preferred embodiment the reaction mixture contains less phosphoric acid than the stoichiometric amount required for the formation of copper dihydrogen orthophosphate, the molar ratio of phosphorous to copper in the reaction mixture being less than 2:1, and, in some embodiments, less than 1.95:1, respectively. In another exemplary embodiment, the molar ratio of phosphorous to copper in the reaction mixture is 1.9:1.

The polymerization step may be terminated when the product is soluble in about two weight percent citric acid or 0.01 normal hydrochloric acid. Without wishing to be bound by the theory, the product is preferably heated until just before it becomes insoluble in citric acid or 0.01 normal hydrochloric acid, as over-polymerization may cause insolubilization in acid and reduce the availability of the nutrients to plants.

The fertilizer product may be poured out of the reactor and cooled. When the product temperature reaches below about 90° C., water may be added to increase the product's fluidity; additionally, the fertilizer product may be stirred to further enhance and/or maintain fluidity. The fertilizer product may also be neutralized with a neutralizing base, dried and ground to a powder.

Preferable neutralizing bases include magnesium oxides, magnesium carbonates, calcium oxides, calcium carbonates, ammonium hydroxides, ammonium carbonates, sodium hydroxides, sodium carbonates and combinations thereof. A sufficient amount of neutralizing base may be added to bring the product's pH to between about 3 and about 7, alternatively between about 4 and about 5. Without wishing to be bound by the theory, the pH of neutralization determines the friability of the product. For example, neutralization to a pH of about 4 prior to drying, may produce a relatively highly friable product whereas neutralization to a pH of about 6 prior to drying may yield a product having a relatively low friability. Preferably, the fertilizer product is ground to an average particle size of less than about 200 mesh, alternatively less than about 150 mesh, alternatively less than about 100 mesh.

FIG. 1 provides an exemplary flow diagram for the preparation of micronutrient metal polyphosphates containing one or more primary micronutrient metals in accordance with one embodiment of the present invention. In a first step, the reactor is charged with phosphoric acid, and optionally a small amount of sulfuric acid. If less reactive metals (for example, zinc oxide and iron oxide), and (i) more reactive metals (for example, manganese carbonate, magnesium oxide; copper carbonate or (ii) molybdate or borate are to be included in the reaction mixture, the less reactive metals are preferably charged to the reaction mixture first, and allowed to dissolve for a period before the more reactive metals/molybdate or borate are added. After the micronutrients are charged to the reaction mixture, additional water is preferably added to the reaction mixture and the reaction mixture is then heated and stirred to produce a liquid having a flowable, but syrup-like viscosity. The reaction product is then removed from the reactor, allowed to cool, and neutralized. As illustrated, the reaction product is neutralized with ammonia, but other bases may be used as described elsewhere herein. The product is then dried and preferably pulverized to a solid, granular product having a size of less than 150 mesh. If desired, the product may be coated onto bentonite or fertilizer particles (e.g., a macronutrient fertilizer). It should be noted that the temperatures identified in the flow diagram for the various steps are merely exemplary; such steps may be carried out at other temperatures within the ranges described herein.

Figure 2:
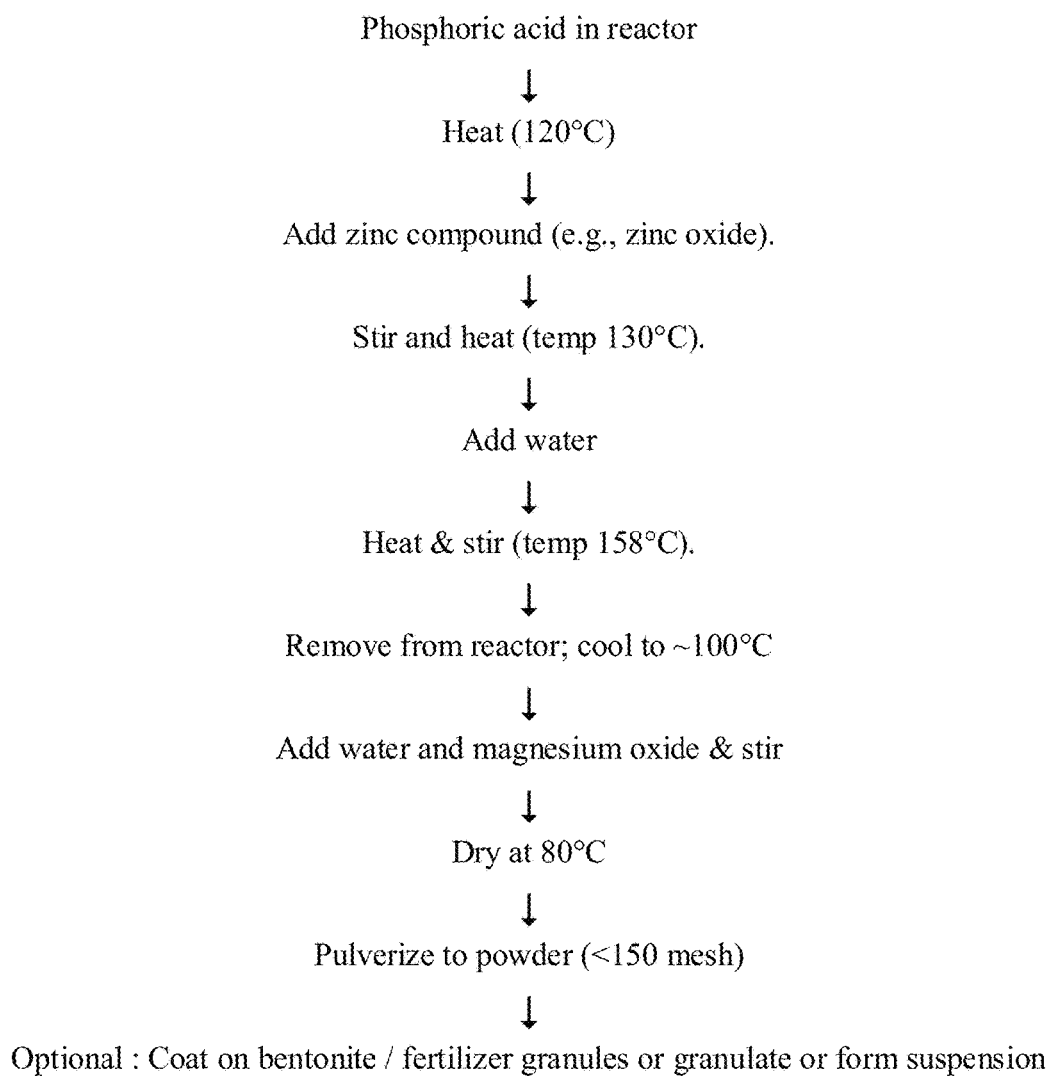
FIG. 2 is a flow diagram of one exemplary embodiment of a process for the preparation of a micronutrient metal polyphosphate composition of the present invention comprising zinc as a micronutrient.

FIG. 2 provides an exemplary flow diagram for the preparation of a micronutrient metal polyphosphate containing zinc as a micronutrient in accordance with one embodiment of the present invention. In a first step, the reactor is charged with phosphoric acid and a zinc source (e.g., zinc oxide) is introduced to form the reaction mixture. The reaction mixture is stirred and heated. After a period of time, additional water is preferably added to the reaction mixture and the reaction mixture is then heated and stirred for a period of time. The reaction product is then removed from the reactor, allowed to cool, and neutralized. As illustrated, the reaction product is neutralized with magnesium oxide, but other bases may be used as described elsewhere herein. The product is then dried and preferably pulverized to a solid, granular product having a size of less than 150 mesh. If desired, the product may be coated onto bentonite or fertilizer particles (e.g., a macronutrient fertilizer). It should be noted that the temperatures identified in the flow diagram for the various steps are merely exemplary; such steps may be carried out at other temperatures within the ranges described herein.

Figure 3:
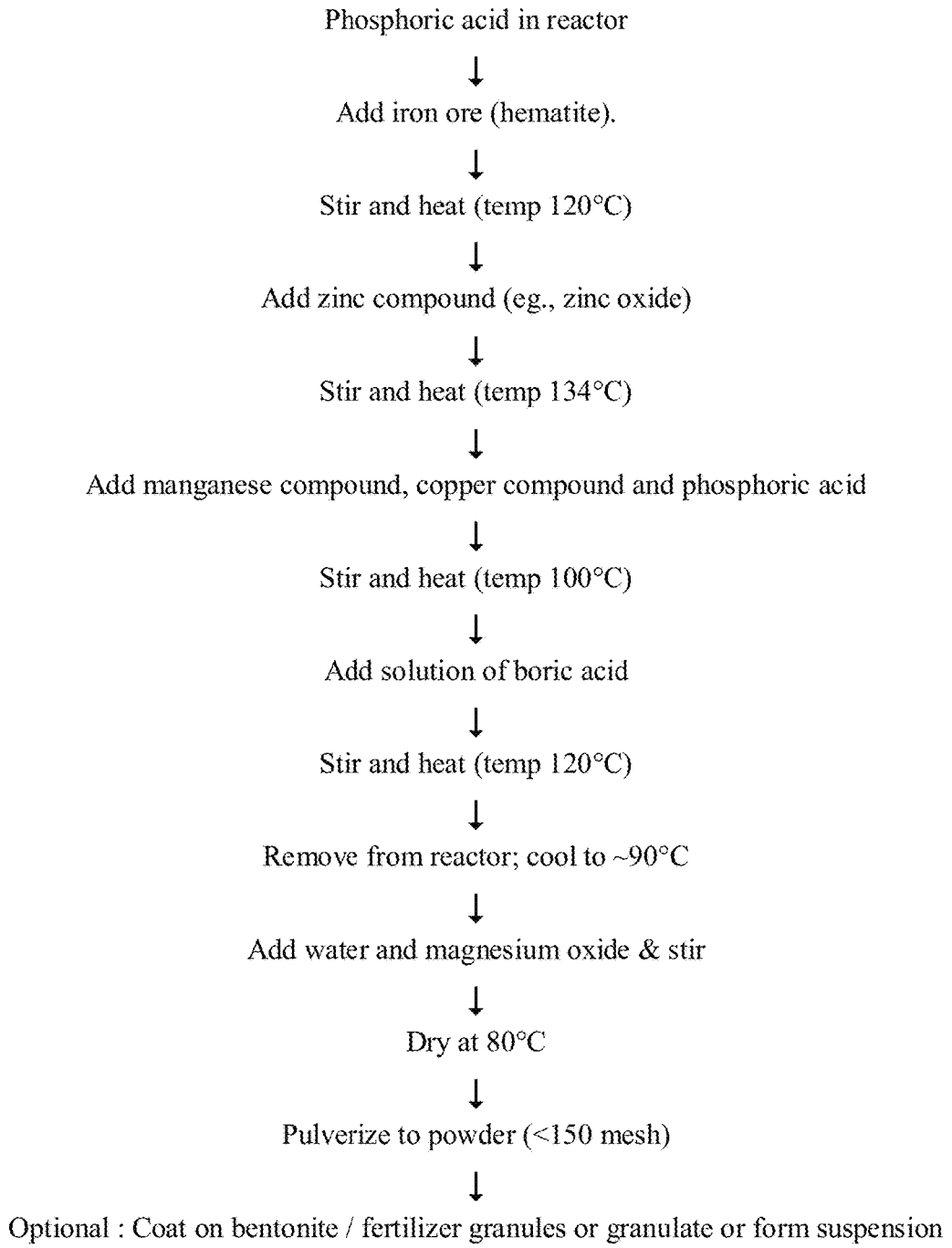
FIG. 3 is a flow diagram of one exemplary embodiment of a process for the preparation of a micronutrient metal polyphosphate composition of the present invention containing iron (derived from hematite) and zinc as micronutrients.

FIG. 3 provides an exemplary flow diagram for the preparation of a micronutrient metal polyphosphate containing iron, zinc, manganese, copper and boron as micronutrients in accordance with one embodiment of the present invention. In a first step, the reactor is charged with phosphoric acid and an iron source (e.g., hematite) is introduced to form the reaction mixture. The reaction mixture is preferably stirred and heated for a period before a zinc source (e.g., zinc oxide) is introduced to the reaction mixture. The reaction mixture is then heated and stirred for a period of time before a manganese source, a copper source and additional phosphoric acid is added to the reaction mixture. The reaction mixture is then heated and stirred for a period of time before a solution of boric acid is added to the reaction mixture. After the reaction mixture is heated and stirred for a period of time, the reaction product is removed from the reactor, allowed to cool, and neutralized. As illustrated, the reaction product is neutralized with magnesium oxide, but other bases may be used as described elsewhere herein. The product is then dried and preferably pulverized to a solid, granular product having a size of less than 150 mesh. If desired, the product may be coated onto bentonite or fertilizer particles (e.g., a macronutrient fertilizer). It should be noted that the temperatures identified in the flow diagram for the various steps are merely exemplary; such steps may be carried out at other temperatures within the ranges described herein.

Figure 4:
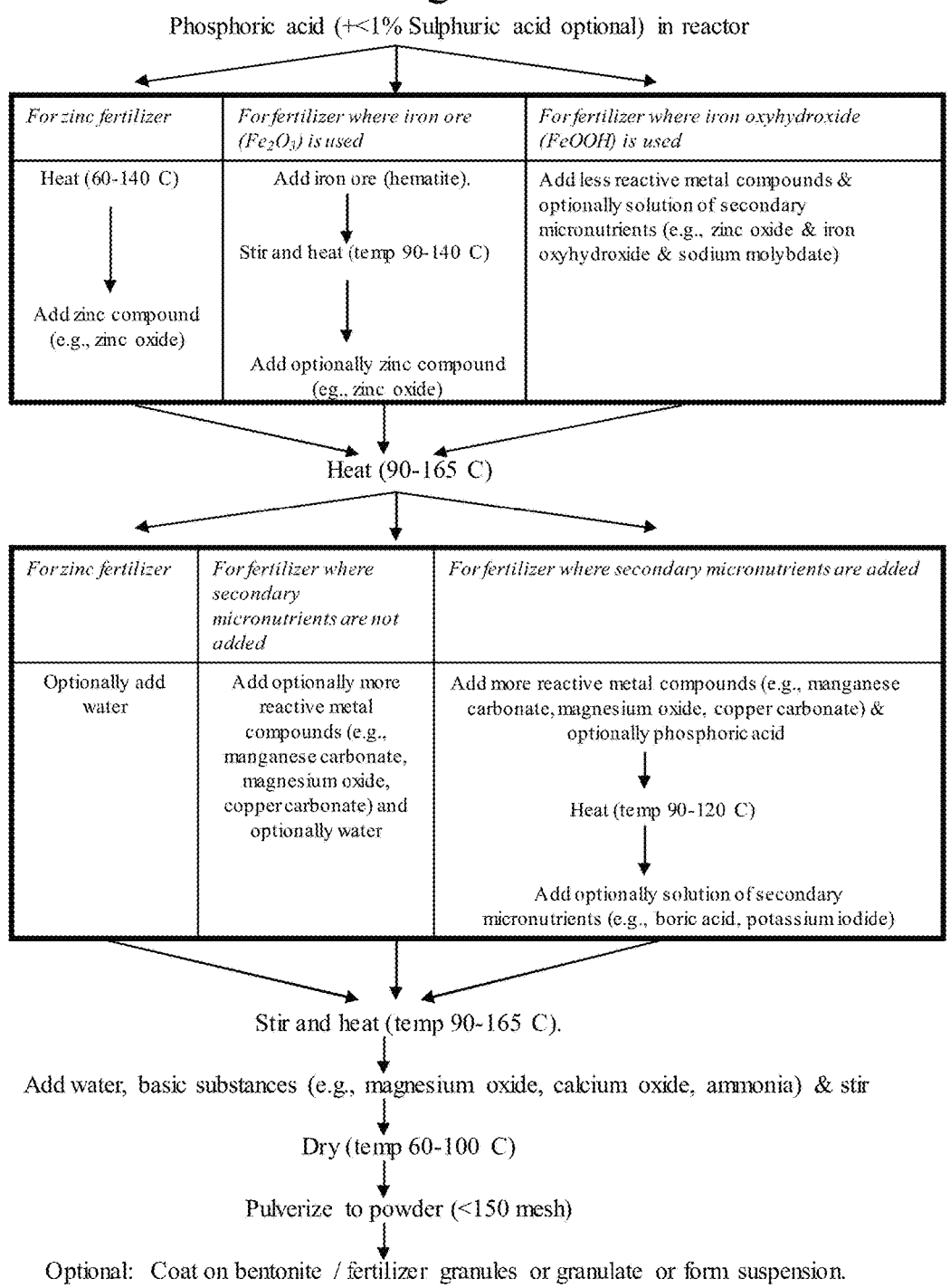
FIG. 4 is a flow diagram of exemplary embodiments of a process for the preparation of a micronutrient metal polyphosphate composition of the present invention containing any of the primary and secondary micronutrients identified herein.

FIG. 4 provides a more generalized, but still exemplary flow diagram more generalized for the preparation of a micronutrient metal polyphosphate containing any of the primary and secondary micronutrients. As previously described, phosphoric acid, and optionally a small amount of sulfuric acid is charged to the reactor. Depending upon the micronutrient(s) to be included, there are several options for the next step(s). In a first option, i.e., when zinc will be the only micronutrient, the phosphoric acid is heated before a zinc source (e.g., zinc oxide) is added. In a second option, i.e., when iron will be included as a micronutrient and iron ore ($Fe_2O_3$) is used as a source for the iron, the iron ore is introduced to the phosphoric acid, the reaction mixture is heated and stirred for a period, before a zinc source (e.g., zinc oxide) is optionally added. In a third option, i.e., when iron is optionally included as a micronutrient but the iron source is iron oxyhydroxide, the less reactive metal compounds and optionally solutions of secondary micronutrients are added to the reaction mixture. Upon completion of the first, second or third optional steps, the reaction mixture is heated for a period. Depending upon the micronutrient(s) to be included, the heating step is followed by three more options for the next step(s). In a first option, i.e., when zinc will be the only micronutrient, water is optionally added to the reaction mixture. In a second option, i.e., when secondary micronutrients are not to be included as a micronutrient, but more reactive metal sources are optionally included, the more reactive metal sources are added to the reaction mixture and additional water is optionally added. In a third option, i.e., when secondary micronutrients are to be included as a micronutrient, and more reactive metal sources are optionally included, the more reactive metal sources are added to the reaction mixture and additional phosphoric acid is optionally added, the mixture is heated, and a solution of secondary micronutrients are added. Upon completion of one of these three options, the reaction mixture is heated and stirred for a period of time, the reaction product is removed from the reactor, allowed to cool, and neutralized. As illustrated, the reaction product is neutralized with magnesium oxide, calcium oxide or ammonia, but other bases may be used as described elsewhere herein. The product is then dried and preferably pulverized to a solid, granular product having a size of less than 150 mesh. If desired, the product may be coated onto bentonite or fertilizer particles (e.g., a macronutrient fertilizer). It should be noted that the temperatures identified in the flow diagram for the various steps are merely exemplary; such steps may be carried out at other temperatures within the ranges described herein.

Utilization of Fertilizers

The powdered fertilizer product may be added to soil containing at least one plant to be fertilized. Alternatively, the powdered fertilizer product may be added to soil, which will receive at least one plant to be fertilized. Without wishing to be bound by the theory, root systems of the plants will release acids to absorb nutrients from the soil. Accordingly, as the root system of the plants require nutrients they release acids which dissolves the powdered fertilizer product and provides nourishment to the root system and plant.

The fertilizers may be mixed with various additives before being added to the soil. Suitable additives include other fertilizers, pesticides, agrichemicals, bentonite, and attapulgite. Non-limiting examples of other fertilizers include urea, diammonium phosphate and muriate of potash. Non-limiting examples of other pesticides include 2-4D, parathion, malation, and s-triazines. Non-limiting examples of other additives and agrichemicals include manure, gypsum, dolomite, and plant growth hormones.

Alternatively, the fertilizers may be used as a coating for granules of the above-listed other fertilizers, granules of china clay, bentonite, and attapulgite. Further, the fertilizers may be coated on seeds including soybean, corn and wheat. Still further, the fertilizers may be suspended, and added to the soil as a suspension. Furthermore, the fertilizers may be granulated alone or in combination with china clay, bentonite, attapulgite, or other fertilizers.

Another optional use of the fertilizers disclosed herein is as an animal feed supplement. The fertilizer may be mixed with animal feeds such as grain Having described the invention in detail, it will be apparent that modifications and variations are possible without departing the scope of the invention defined in the appended claims. The following non-limiting examples are provided to further illustrate the present invention and those of skill in the art should, in light of the present disclosure, appreciate that many changes can be made in the specific embodiments that are disclosed and still obtain a like or similar result without departing from the spirit and scope of the invention.

EXAMPLES

In the following examples, the following methods were used to characterize the materials:

Total micronutrient content: 50 milligrams of sample was dissolved in 3 milliliters of concentrated sulphuric acid by heating for a few minutes. The solution was diluted and filtered. Micronutrient in solution was analysed by atomic absorption spectroscopy.

Total phosphorus content: 50 milligrams of sample was fused with sodium hydroxide in a nickel crucible and taken into solution with water. Phosphorus was determined by the molybdenum blue color method. (Soil Chemical Analysis, M L Jackson, 1973, Prentice Hall, New Delhi).

Number Average chain length: the titrimetric method reported by Van Wazer was followed (Van Wazer, J. R. 1966. Phosphorus and its compounds, Vol. 1. Interscience, New York, N.Y.). For removing micronutrient metal cation interferences prior to titrimetric determination of polyphosphate chain length, the procedures described in the following reference were used: Ray S K, Chandra P K, Varadachari C and Ghosh K (1998) Journal of Agricultural & Food Chemistry [Americal Chemical Society] 46 2222-2226.).

For solubilities, mesh size of less than 150 mesh was used.

Water solubility: 50 milligrams of sample was placed in a conical flask and 50 milliliters of water was added to it. This was placed in a rotary shaker for 10 minutes, then filtered washed and made to volume. Micronutrient in solution was analysed by atomic absorption spectroscopy. Amount of micronutrient solubilized was expressed as a percentage of total micronutrient determined as described above.

Citrate solubility: 50 milligrams of samples were placed in each of four conical flask s and 25 milliliters of 2 wt. % citric acid was added to each flask. These were placed in a rotary shaker for 5, 10, 15, 30 and 60 minutes. They were then filtered washed and made to volume. Micronutrient in solution was analysed by atomic absorption spectroscopy. The amount of micronutrient solubilized was expressed as a percentage of total micronutrient determined as described above.

DTPA solubility: Solubility of the samples in 0.005 M DTPA was determined as described above for citrate solubility, except that shaking periods were for 30, 60, 90, 120 and 180 minutes.

0.1N HCl solubility: Solubility of the samples in 0.1N HCl was determined as described above for citrate solubility, except that shaking periods were for 30, 60 and 90 minutes.

pH: pH of the fertilizers was recorded on a pH meter in a 1:10 fertilizer:water suspension.

Nuclear Magnetic Resonance: P31 NMR of solid samples were recorded.

Infrared spectra: IR spectra of powdered samples were recorded using KBr as matrix.

Viscosity: Kinematic viscosity was recorded in a temperature controlled bath as per ASTM standards.

X-ray diffraction: XRD of the powdered sample was recorded in a X-ray diffractometer using Cu $K_\alpha$ radiation at a scan rate of 2° 2 theta per minute.

Example 1

Zinc Fertilizer

Molar Ratio Zn:P=1:1.75. $NH_4OH$ Neutralized

The fertilizer of this example one was produced from phosphoric acid and zinc oxide in the molar ratio Zn:P=1:1.75. Commercial grade phosphoric acid (58.5% $P_2O_5$), 21.2 grams, was placed in a beaker and 8.4 grams zinc oxide (80% Zn) was added. Two milliliters of water was added and the suspension was stirred with a glass rod. It was then heated in a muffle furnace at 140° C. After 30 minutes the zinc oxide dissolved and a nearly clear solution was obtained (some white crystals were observed, possibly due to precipitation of zinc phosphates). The temperature of the liquid at this stage was 120° C. The beaker was removed from the furnace and 3 milliliters of water was added to it, and stirred. The beaker was placed once more in the furnace and heated further for another 30 minutes and then removed. At this stage, the liquid had the consistency of a thick syrup and the reactant temperature was 135° C.

A small sample was taken after the polymerization reaction and tested for solubility in 2% citric acid. The sample dissolved completely within 10 minutes. After removing the sample from the furnace it was allowed to cool to about 85° C. Then, two milliliters of water was added. When the liquid had cooled to room temperature, a liquor ammonia solution (25% $NH_3$) was added in a stream with continuous stirring. During this period the beaker was placed in a water bath filled with water at room temperature. Sufficient ammonia solution was added (24 milliliters) to raise the pH of the suspension to between 3.5 and 4.0. At this stage a white suspension was formed. The product was poured in a drying dish and dried in an oven at 75° C. After it was dry, the sample was ground by hand in a mortar. It was sieved through a 150 mesh sieve.

On analysis, the product showed 24.5 weight percent zinc and 20.3 weight percent phosphorous. The ratio of equivalent of Zn:P was 0.381. The solubility of the product in 2 weight percent citric acid was 100% of the total in less than 10 minutes. In 0.005M DTPA, 100% of the total dissolved in less than 45 minutes. Solubility of the product in 2% citric acid and 0.005M DTPA with respect to the total zinc solubilized by 0.1N HCl was 100%.

Example 2

Zinc Fertilizer

Molar Ratio Zn:P=1:1.75. $NH_4OH$ and MgO Neutralized

This sample was prepared similarly to Example 1, except that the fertilizer product was neutralized with 2 grams of magnesium oxide (60%) and 15 milliliters liquor ammonia (25% $NH_3$), to a pH of 4. It was then dried as described above and ground by hand. The product yield was 30.2 grams and the zinc content of the product was 22.3 weight %. The product was light and could be more easily ground than the sample which was neutralized with ammonia alone.

Example 3

Zinc Fertilizer Production (Prototype Scale)

Molar Ratio Zn:P=1:1.75; $NH_4OH$ Neutralized

The reactor vessel was a silica brick-lined MS vessel with a stirrer and electrical heaters. 10 kilograms of phosphoric acid (58.5% $P_2O_5$) was poured into the vessel. 3.92 kilograms of zinc oxide was then added with stirring. One liter of water was then added and heating was started. When the liquid temperature reached 125° C., the sample was nearly clear except for some crystals of zinc phosphates.

Three liters of water were thereafter added to the liquid and heating was continued. The liquid became syrupy when its temperature had increased to 135° C. Heating was stopped and the liquid was poured into a neutralization vessel. The vessel was made of SS 316L, and was equipped with a stirrer. It was double-walled with a water-cooling arrangement. When the temperature of the liquid came down to around 85° C., 2 liters of water was added, and it was stirred. A liquor ammonia solution (25% $NH_3$) was then added in a slow stream while stirring continued, and the pH of the suspension reached 3.5 to 4.0. 8.5 liters of ammonia solution was required.

The suspension was poured into trays and dried in an oven at 75° C. The dried mass was ground in a pulverizer and sieved through 150 mesh. The product yield was 10.2 kilograms. The solubility properties of this product were as described in Example 1.

Example 4

Multinutrient Fertilizer Production (Lab Scale)

Zn:Fe:Mn:Cu:Mg:P Molar Ratio of 1:0.36:0.18:0.08:0.13:3.68

The fertilizer was produced from phosphoric acid, zinc oxide (80% Zn), yellow oxide of iron (62.2% Fe), manganese carbonate (47.8% Mn), and cupric hydroxide carbonate (54% Cu). The total amount of phosphoric acid was 1.9 moles phosphorus for every mole of divalent action and 2.85 moles phosphorus for every mole of trivalent cation. Accordingly, the total amount of phosphoric acid was [1.9*(mole zinc+mole manganese+mole copper+mole magnesium)]+[2.85*mole iron]. This amount was less than the stoichiometric requirement for the complete conversion of cations to the dihydrogen orthophosphates.

90.4 grams of phosphoric acid (58.5% $P_2O_5$) was placed into a beaker, and to it zinc oxide (16.34 grams) and iron oxyhydroxide (6.37 grams) were added. The beaker was heated in a furnace at 140° C. After 55 minutes a deep tea colored solution was obtained. The temperature of the liquid was 130° C. The sample was taken out of the furnace and manganese carbonate (4.18 grams), cupric carbonate (1.85 grams) and magnesium oxide (1.33 grams) were added and stirred followed by 10 milliliters of water. The beaker was then again placed in the furnace and heated for 15 minutes. At the end of this period, the solution was dirty green in color, had a temperature of 117° C., and was a flowable liquid. The solution was allowed to cool to about 80° C., and 75 milliliters of water was added and stirred. Finally an ammonia solution was added as before, until a pH of 5.0 to 5.5 was reached. About 76 milliliters of ammonia was required.

The sample was then dried, ground and sieved as described above. The product yield from this batch was 110.1 grams. The product sample had 11.8 weight percent Zn, 3.6 weight percent Fe, 1.8 weight percent Mn, 0.9 weight percent Cu, 0.73 weight percent Mg, 20.8 weight percent P and 13.9 weight percent N. The ratio of equivalent of (Zn+Fe+Mn+Cu) to equivalent of P was 0.322. The solubility of the Zn Fe, Mn and Cu from the product in 2 weight percent citric acid was more than 95% of the total in 30 minutes and in 0.005M DTPA was more than 95% of the total in 60 minutes. Solubility of the Zn Fe, Mn and Cu from the product in 2% citric acid in 30 minutes and 0.005M DTPA in 60 minutes was more than 98% of with respect to that solubilized by 0.1N HCl.

Example 5

Multinutrient Fertilizer (Lab Prototype Scale)

Zn:Fe:Mn:Cu:Mg:P Molar Ratio
1:0.41:0.24:0.1:0.2:4.07

10 kilograms of phosphoric acid (58.5% $P_2O_5$) was placed in the same reactor vessel, and 1.654 kilograms zinc oxide (80% Zn) and 0.736 kilograms iron oxyhydroxide (62.2% Fe) were added to it. The vessel was heated until the yellow color of iron oxyhydroxide was no longer visible, and the liquid temperature reached 120° C. (about 110 minutes). Then heating was stopped and 0.552 kilograms manganese carbonate (47.8% Mn), 0.244 kilograms cupric hydroxide carbonate (54% Cu) and 0.153 kilograms magnesium oxide (60% Mg) were added with stirring. 1.3 liters of water was added and the reactants were heated once more with stirring. When the liquid temperature reached 100° C., and the color was dirty green, the heating was stopped (40 minutes). The liquid was poured out into a neutralizing vessel, as described in Example 3. As liquid temperature came down to 80° C., 6 liters of water was added and stirred. Then 1.68 kilograms of magnesium oxide was added whereupon a suspension was formed and its pH was 4. This was mixed well in a blender and dried in a tray drier at 80° C. The dried material was powdered in a pulverizer to 150 mesh. The product was dried and ground as described for the zinc fertilizer.

Figure 5:
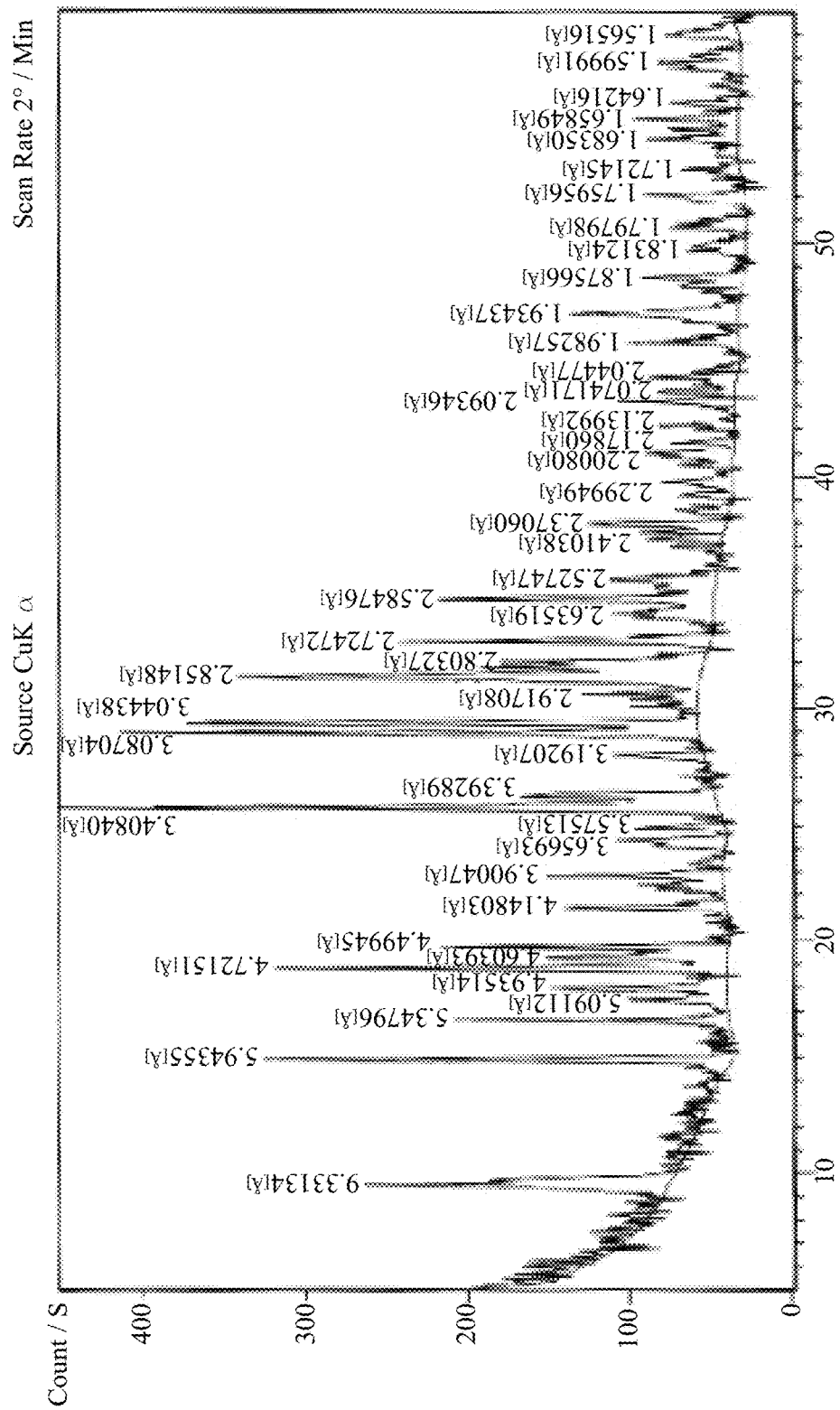
FIG. 5 shows the x-ray diffraction diagram for micronutrient polyphosphate material prepared in Example 5.

The product included 9.5 weight percent zinc, 3.35 weight percent iron, 1.85 weight percent manganese, 0.93 weight percent copper, 7.8 weight percent magnesium and 18 weight percent phosphorus. Number average chain length of the product was 6.47. The ratio of equivalent of (Zn+Fe+Mn+Cu) to equivalent of P was 0.320. The solubility of the Zn Fe, Mn and Cu from the product in 2 weight percent citric acid and in 0.005M DTPA in 30 minutes was more than 90% of the total. Solubility of the Zn, Fe, Mn and Cu from the product in 2% citric acid in 30 minutes and 0.005M DTPA in 60 minutes was more than 95% of with respect to that solubilized by 0.1N HCl. The pH of this fertilizer was 4.3. P31 nuclear magnetic resonance (NMR) showed polyphosphate peaks at 55.787, 29.869, 18.162, 1.694, −5.771, −23.103, −46.935, −73.888 ppm. Infrared absorptions showed peaks at 3274.9, 2402.9, 1656.7, 1060.2, 532.5 $cm^{-1}$. The x-ray diffraction diagram for the product appears in FIG. 5.

Example 6

Multinutrient Fertilizer Production (Lab Prototype Scale)

Zn:Fe:Mn:Cu:Mg:P Molar Ratio
1:1.17:1.19:0.51:0.81:10

This process was similar to Example 5, described above. 10 kilograms of phosphoric acid was used. 0.676 kilograms zinc oxide (80% Zn) and 0.86 kilograms iron oxyhydroxide (62.2% Fe) were added initially. The liquid temperature at the first stage of heating was about 120° C. At the second stage, 1.13 kilograms manganese carbonate (47.8% Mn), 0.5 kilograms cupric hydroxide carbonate (54% Cu), 0.27 kilograms magnesium oxide (60% Mg) and 1.2 liters of water were added. Heating was stopped when the liquid temperature reached 110° C. The steps described in Example 5 were then followed.

Example 7

Iron Fertilizer Using Yellow Oxide of Iron (Goethite)

Molar Ratio Fe:P=1:2.85. $NH_4OH$ Neutralized

The fertilizer of this example was produced from phosphoric acid, yellow oxide of iron and magnesium oxide. The total amount of phosphorus from phosphoric acid was 2.85 moles phosphorus for every mole of iron. Accordingly, the total amount of phosphorus from phosphoric acid was [2.85*mole iron]. This amount was less than the stoichiometric requirement for the complete conversion of iron to the dihydrogen orthophosphates.

87 grams of phosphoric acid (58.5% $P_2O_5$) and 16.1 grams of goethite (62.2% Fe) were placed into a beaker, which was placed in an oil bath and heated for 20 minutes with constant stirring until the liquid temperature reached 120° C. Then 20 milliliters of water was added and heating was continued till the liquid temperature reached 134° C. Then it was then taken out of the heating unit and when the liquid temperature dropped to 90° C., 20 milliliters of water were added with stirring. Then 98 milliliters of 12% ammonia was added. This was mixed well in a blender and dried in a tray drier at 60° C. The dried material was powdered in a pulveriser to 150 mesh.

On analysis the product showed 10.1 weight percent iron and 16 weight percent phosphorous. The ratio of equivalent of Fe to equivalent of P was 0.351 Number average chain length of the product was 7.1. The product dissolved 91% of total iron in 2 weight percent citric acid in 60 minutes and 85% of total iron in 0.005M DTPA in 120 minutes. With respect to its solubility in 0.1N HCl, it dissolved 96% of total iron in 2 weight percent citric acid in 60 minutes and 90% of total iron in 0.005M DTPA in 120 minutes. The pH of this product was 5.5.

Example 8

Multinutrient Fertilizer Production Using Iron Ore (Lab Scale)

Zn:Fe:Mn:Cu:Mg:P Molar Ratio
1:0.41:0.24:0.1:0.2:4.07

The fertilizer of this example was produced from phosphoric acid, zinc oxide, iron ore fines (hematite), manganese carbonate, cupric hydroxide carbonate and magnesium oxide. The total amount of phosphoric acid was 1.9 moles phosphorus for every mole of divalent action and 2.85 moles phosphorus for every mole of trivalent cation. Accordingly, the total amount of phosphoric acid was [1.9*(mole zinc+mole manganese+mole copper+mole magnesium)]+[2.85*mole iron]. This amount was less than the stoichiometric requirement for the complete conversion of cations to the dihydrogen orthophosphates.

296 grams of phosphoric acid (58.5% $P_2O_5$) and 30.2 grams of hematite (46.3% Fe) were placed into a beaker, which was placed in an oil bath and heated for 20 minutes with constant stirring until the liquid temperature reached 120° C. Then 50 grams of ZnO (80% Zn) was added to it and heating was continued for 15 minutes until the liquid temperature reached 134° C. At this stage, heating was stopped and 16.7 grams of $MnCO_3$ (47.8% Mn), 7.4 grams of $CuCO_3.Cu(OH)_2$ (54% Cu), 4.6 grams of MgO (60% Mg) and 100 milliliters of water were added with stirring. The temperature of the liquid dropped upon the addition of water. The liquid was heated again for 30 minutes with constant stirring until the liquid temperature reached 120° C. At this stage the viscosity of the liquid was 29 centipoise. It was then taken out of the heating unit and when the liquid temperature dropped to 90° C., 150 milliliters of water was added with stirring. Then 551 milliliters of 12% ammonia solution was added whereupon a suspension was formed and its pH was 4. This was mixed well in a blender and dried in a tray drier at 80° C. The dried material was powdered in a pulverizer to 150 mesh. The pH of this product was 4.4. Alternately, magnesite (a magnesium carbonate ore) or commercial magnesium carbonate could have been added to partly neutralize the suspension to pH of about 3. Then MgO could have been added to complete the neutralization and raise the pH to about 4.

The product included 9.5 weight percent zinc, 3.35 weight percent iron, 1.85 weight percent manganese, 0.93 weight percent copper, 7.8 weight percent magnesium and 18 weight percent phosphorus. Solubility properties of this product were as described in Example 5.

Example 9

Multinutrient Fertilizer with Boron (Lab Scale)

Zn:Fe:Mn:Cu:B:P Molar Ratio:
1:0.58:0.29:0.26:0.75:4.84

In this example, the total amount of phosphoric acid was the sum of the amount of phosphoric acid used for the cations and the amount used to form the polyborophosphate. The total requirement after compensating for phosphate required to bond with boron was estimated as: total mole P=A+B where A=[1.9*(mole zinc+mole manganese+mole copper)]+[2.85*mole iron] and B=[0.3*mole B].

800 grams of phosphoric acid (58.5% $P_2O_5$) and 104 grams of hematite (46.3% Fe) were added to a borosilicate glass beaker, which was placed in an oil bath and heated for 5 minutes with constant stirring until the liquid temperature reached 120° C. Then 120 grams of ZnO was added to it and heated continuously for 10 minutes until the liquid temperature reached 134° C. At this stage heating was stopped and 50.2 grams of $MnCO_3$ (47.8% Mn), 44.4 grams of $CuCO_3.Cu(OH)_2$ (54% Cu) and 41 grams of $H_3PO_4$ (58.5% $P_2O_5$) were added with stirring. The temperature of the liquid dropped upon the addition of these substances. The liquid was heated again with constant stirring for 20 minutes until the liquid temperature reached 100° C. Then a solution of 68.6 grams of boric acid (17.4% B) in 50 milliliters of water was added to it and heating was continued for 40 minutes until its temperature reached 120° C. The liquid was allowed to cool to about 90° C. and 150 milliliters of water was added with stirring. Then 275 grams of magnesium carbonate (40% Mg) and 65 grams of magnesium oxide (60% Mg) were added whereupon a light green suspension was formed and its pH was 4. This was mixed well with a blender and dried in a tray drier at 80° C. The dried material was powdered in a pulverizer to 100 mesh.

Figure 6:
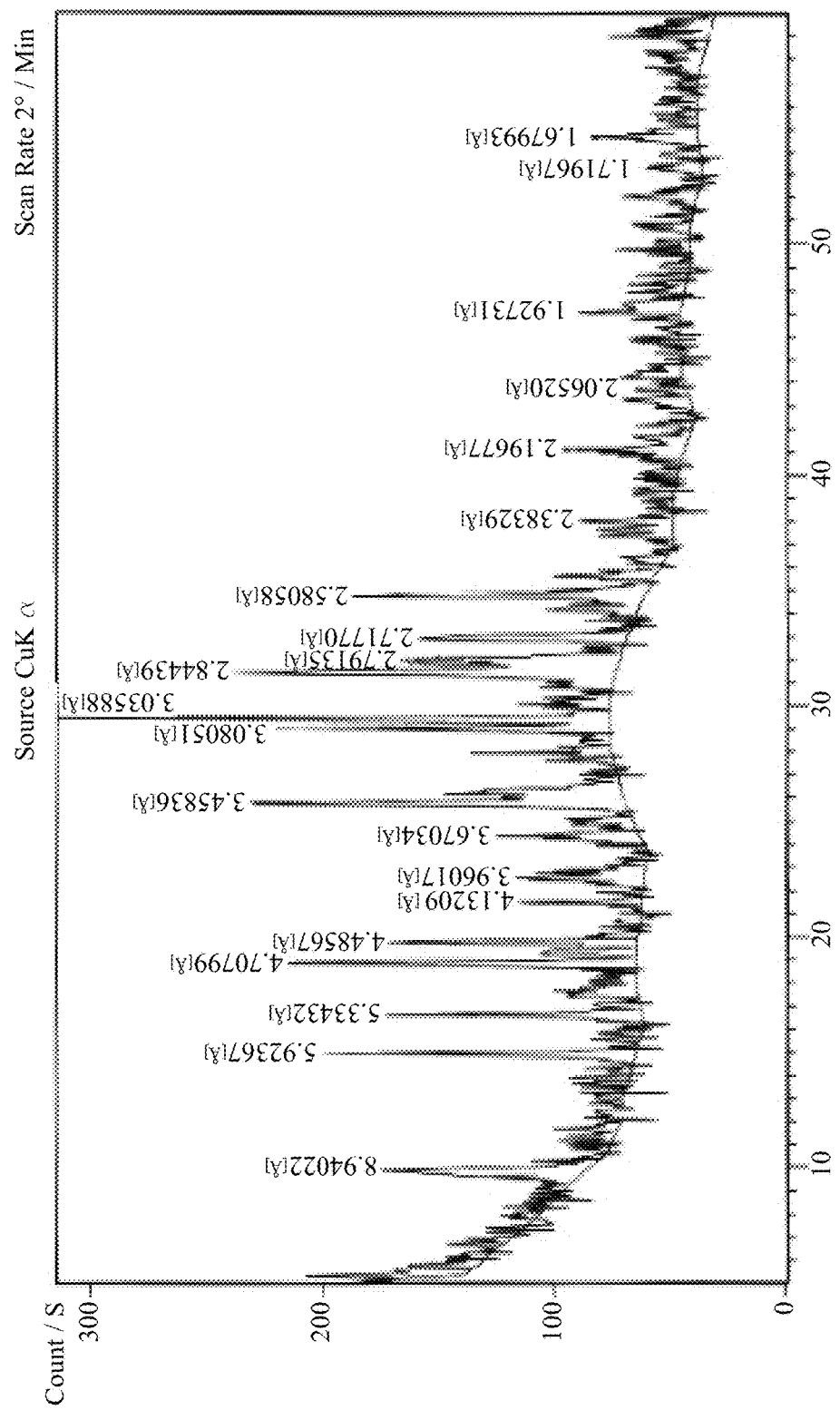
FIG. 6 shows the x-ray diffraction diagram for micronutrient polyphosphate material prepared in Example 9.

The product included 7.4 weight percent zinc, 3.7 weight percent iron, 1.8 weight percent manganese, 1.85 weight percent copper, 9.5 weight percent magnesium, 0.9 weight percent boron and 17 weight phosphorus. The ratio of equivalent of (Zn+Fe+Mn+Cu+B) to equivalent of P was 0.491. The pH of this product was 4.8. The product dissolved 100% of total Zn, 83% of total Fe, 88% of total Mn and 85% of total Cu in 2 wt. % citric acid in 60 minutes. In 0.005 M DTPA in 120 minutes more than 86% of the total Zn, Fe, Mn and Cu dissolved. Dissolution of all cations was more than 95% with respect to its dissolution in 0.1N HCl. In water 0.7% of total Zn and 0.5% of total Fe was solubilized. P31 nuclear magnetic resonance (NMR) showed polyphosphate peaks at 169.521, 137.24, 104.154, 70.686, 33.895, 0.508, −32.443, −65.222, −97.74 ppm. Infrared spectra showed absorptions at 3285.5, 2401.9, 1656.5, 1067.4, 525.1 $cm^{-1}$. The x-ray diffraction diagram for the product appears in FIG. 6 and the reflections are listed in Table 1.

Example 10

Multinutrient Fertilizer with Molybdenum Production (Lab Scale)

Zn:Fe:Mn:Mo:P Molar Ratio 1:2.34:1.19:0.05:11.4

In this example, the amount of phosphoric acid was the total amount of phosphoric acid used for the cations plus the amount used to form the polymolybdophosphate. The total requirement, after compensating for phosphate required to bond with molybdenum, was estimated as: total mole P=A+B where A=[1.9*(mole zinc+mole manganese)]+[2.85*mole iron] and B=[10*mole Mo].

521 grams of phosphoric acid (58.5% $P_2O_5$) and 84.4 grams of goethite (FeOOH, 62.2% Fe) and 33 grams of ZnO (80% Zn) were added to a borosilicate glass beaker. Then, a solution was made from 2.33 grams of sodium carbonate, 3.18 grams of molybdenum trioxide (66.6% Mo) and 50 milliliters of water. This solution was added to the phosphoric acid mixture. It was placed on a gas burner and heated with constant stirring for 30 minutes until the liquid temperature reached 134° C. At this stage, heating was stopped and 55.5 grams of $MnCO_3$ (47.8% Mn) and 26.7 grams of $H_3PO_4$ (55.85% $P_2O_5$) were added with stirring. The temperature of the liquid dropped upon the addition of these substances. The liquid was heated again with constant stirring for 45 minutes until the liquid temperature reached 120° C. The liquid was allowed to cool to about 90° C. and 100 milliliters of water was added with stirring. Then 100 grams of magnesium oxide was added whereupon a light yellow brown was formed and its pH was 4. This was mixed well with a blender and dried in a tray drier at 80° C. The dried material was powdered in a pulveriser to 150 mesh. It was light yellow in color.

Figure 7:
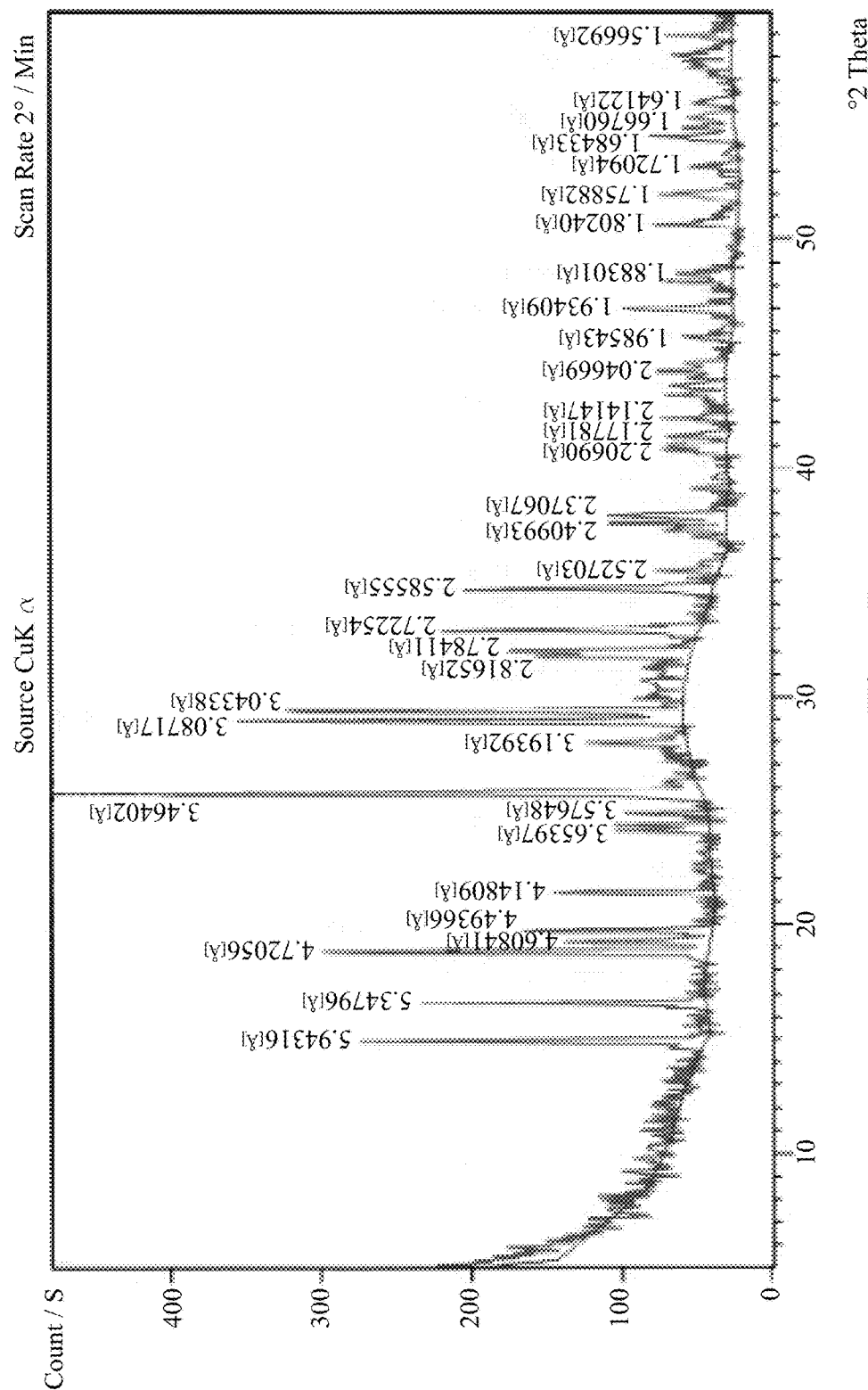
FIG. 7 shows the x-ray diffraction diagram for micronutrient polyphosphate material prepared in Example 10.

The product included 3.7 weight percent zinc, 7.4 weight percent iron, 3.7 weight percent manganese, 9.1 weight percent magnesium, 0.3 weight percent molybdenum and 20 weight percent phosphorus. The ratio of equivalent of (Zn+Fe+Mn+Mo) to equivalent of P was 0.344. The pH of this product was 5.2. The product dissolved more than 80% each of the total of Zn, Fe, Mn and Cu in 2 wt. % citric acid in 60 minutes and with respect to 0.1N HCl more than 84% of each cation was dissolved. In 0.005 M DTPA in 120 minutes more than 85% of the total Zn, Fe, Mn and Cu dissolved and with respect to 0.1N HCl more than 94% of each cation was dissolved. In water 0.4% of total Zn and 0.6% of total Fe was solubilized. Infrared (IR) spectrum gave absorptions at 3282.6, 2401.7, 1656.8, 1169.5, 1062.8, 895.6, 645.8, 519 cm$^{-1}$. The x-ray diffraction diagram for the product appears in FIG. 7 and the reflections are listed in Table 1.

Example 11

Zinc Fertilizer Production

Zn:P=1:1.67, MgO Neutralized, Final Temperature 158° C.

The fertilizer of this example was produced from phosphoric acid (58.5% $P_2O_5$) and zinc oxide (80% Zn) in the molar ratio Zn:P=1:1.67. Commercial grade phosphoric acid (58.5% $P_2O_5$), 246 grams, was placed in a borosilicate beaker. It was heated in an oil bath for 20 minutes until the temperature of the acid reached 120° C. Then 99 grams of commercial grade zinc oxide (80% Zn) was added to it with continuous stirring of the mixture. Heating and stirring were continued for 5 minutes until the temperature of the liquid was 130° C. Then 15 milliliters of water was added to the liquid with stirring. Further heating was done for 15 minutes until the temperature of the liquid reached 158° C. At this stage the viscosity of the liquid was 160 centipoise. The beaker was then taken out of the heating unit; there were a few white particles in the liquid, which was otherwise nearly transparent. When the liquid temperature cooled to 100° C., 100 milliliters of water was added to it with stirring. Then 50 grams of magnesium oxide (60% Mg) was added whereupon a white suspension was formed. This was mixed well in a blender and dried in a tray drier at 80° C. The dried material was powdered in a pulverizer to pass through 150 mesh.

Figure 8:
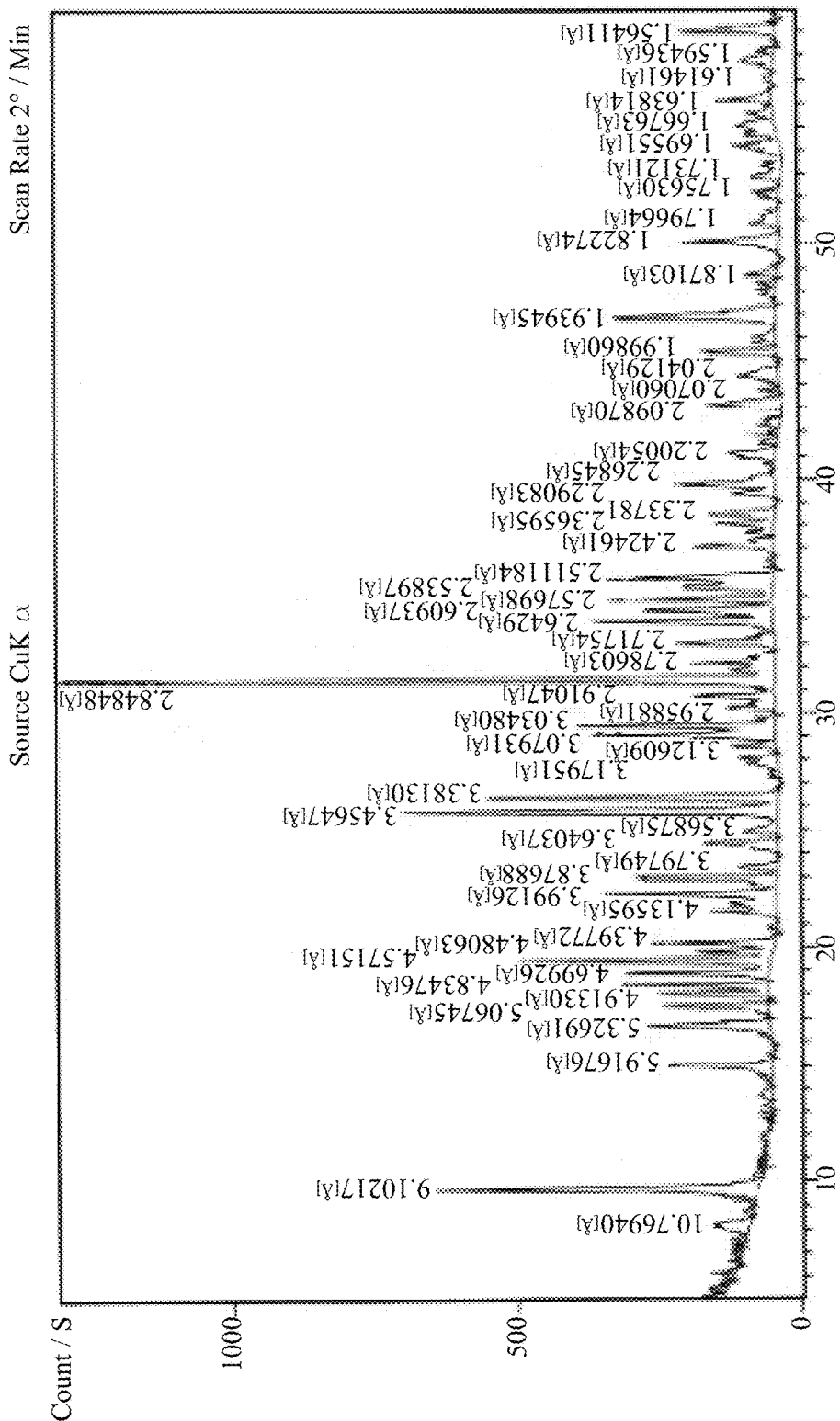
FIG. 8 shows the x-ray diffraction diagram for micronutrient polyphosphate material prepared in Example 11.

The product yield from this batch was 315 grams. The product included 24.9 weight percent zinc, 7.3 weight percent magnesium and 19.6 weight percent phosphorous. The ratio of equivalents of Zn to equivalents of P was 0.4. In 2 weight percent citric acid the product released 98% of total zinc in less than 5 minutes and 100% of total zinc in less than 10 minutes. In 0.005 molar DTPA the product released 100% of zinc in 35 minutes. With respect to the total in 0.1N HCl the fertilizer dissolved 100% of Zn in 2 weight percent citric acid and 0.005M DTPA. In 1N ammonium oxalate at pH 8.5, the product released 100% of zinc in 60 minutes. In water 0.24% of total Zn and 7.4% of total P was solubilized. P31 nuclear magnetic resonance (NMR) showed polyphosphate peaks at 47.02, 39.389, 29.08, 21.896, 11.215, 4.403, −0.553, −5.846, −13.22, −19.423, −23.49, −28.607, −30.467, −40.802, −46.241 ppm. Infrared (IR) spectrum gave absorptions at 3283.3, 2401.7 1657.9, 1070.6, 940, 640.9 cm$^{-1}$. The x-ray diffraction diagram for the product appears in FIG. 8 and a list of the reflections appears in Table 1.

Example 12

Zinc Fertilizer Production

Zn:P=1:2 NH$_4$OH Neutralized Final Temperature 158° C.

The fertilizer of this example was produced from phosphoric acid and zinc oxide in the molar ratio Zn:P=1:2. This sample was prepared similarly to Example 11, except that the amount of phosphoric acid taken was 122 grams for 41 grams of zinc oxide and the polyphosphate was neutralized with 150 milliliters of 12% ammonia, to a pH of 4 instead of magnesium oxide used in Example 11. It was then dried as described above and ground by hand. Drying time of this product was four times longer than with the product that was neutralized with magnesium oxide.

Figure 9:
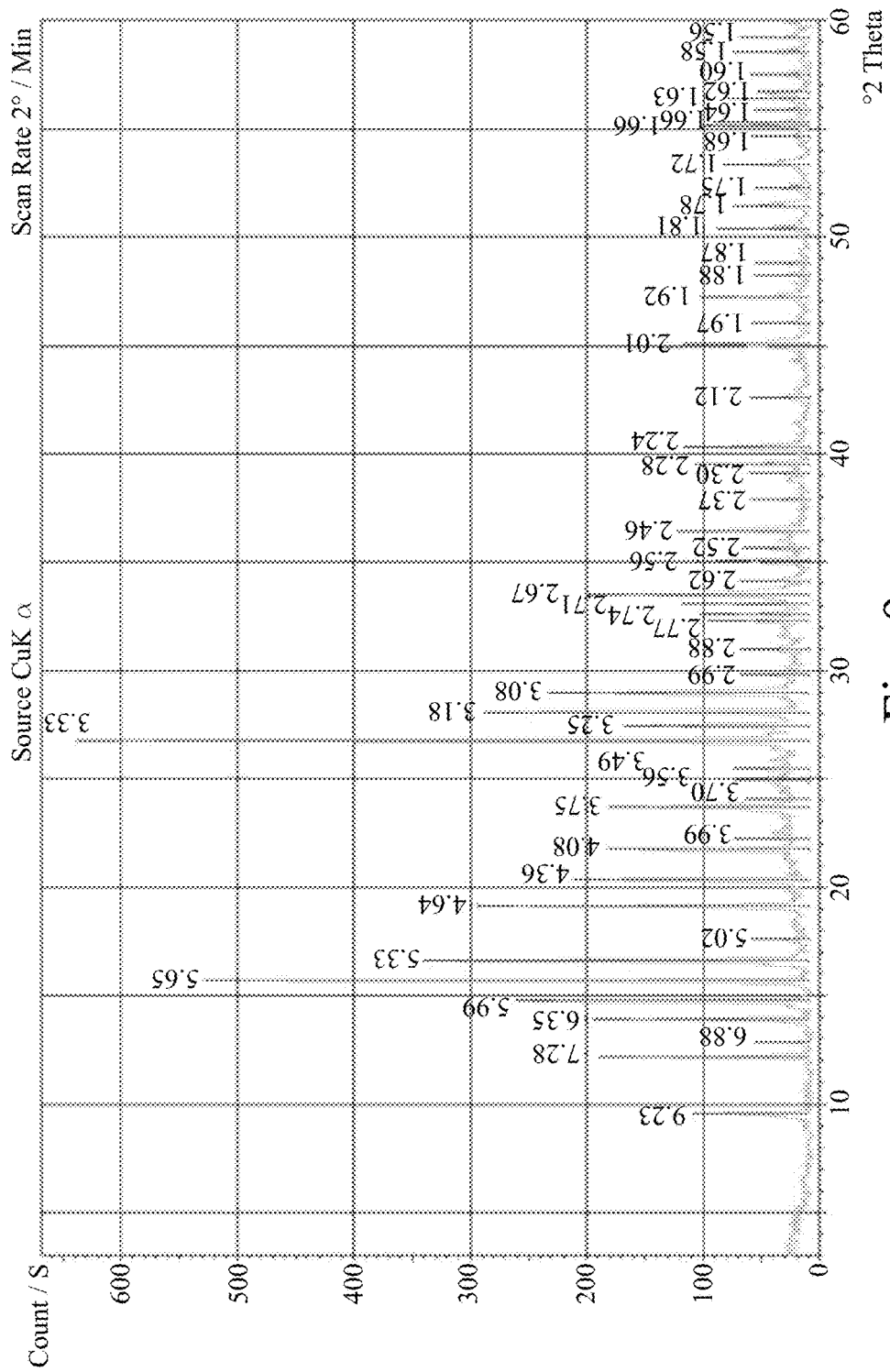
FIG. 9 shows the x-ray diffraction diagram for micronutrient polyphosphate material prepared in Example 12.

The product included 23 weight percent zinc, 8.1 weight percent ammonium and 21.8 weight percent phosphorous. The ratio of the equivalents of zinc to equivalents of phosphorus for this product was 0.33. The pH of this product was 4.4. The number average chain length of this product was 6.7. In 2 weight percent citric acid the product released 100% of total zinc in less than 5 minutes. In 0.005 M DTPA the product released 100% of total zinc in 35 minutes. The amount released with respect to the zinc released by 0.1N HCl was 100%. In 1N ammonium oxalate at pH 8.5, the product released 98% of zinc in 45 minutes. In water, 2.9% Zn was solubilized. Infrared (IR) spectrum gave absorptions at 3253.8, 2373, 1657, 1446.6, 1079.1, 561 cm$^{-1}$. The x-ray diffraction diagram for the product appears in FIG. 9 and a list of the reflections appears in Table 1.

Example 13

Zinc Fertilizer Production

Zn:P=1:2.2, CaO Neutralized, Final Temperature 158° C.

The fertilizer of this example was produced from phosphoric acid and zinc oxide in the molar ratio Zn:P=1:2.2. This sample was prepared similarly to Example 11, except that the amount of phosphoric acid taken was 134 grams for 41 grams of zinc oxide and the polyphosphate was neutralized with 36 grams of calcium oxide (70% Ca), to a pH of 4 instead of magnesium oxide used in Example 11. It was then dried as described above and ground by hand. Drying time of this product was about half that with the product that was neutralized with magnesium oxide.

Figure 10:
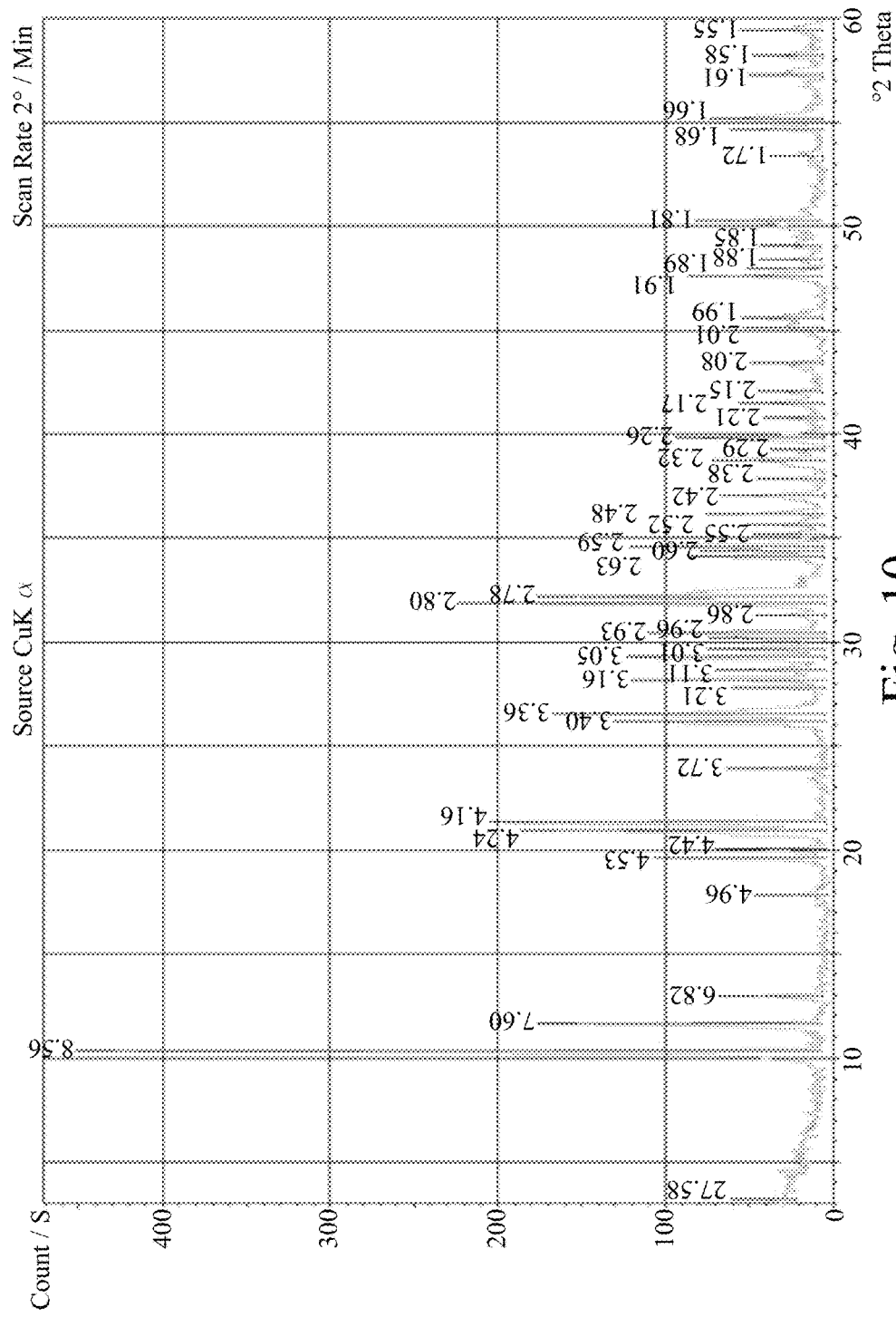
FIG. 10 shows the x-ray diffraction diagram for micronutrient polyphosphate material prepared in Example 13.

The product included 21.8 weight percent zinc, 13.7 weight percent calcium and 22.7 weight percent phosphorous. The ratio of the equivalents of zinc to equivalents of phosphorus for this product was 0.303. The pH of this product was 7.25. In 2 weight percent citric acid, the product released 99% of total zinc in less than 5 minutes and 100% in less than 10 minutes. In 0.005 M DTPA the product released 99% of total zinc in 30 minutes. The amount released with respect to the zinc released by 0.1N HCl was 100%. In water, 0.46% Zn was solubilized. Number average chain length of the product was 4.5. The x-ray diffraction diagram for the product appears in FIG. 10 and a list of the reflections appears in Table 1.

Example 14

Zinc Fertilizer Production

Zn:P=1:2, CaO Neutralized, Final Temperature 190° C.

The fertilizer of this example was produced from phosphoric acid and zinc oxide in the molar ratio Zn:P=1:2. Commercial grade phosphoric acid (58.5% $P_2O_5$), 122 grams, was placed in a borosilicate beaker. It was heated in an oil bath for 20 minutes until the temperature of the acid reached 120° C. Then 41 grams of commercial grade zinc oxide (80% Zn) was added to it with continuous stirring of the mixture. Heating and stirring were continued for 5 minutes until the temperature of the liquid was 130° C. Then 5 milliliters of water was added to the liquid with stirring. Further heating was done for 60 minutes until the temperature of the liquid reached 190° C. The beaker was then taken out of the heating unit; it was a clear transparent liquid with no white particles in it. When the liquid temperature cooled to 100° C., 100 milliliters of water was added to it with stirring. Then 30 grams of calcium oxide (70% Ca) was added whereupon a white suspension was formed. This was mixed well in a blender and dried in a tray drier at 70° C. The dried material was powdered in a pulverizer to pass through 150 mesh. The drying time of this fertilizer was about twice as fast as with the sample neutralized with magnesium oxide.

Figure 11:
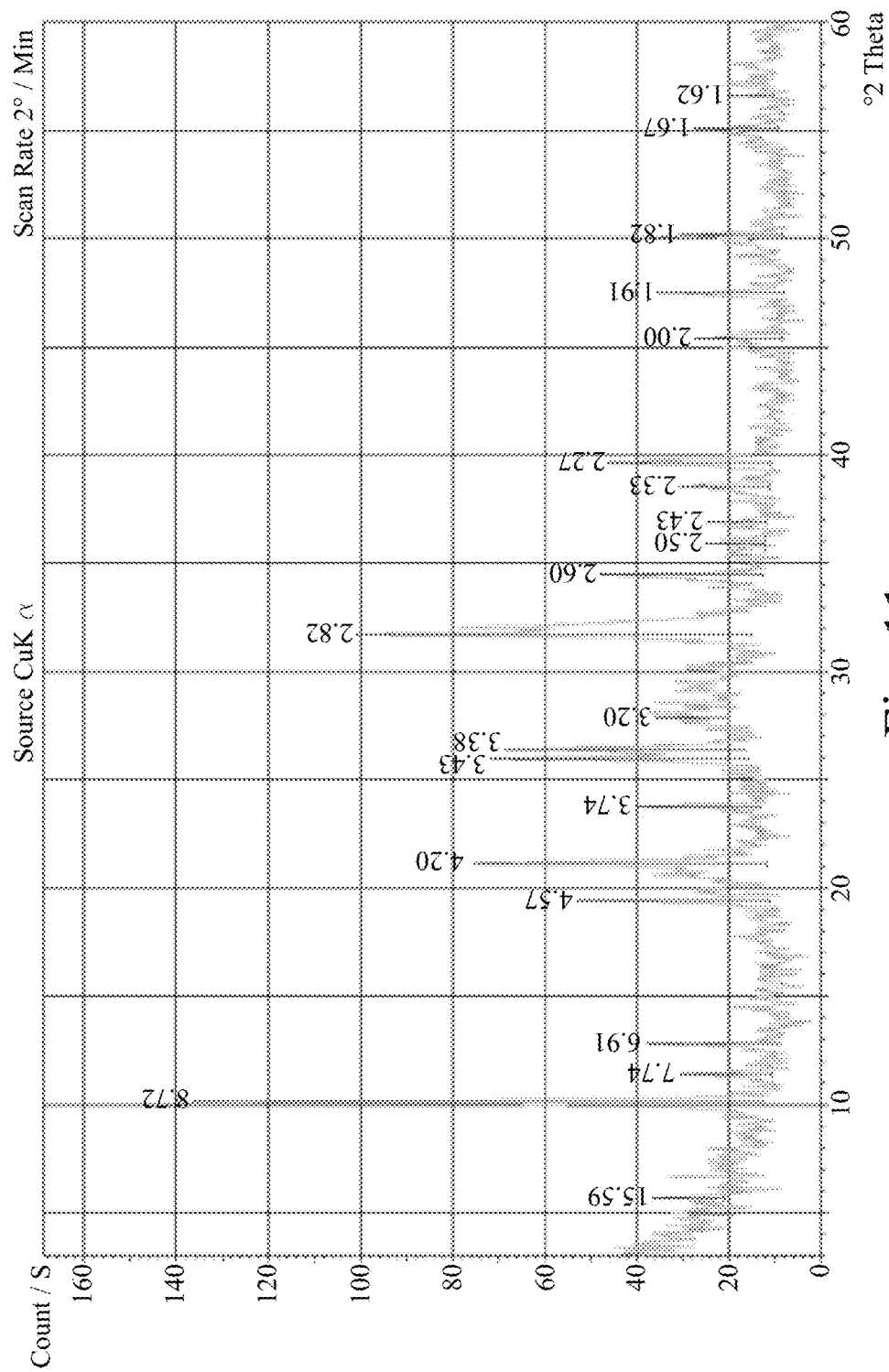
FIG. 11 shows the x-ray diffraction diagram for micronutrient polyphosphate material prepared in Example 14.

The product included 27.2 weight percent zinc, 14.2 weight percent calcium and 25.7 weight percent phosphorous. The ratio of the equivalents of zinc to equivalents of phosphorus for this product was 0.33. The pH of this product was 7.4. In 2 weight percent citric acid, the product released 100% of zinc in less than 5 minutes. In 0.005 M DTPA, the product released 100% of zinc in 30 minutes. In water, 0.89% Zn was solubilized. Number average chain length of the product was 5.5. The x-ray diffraction diagram for the product appears in FIG. 11 and a list of the reflections appears in Table 1.

Example 15

Zinc Fertilizer Production

Zn:P=1:2, CaO Neutralized, Final Temperature 140° C.

The fertilizer of this example was produced from phosphoric acid and zinc oxide in the molar ratio Zn:P=1:2. This sample was prepared similarly to Example 11, except that the amount of phosphoric acid taken was 122 grams for 41 grams of zinc oxide. Final stage of heating was done for 20 minutes until the temperature of the liquid reached 140° C. At this stage the viscosity of the liquid was 49 centipoise. A clear transparent liquid was obtained. When the liquid temperature cooled to 100° C., 100 milliliters of water was added to it with stirring. Then 32 grams of calcium oxide (70% Ca) was added whereupon a white suspension was formed. This was mixed well in a blender and dried in a tray drier at 70° C. The dried material was powdered in a pulverizer to pass through 150 mesh.

Figure 12:
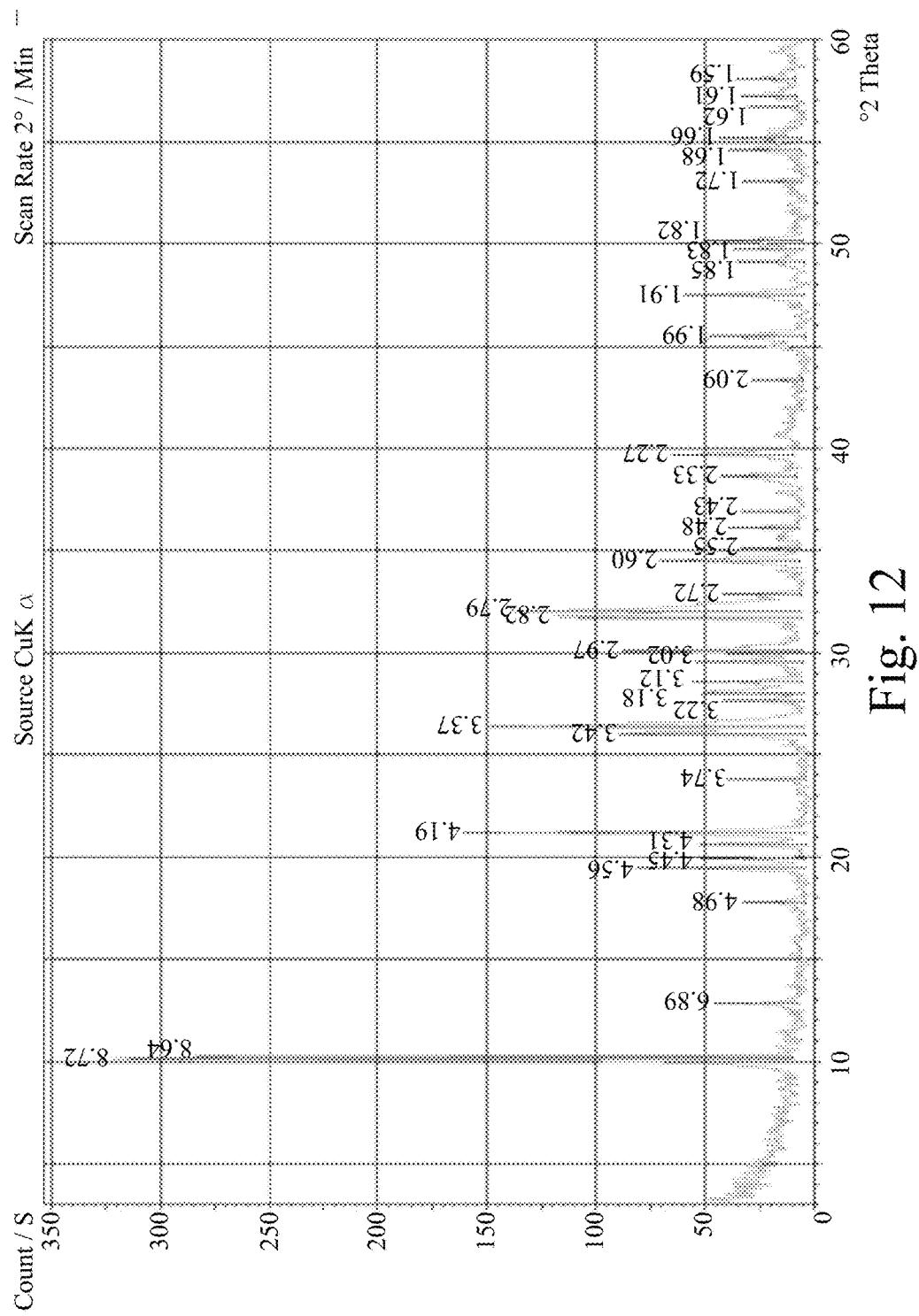
FIG. 12 shows the x-ray diffraction diagram for micronutrient polyphosphate material prepared in Example 15.

The product included 22.1 weight percent zinc, 12.8 weight percent calcium and 20.9 weight percent phosphorous. The ratio of the equivalents of zinc to equivalents of phosphorus for this product was 0.33. In 2 weight percent citric acid the product released 100% of zinc in less than 5 minutes. In 0.005 M DTPA, the product released 100% of zinc in 30 minutes. In water, 0.24% Zn was solubilized. Number average chain length of the product was 4.2. The x-ray diffraction diagram for the product appears in FIG. 12 and a list of the reflections appears in Table 1.

Example 16

Zinc-Iron Fertilizer Production

Zn:Fe:P Molar Ratio 1:1.17:5.09

The fertilizer of this example was produced from phosphoric acid, zinc oxide, iron ore fines (hematite) and magnesium oxide. The total amount of phosphoric acid was 1.75 moles phosphorus for every mole of zinc and 2.85 moles phosphorus for every mole of iron. Accordingly, the total amount of phosphoric acid was [1.75*mole zinc]+[2.85*mole iron]. This amount was less than the stoichiometric requirement for the complete conversion of cations to the dihydrogen orthophosphates.

95 grams of phosphoric acid (58.5% $P_2O_5$) and 21.6 grams of hematite (46.3% Fe) were placed into a beaker, which was placed in an oil bath and heated for 15 minutes with constant stirring until the liquid temperature reached 120° C. Then 12.5 grams of ZnO was added to it and heating was continued for 5 minutes until the liquid temperature reached 130° C. Then 30 milliliters water was added and heating was continued for 40 minutes till the temperature reached 125° C. At this stage, it was taken out of the heating unit and when the liquid temperature dropped to 80° C., 75 milliliters of water were added with stirring. Then 16 grams of magnesium oxide (60% Mg) was added whereupon a suspension was formed and its pH was 4. This was mixed well in a blender and dried in a tray drier at 70° C. The dried material was powdered in a pulveriser to pass through 150 mesh.

Figure 13:
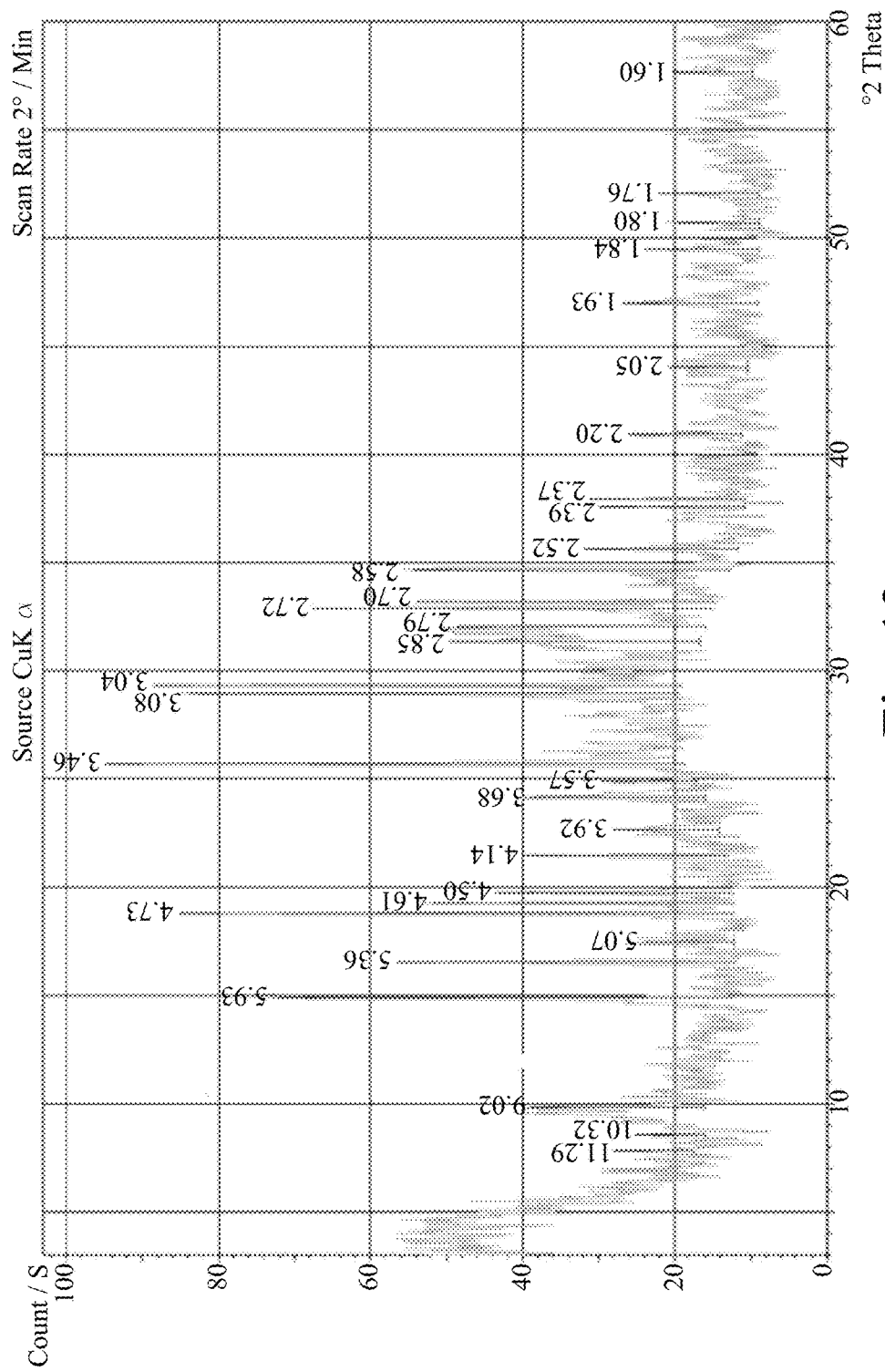
FIG. 13 shows the x-ray diffraction diagram for micronutrient polyphosphate material prepared in Example 16.

The product included 9.5 weight percent zinc, 9.6 weight percent iron, 9.1 weight percent magnesium and 22.8 weight percent phosphorus. The ratio of the equivalents of (Zn+Fe) to equivalents of phosphorus for this product was 0.365. The pH of this product was 5.8. In 2 weight percent citric acid the product released 90% of total zinc and 87% of total Fe in 60 minutes. Dissolution in citric acid with respect to the amount dissolved by 0.1N HCl was over 95% for both zinc and iron. In water, 0.72% of total Zn and 0.03% of total Fe was solubilized. The x-ray diffraction diagram for the product appears in FIG. 13 and a list of the reflections appears in Table 1.

Example 17

Zinc-Manganese Fertilizer Production

Zn:Mn:P=1:0.6:2.8

The fertilizer of this example was produced from phosphoric acid, zinc oxide, manganese carbonate and calcium oxide. The total amount of phosphoric acid was 1.75 moles phosphorus for every mole of zinc and 1.75 moles phosphorus for every mole of manganese. Accordingly, the total amount of phosphoric acid was [1.75*(mole zinc+mole manganese)]. This amount was less than the stoichiometric requirement for the complete conversion of cations to the dihydrogen orthophosphates.

Commercial grade phosphoric acid (58.5% $P_2O_5$), 104 grams, was placed in a borosilicate beaker. It was heated in an oil bath for 15 minutes until the temperature of the acid reached 120° C. Then 25 grams of commercial grade zinc oxide (80% Zn) was added to it with continuous stirring of the mixture. Heating and stirring were continued for 5 minutes until the temperature of the liquid was 130° C. Then 15 milliliters of water was added to the liquid with stirring. Further heating was done for 10 minutes until the temperature of the liquid reached 140° C. Then heating was stopped and 21 grams manganese carbonate (47.8% Mn) and 50 milliliters of water were added with stirring. Heating was continued for 60 minutes till the temperature of the liquid reached 150° C. At this stage, it was taken out of the heating unit and when the liquid temperature dropped to 90° C., 100 milliliters of water were added with stirring. Then 25 grams of calcium oxide (70% Ca) was added whereupon a suspension was formed and its pH was 5. This was mixed well in a blender and dried in a tray drier at 70° C. The dried material was powdered in a pulverizer to pass through 150 mesh.

Figure 14:
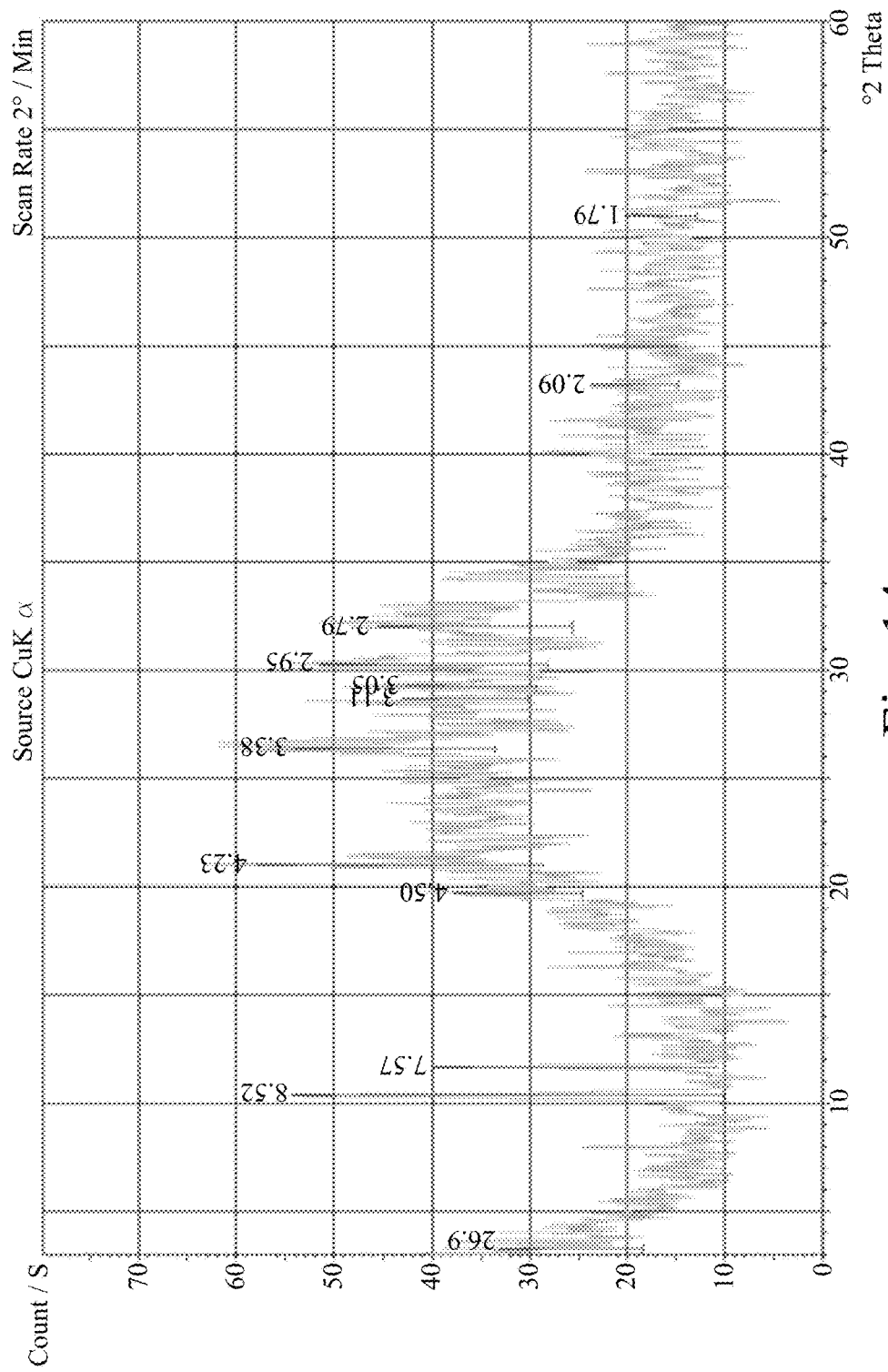
FIG. 14 shows the x-ray diffraction diagram for micronutrient polyphosphate material prepared in Example 17.

The product included 13.9 weight percent zinc, 6.7 weight percent manganese, 11.8 weight percent calcium and 18.4 weight percent phosphorus. The ratio of the equivalents of (Zn+Mn) to equivalents of phosphorus for this product was 0.38. The pH of this product was 5.8. In 2 weight percent citric acid the product released 100% of total zinc and 100% of total manganese in less than 5 minutes. In 0.005 M DTPA, the product released 100% of total zinc and 100% of total manganese in 10 minutes. The solubility of the product in water was 0.28% Zn and 5.2% Mn. The x-ray diffraction diagram for the product appears in FIG. 14 and a list of the reflections appears in Table 1.

Example 18

Zinc-Boron Fertilizer Production

Zn:B:P=1:0.3:1.75

The fertilizer of this example was produced from phosphoric acid, zinc oxide, boric acid and magnesium oxide. The total amount of phosphoric acid was 1.75 moles phosphorus for every mole of zinc. Accordingly, the total amount of phosphoric acid was [1.75*(mole zinc)]. This amount was less than the stoichiometric requirement for the complete conversion of cations to the dihydrogen orthophosphates.

Commercial grade phosphoric acid (58.5% $P_2O_5$), 65 grams, was placed in a borosilicate beaker. It was heated in an oil bath for 15 minutes until the temperature of the acid reached 120° C. Then 25 grams of commercial grade zinc oxide (80% Zn) was added to it with continuous stirring of the mixture. Heating and stirring were continued for 5 minutes until the temperature of the liquid was 130° C. Then 10 milliliters of water was added to the liquid with stirring. Further heating was done for 20 minutes until the temperature of the liquid reached 150° C. In a separate beaker, 5.72 grams boric acid (17.4% B) was dissolved in 30 milliliters boiling water. This solution of boric acid was added to the first solution. Heating was continued for 20 minutes till the temperature of the liquid reached 110° C. At this stage, it was then taken out of the heating unit and when the liquid temperature dropped to 80° C., 100 milliliters of water were added with stirring. Then 16 grams of magnesium oxide (60% Mg) was added whereupon a suspension was formed and its pH was 4. This was mixed well in a blender and dried in a tray drier at 80° C. The dried material was powdered in a pulveriser to pass through 150 mesh.

Figure 15:
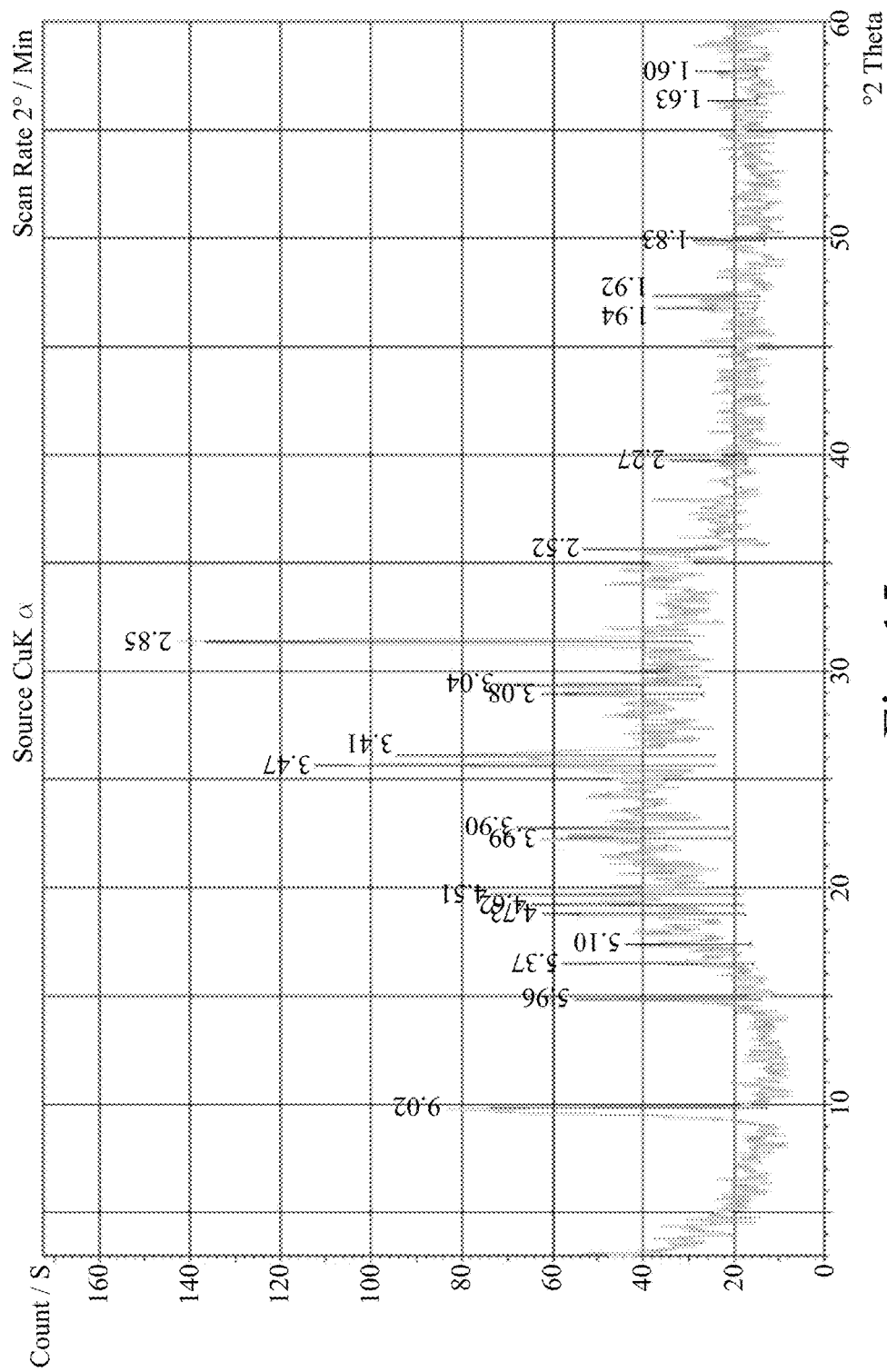
FIG. 15 shows the x-ray diffraction diagram for micronutrient polyphosphate material prepared in Example 18.

The product included 22.2 weight percent zinc, 1.1 weight percent boron, 10.7 weight percent magnesium and 18.5 weight percent phosphorus. The ratio of the equivalents of (Zn+B) to equivalents of phosphorus for this product was 0.55. The pH of this product was 6.7. In 2 weight percent citric acid, the product released 100% of total zinc and 100% of total boron within 10 minutes. In 0.005 M DTPA, the product released 100% of zinc in 30 minutes. The solubility of the product in water was 0.4% of total Zn. The x-ray diffraction diagram for the product appears in FIG. 15 and a list of the reflections is as follows: 9.02, 5.96, 5.37, 5.10, 4.73, 4.62, 4.51, 3.99, 3.9, 3.47, 3.41, 3.08, 3.04, 2.85, 2.52, 2.27, 1.94, 1.92, 1.83, 1.63, 1.6 Å.

Example 19

Zinc:Iron:Manganese Fertilizer Production Using Red Oxide of Iron (Hematite)

Zn:Fe:Mn:P Molar Ratio (1:2.34:1.2:10.85)

The fertilizer of this example was produced from phosphoric acid, zinc oxide, iron ore fines (hematite), manganese carbonate and ammonium hydroxide. The total amount of phosphoric acid was 1.9 moles phosphorus for every mole of zinc, 1.5 moles phosphorus for every mole of manganese and 2.85 moles phosphorus for every mole of iron. Accordingly, the total amount of phosphoric acid was [1.9*(mole zinc)+1.9*(mole manganese)]+[2.85*mole iron]. This amount was less than the stoichiometric requirement for the complete conversion of cations to the dihydrogen orthophosphates.

100 grams of phosphoric acid (58.5% $P_2O_5$) and 21.6 grams of hematite (46.3% Fe) were placed into a beaker, which was placed in an oil bath and heated for 20 minutes with constant stirring until the liquid temperature reached 120° C. Then 20 milliliters of water was added and heating was continued till the liquid temperature reached 120° C. The process was continued till substantially all of the hematite was completely dissolved (as visually observed by the absence of red coloration when a drop of the liquid was added to 25 milliliters of 2% citric acid and stirred; a yellow color solution is produced when hematite has reacted completely). A total heating period of 70 minutes was required. When the hematite was observed to be dissolved, and the liquid temperature reached 120° C., then 6.25 grams of ZnO was added to it and heating was continued for 15 minutes until the liquid temperature reached 130° C. Then heating was stopped and 10.5 grams manganese carbonate (47.8% Mn) and 50 milliliters of water were added with stirring. Heating was continued for 30 minutes till the temperature of the liquid reached 115° C. At this stage, it was then taken out of the heating unit and when the liquid temperature dropped to 90° C., 100 milliliters of water were added with stirring. Then 110 milliliters of 12% ammonium hydroxide was added. This was mixed well in a blender and dried in a tray drier at 80° C. The dried material was powdered in a pulveriser to 100 mesh.

Figure 16:
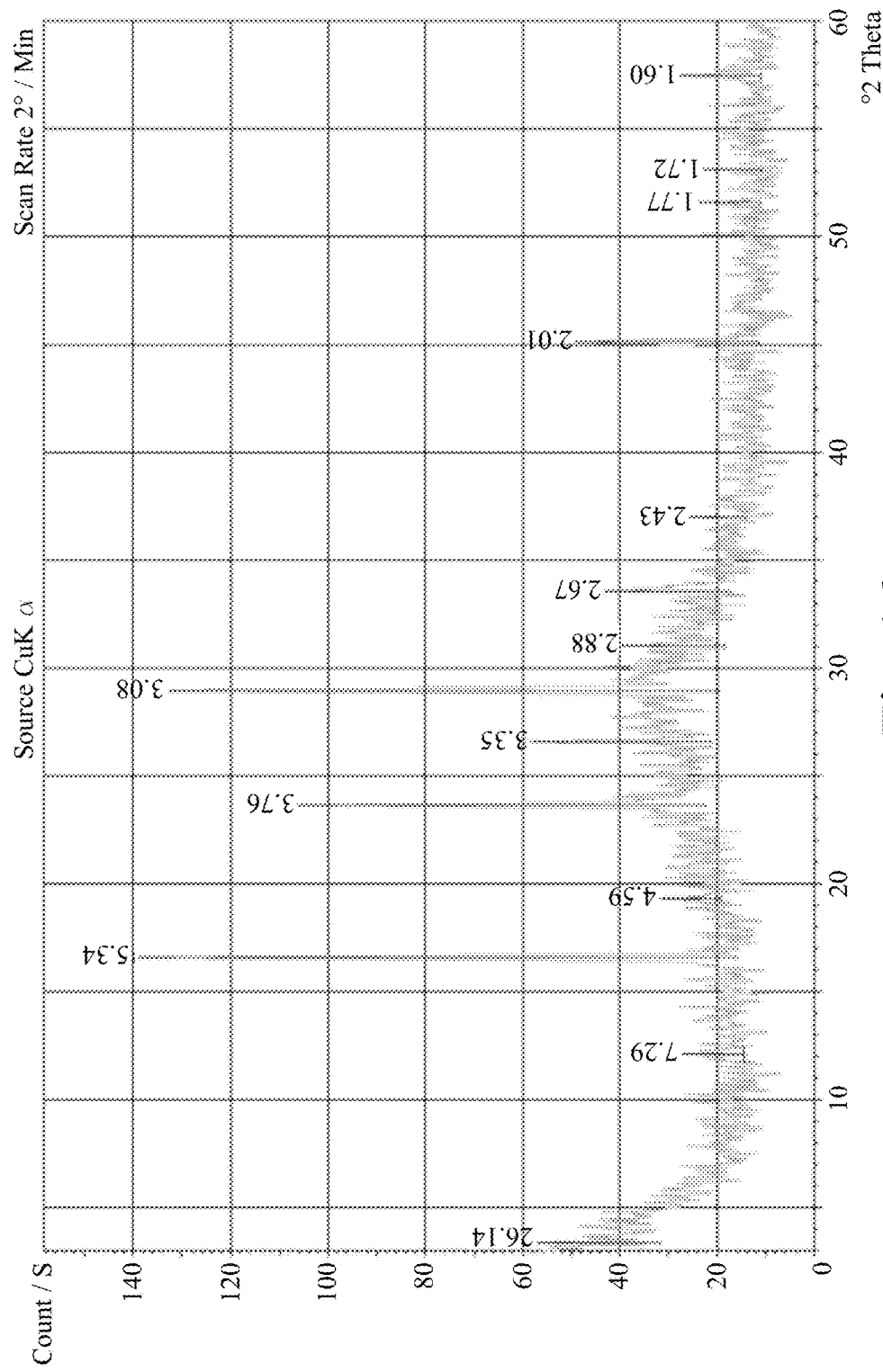
FIG. 16 shows the x-ray diffraction diagram for micronutrient polyphosphate material prepared in Example 19.

The product included 3.55 weight percent zinc, 6.75 weight percent iron, 3.4 weight percent manganese, 7 weight percent nitrogen and 18.35 weight percent phosphorus. The ratio of the equivalents of (Zn+Fe+Mn) to equivalents of phosphorus for this product was 0.35. The pH of this product was 4.7. In 2 weight percent citric acid the product released 100% of total zinc, 87% of total iron and 98% of total manganese in 60 minutes. In 0.005 M DTPA, the product released 90% of zinc, 81% of iron and 98% of manganese in 120 minutes. With respect to solubility in 0.1N HCl, more than 95% of Zn, iron and manganese were dissolved by 2 weight percent citric acid in 60 minutes and by 0.005 M DTPA in 120 minutes. The solubility of the product in water was 5.9% of total Zn 0.06% of total iron and 12% of total manganese. Infrared (IR) spectrum gave absorptions at 3246.4, 2377.5, 1656.6, 1448.9, 1287.3, 1087.8, 547.6 cm$^{-1}$. The x-ray diffraction diagram for the product appears in FIG. 16 and a list of the reflections appears in Table 1.

Example 20

Zinc-Iron-Manganese-Copper Fertilizer (Lab Scale) Using Hematite

Zn:Fe:Mn:Cu Molar Ratio 1:0.4:0.2:0.09:3.55

The fertilizer of this example was produced from phosphoric acid, zinc oxide, iron ore fines (hematite), manganese carbonate, copper carbonate and ammonium hydroxide. The total amount of phosphoric acid was 1.9 moles phosphorus for every mole of zinc, 1.9 moles phosphorus for every mole of manganese and 2.85 moles phosphorus for every mole of iron and 1.9 moles phosphorus for every mole of copper. Accordingly, the total amount of phosphoric acid was [1.9\*(mole zinc+mole manganese+mole copper)]+[2.85\*mole iron]. This amount was less than the stoichiometric requirement for the complete conversion of cations to the dihydrogen orthophosphates.

99 grams of phosphoric acid (58.5% P$_2$O$_5$) and 10.8 grams of hematite (46.3% Fe) were placed into a beaker, which was placed in an oil bath and heated for 30 minutes with constant stirring until the liquid temperature reached 120° C. Then 20 milliliters of water was added and heating was continued till the liquid temperature reached 120° C. The process was repeated once more till substantially all of the hematite was completely dissolved in 45 minutes and the liquid temperature reached 120° C., then 19 grams of zinc oxide (80% Zn) was added to it and heating was continued for 10 minutes until the liquid temperature reached 130° C. Then heating was stopped and 5.23 grams manganese carbonate (47.8% Mn) and 50 milliliters of water were added with stirring. Heating was continued for 30 minutes till the temperature of the liquid reached 115° C. Then heating was stopped and 2.3 grams copper hydroxide carbonate (54% Cu) and 20 milliliters of water were added with stirring. Heating was continued for 15 minutes till the temperature of the liquid reached 90° C. At this stage, it was then taken out of the heating unit and when the liquid temperature dropped to 70° C., 100 milliliters of water were added with stirring. Then 120 milliliters of 12% ammonium hydroxide was added. This was mixed well in a blender and dried in a tray drier at 80° C. The dried material was powdered in a pulverizer to 100 mesh.

Figure 17:
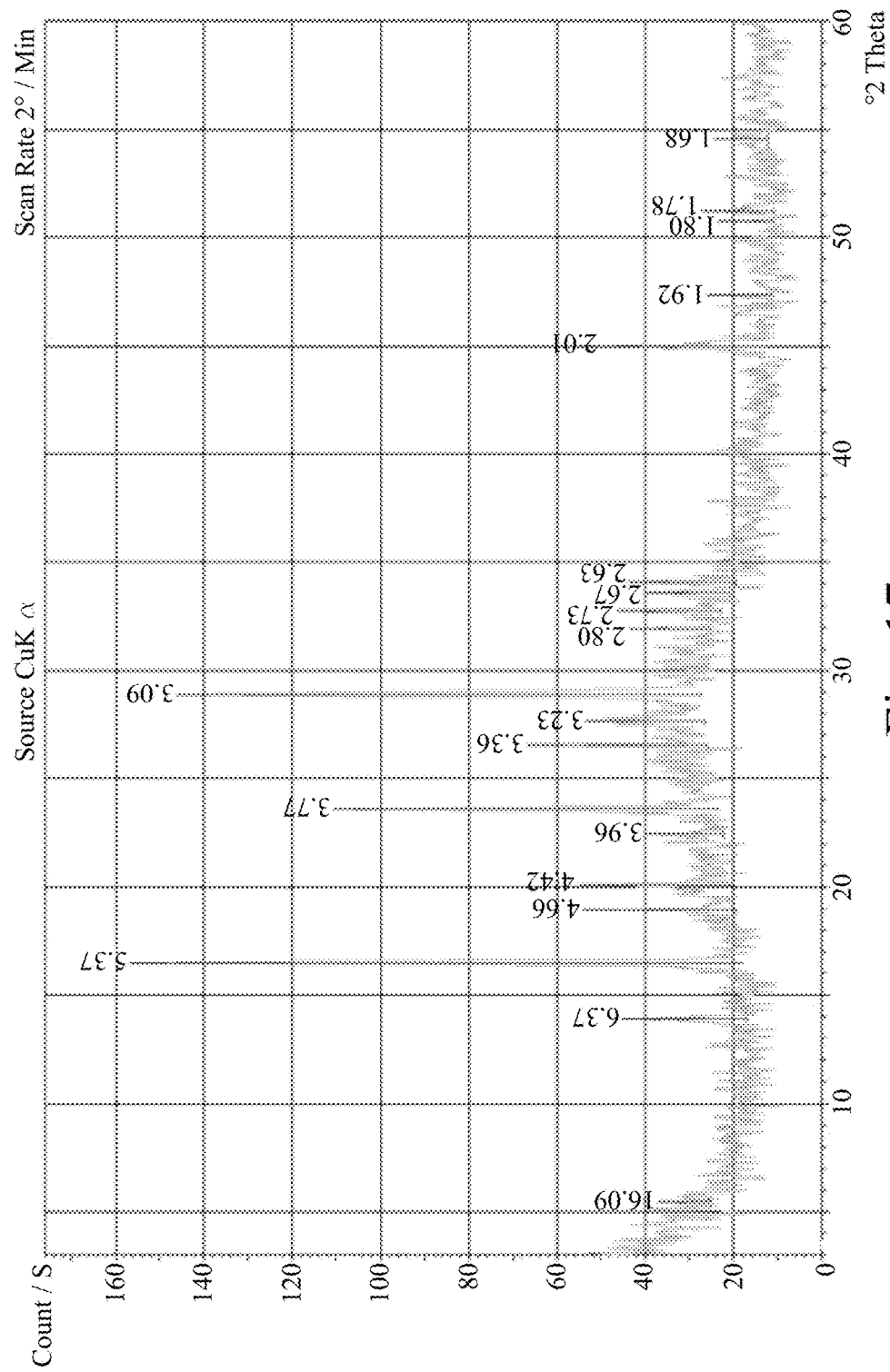
FIG. 17 shows the x-ray diffraction diagram for micronutrient polyphosphate material prepared in Example 20.

The product included 11 weight percent zinc, 3.7 weight percent iron, 1.9 weight percent manganese, 0.9 weight percent copper, 10.6 weight percent nitrogen and 18.5 weight percent phosphorus. The ratio of the equivalents of (Zn+Fe+Mn+Cu) to equivalents of phosphorus for this product was 0.351. The pH of this product was 4.3. In 2 weight percent citric acid the product released 100% of zinc, 95% of iron, 99% of manganese and 100% of total copper in 60 minutes. In 0.005 M DTPA the product released more than 95% of total zinc, iron, manganese and copper in 120 minutes. The solubility of the product in water was 0.07% of total Zn, 4.4% of total iron, 0.3% of total manganese and non-detectable amounts of total copper. Infrared (IR) spectrum gave absorptions at 3253.3, 2372.5, 1656, 1447.6, 1285, 1063.3, 548.8, 423.5 cm$^{-1}$. The x-ray diffraction diagram for the product appears in FIG. 17 and a list of the reflections appears in Table 1.

Example 21

Iron Fertilizer (Lab Scale) Using Red Oxide of Iron (Hematite)

Fe:P=1:3

The fertilizer of this example was produced from phosphoric acid, iron ore fines and magnesium oxide. The total amount of phosphoric acid was 3 moles phosphorus for every mole of iron. Accordingly, the total amount of phosphoric acid was [3\*mole iron]. This amount was the stoichiometric requirement for the complete conversion of iron to the dihydrogen orthophosphates.

65 grams of phosphoric acid (58.5% P$_2$O$_5$) and 21.6 grams of hematite (46.3% Fe) were placed into a beaker, which was placed in an oil bath and heated for 30 minutes with constant stirring until the liquid temperature reached 120° C. Then 20 milliliters of water was added and heating was continued till the liquid temperature reached 120° C. The process was repeated once more till substantially all of the hematite was completely dissolved (as visually observed by the absence of red coloration when a drop of the liquid was added to 25 milliliters of 2% citric acid and stirred; a yellow color solution is produced when hematite has reacted completely). A total heating period of 70 minutes was required. When the hematite was observed to be dissolved, and the liquid temperature reached 130° C., then heating was stopped. It was then taken out of the heating unit and when the liquid temperature dropped to 90° C., 20 milliliters of water were added with stirring. Then 15 grams of magnesium oxide was added. This was mixed well in a blender and dried in a tray drier at 70° C. The dried material was powdered in a pulveriser to 150 mesh.

Figure 18:
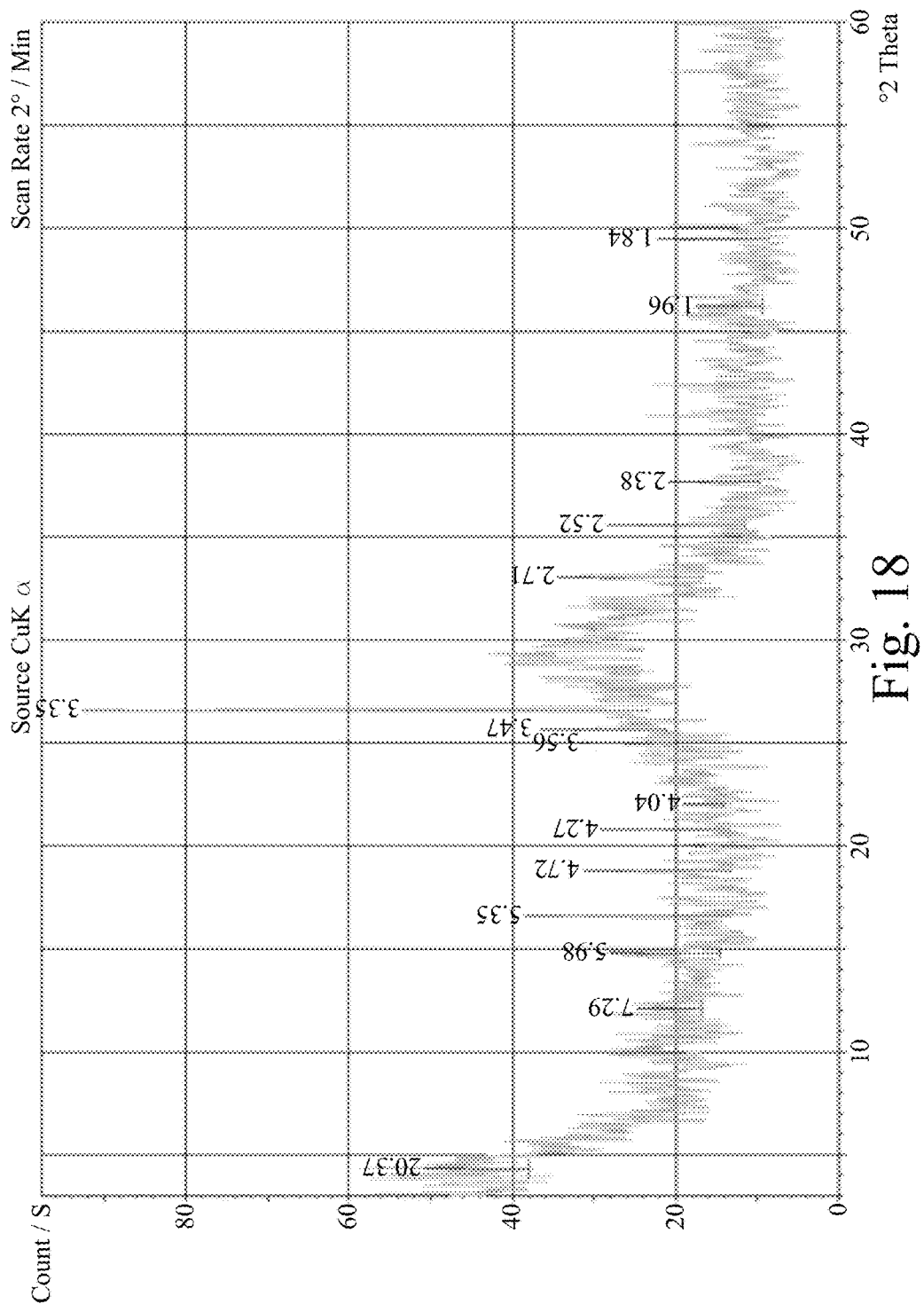
FIG. 18 shows the x-ray diffraction diagram for micronutrient polyphosphate material prepared in Example 21.

The product included 10.1 weight percent iron, 12.6 weight percent magnesium, and 16.8 weight percent phosphorus. The ratio of the equivalents of iron to equivalents of phosphorus for this product was 0.333. In 2 weight percent citric acid the product released 85% of total iron in 60 minutes. With respect to 0.1N HCl, the amount of iron released was 90%. In 0.005 M DTPA the product released 78% of total iron in 120 minutes. The solubility of the product in water was 0.05% of total iron. Infrared (IR) spectrum gave absorptions at 3432.2, 2373, 1652.8, 1071.8, 536 cm$^{-1}$. The x-ray diffraction diagram for the product appears in FIG. 18 and a list of the reflections appears in Table 1.

Example 22

Manganese Fertilizer (Lab Scale) Using Manganous Carbonate

Mn:P=1:1.9

The fertilizer of this example was produced from phosphoric acid, manganese carbonate and magnesium oxide. The total amount of phosphoric acid was 1.9 moles phosphorus for every mole of manganese. Accordingly, the total amount of phosphoric acid was [1.9\*mole manganese]. This amount was less than the stoichiometric requirement for the complete conversion of manganese to the dihydrogen orthophosphates.

42.7 grams of phosphoric acid (58.5% $P_2O_5$) was placed into a beaker and 21 grams of manganese carbonate (47.8% Mn) was added to it. This was placed in an oil bath and heated for 10 minutes with constant stirring until the liquid temperature reached 104° C. It was then taken out of the heating unit and 40 milliliters of water were added with stirring. Then 10 grams of magnesium oxide was added. This was mixed well in a blender and dried in a tray drier at 80° C. The dried material was powdered in a pulveriser to 150 mesh.

Figure 19:
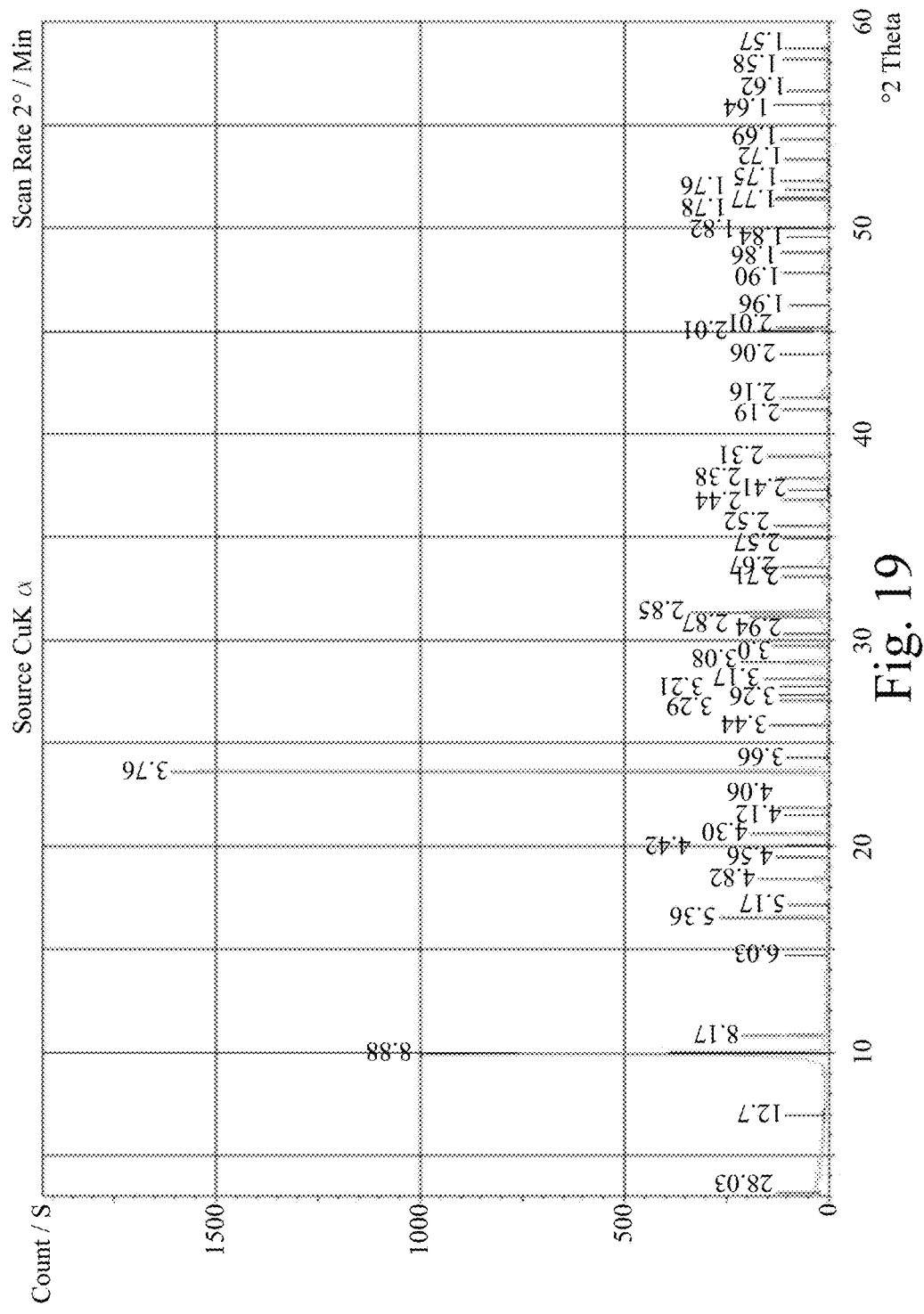
FIG. 19 shows the x-ray diffraction diagram for micronutrient polyphosphate material prepared in Example 22.

The product contained 14.7 weight percent manganese, 8.8 weight percent magnesium, and 15.8 weight percent phosphorus. The ratio of the equivalents of manganese to equivalents of phosphorus for this product was 0.351. The pH of this fertilizer was 5.7. In 2 weight percent citric acid, the product released 98% of total manganese in 60 minutes. In 0.005 M DTPA, the product released 100% of manganese in 60 minutes. The solubility of the product in water was 2.9% of total manganese. The x-ray diffraction diagram for the product appears in FIG. 19 and a list of the reflections appears in Table 1.

Example 23

Manganese Fertilizer (Lab Scale) Using Manganous Oxide

Mn:P=1:1.9

The fertilizer of this example was produced from phosphoric acid, manganous oxide and magnesium oxide. The total amount of phosphoric acid was 1.9 moles phosphorus for every mole of manganese. Accordingly, the total amount of phosphoric acid was [1.9*mole manganese]. This amount was less than the stoichiometric requirement for the complete conversion of manganese to the dihydrogen orthophosphates.

42 grams of phosphoric acid (58.5% $P_2O_5$) was placed into a beaker, 16.7 grams of manganous oxide (60% Mn) and 20 milliliters of water was added. This was placed in an oil bath and heated for 20 minutes with constant stirring until the liquid temperature reached 120° C. It was then taken out of the heating unit and 30 milliliters of water was added with stirring. Then 55 milliliters of ammonia solution (12% $NH_3$) was added. This was mixed well in a blender and dried in a tray drier at 80° C. The dried material was powdered in a pulveriser to 150 mesh.

The properties of this fertilizer were similar to the fertilizer of Example 22.

Example 24

Iron-Manganese Fertilizer Using Red Oxide of Iron (Hematite) and $MnCO_3$

Fe:Mn:P Molar Ratio 1:0.51:3.8

The fertilizer of this example was produced from phosphoric acid, iron ore fines (hematite), manganese carbonate, and ammonium hydroxide. The total amount of phosphoric acid was 1.9 moles phosphorus for every mole of manganese and 2.85 moles phosphorus for every mole of iron. Accordingly, the total amount of phosphoric acid was [1.9*(mole manganese)]+[2.85*mole iron]. This amount was less than the stoichiometric requirement for the complete conversion of cations to the dihydrogen orthophosphates.

82 grams of phosphoric acid (58.5% $P_2O_5$) and 21.6 grams of hematite (46.3% Fe) were placed into a beaker, which was placed in an oil bath and heated for 30 minutes with constant stirring until the liquid temperature reached 120° C. Then 20 milliliters of water was added and heating was continued till the liquid temperature reached 120° C. Then 20 milliliters of water was added again and heating was continued till the liquid temperature reached 120° C. Then heating was stopped and 10.46 grams manganese carbonate (47.8% Mn) and 50 milliliters of water were added with stirring. Heating was continued for 30 minutes till the temperature of the liquid reached 115° C. At this stage, it was then taken out of the heating unit and when the liquid temperature dropped to 90° C., 100 milliliters of water were added with stirring. Then 16 grams of magnesium oxide (60% Mg) was added. This was mixed well in a blender and dried in a tray drier at 70° C. The dried material was powdered in a pulveriser to 150 mesh.

Figure 20:
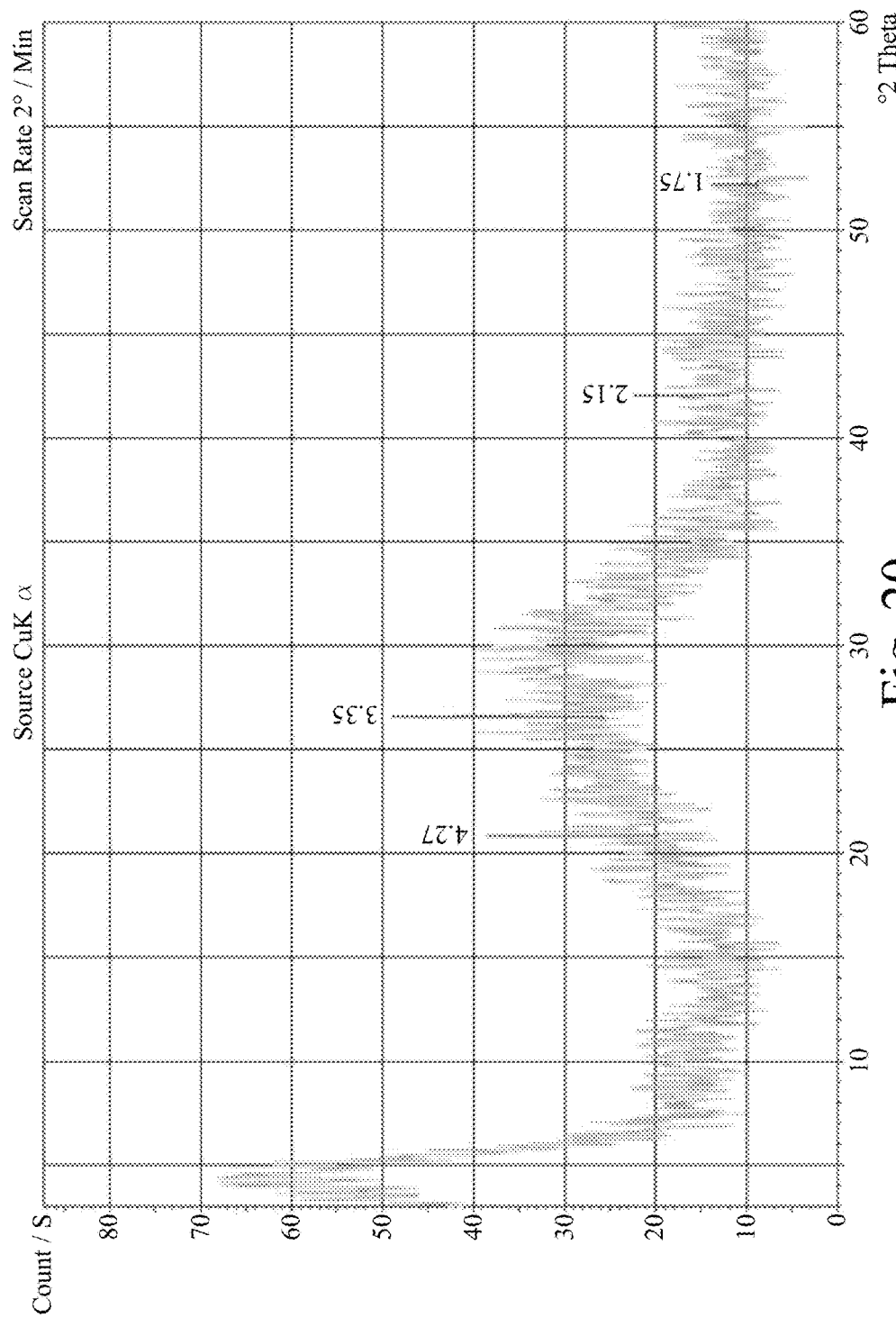
FIG. 20 shows the x-ray diffraction diagram for micronutrient polyphosphate material prepared in Example 24.

The product included 8 weight percent iron, 3.8 weight percent manganese, 8.2 weight percent magnesium and 17.1 weight percent phosphorus. The ratio of the equivalents of (Fe+Mn) to equivalents of phosphorus for this product was 0.351. Number average chain length of the product was 6.83. In 2 weight percent citric acid, the product released 82% of total iron and 88% of manganese in 60 minutes. In 2 weight percent citric acid in 60 minutes the product released 90% of iron and 98% of manganese with respect to the amount dissolved by 0.1N HCl. In 0.005 M DTPA, the product released 89% of iron and 95% of manganese in 180 minutes. The solubility of the product in water was 0.17% of total iron and 1.23% of manganese. The x-ray diffraction diagram for the product appears in FIG. 20 and a list of the reflections appears in Table 1.

Example 25

Iron-Mn Fertilizer Using Red Oxide of Iron (Hematite) and Manganous Oxide Fe:Fe:Mn:P Molar Ratio 1:0.51:3.8

The fertilizer of this example was produced as in Example 24 except that 8.3 grams of manganous oxide (60% Mn) was used instead of manganese carbonate.

Example 26

Fe—Mn—Cu Fertilizer Using Red Oxide of Iron and Manganous Carbonate

Fe:Mn:Cu:P Weight Ratio=1:0.51:0.22:4.23

The fertilizer of this example was produced from phosphoric acid, iron ore fines (hematite), manganese carbonate, copper hydroxide carbonate and ammonium hydroxide. The total amount of phosphoric acid was 1.9 moles phosphorus for every mole of manganese and 2.85 moles phosphorus for every mole of iron and 1.9 moles phosphorus for every mole of copper. Accordingly, the total amount of phosphoric acid was [1.9*(mole manganese+mole copper)]+[2.85*mole iron]. This amount was less than the stoichiometric requirement for the complete conversion of cations to the dihydrogen orthophosphates.

92 grams of phosphoric acid (58.5% $P_2O_5$) and 21.6 grams of hematite (46.3% Fe) were placed into a beaker, which was placed in an oil bath and heated for 40 minutes with constant stirring until the liquid temperature reached 120° C. Then 20 milliliters of water was added and heating was continued for 20 minutes till the liquid temperature reached 120° C. 20 milliliters of water was added again and heating was continued for 20 minutes till the liquid temperature reached 120° C. When the hematite was observed to be dissolved, (as visually observed by the absence of red coloration when a drop of the liquid was added to 25 milliliters of 2% citric acid and stirred; a yellow color solution is produced when hematite has reacted completely) then heating was stopped and 10.46 grams manganese carbonate (47.8% Mn) and 50 milliliters of water were added with stirring. Heating was continued for 30 minutes till the temperature of the liquid reached 115° C. Then heating was stopped again and 4.6 grams copper hydroxide carbonate (54% Cu) and 20 milliliters of water were added with stirring. Heating was continued for 15 minutes till the temperature of the liquid reached 90° C. At this stage, it was then taken out of the heating unit and when the liquid temperature dropped to 70° C., 100 milliliters of water were added with stirring. Then 100 milliliters of 12% ammonium hydroxide was added. This was mixed well in a blender and dried in a tray drier at 80° C. The dried material was powdered in a pulveriser to 150 mesh.

Figure 21:
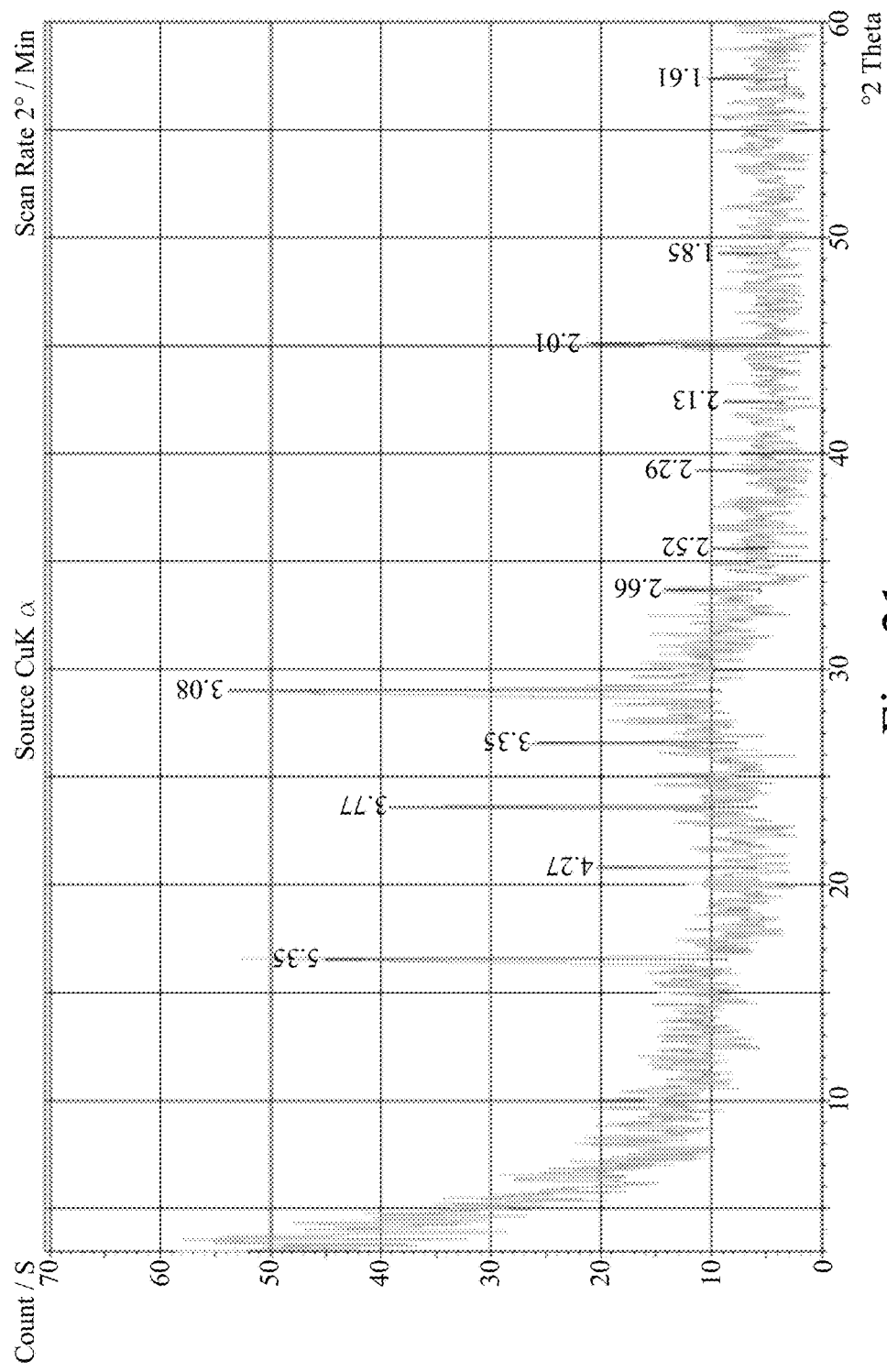
FIG. 21 shows the x-ray diffraction diagram for micronutrient polyphosphate material prepared in Example 26.

The product included 7.5 weight percent iron, 3.7 weight percent manganese, 1.85 weight percent copper, 7.4 weight percent nitrogen and 17.15 weight percent phosphorus. The ratio of the equivalents of (Fe+Mn+Cu) to equivalents of phosphorus for this product was 0.351. The pH of this product was 4.8. In 2 weight percent citric acid the product released 87% of total iron and 98% of total manganese and 95% of total copper in 60 minutes. With respect to the amount dissolved in 0.1N HCl, at least 90% of Fe, Mn and Cu was solubilized in 2 weight percent citric acid. In 0.005 M DTPA the product released 84% of total iron and 93% of total manganese and 95% of total copper in 60 minutes. The solubility of the product in water was 0.12% of total iron, 11% of total manganese and 0.9% of total copper. Infrared (IR) spectrum gave absorptions at 3245.3, 2373.7, 1655.8, 1447.6, 1083.6, 545.2 $cm^{-1}$. The x-ray diffraction diagram for the product appears in FIG. 21 and a list of the reflections appears in Table 1.

Example 27

Copper-Cobalt Fertilizer

Cu:Co:P=1:0.027:1.9

The fertilizer of this example was produced from phosphoric acid, copper hydroxide carbonate and magnesium oxide. The total amount of phosphoric acid was 1.9 moles phosphorus for every mole of copper and 0 moles phosphorus for every mole of cobalt. Accordingly, the total amount of phosphoric acid was [1.9*(mole copper)]. This amount was less than the stoichiometric requirement for the complete conversion of cations to the dihydrogen orthophosphates.

74 grams of phosphoric acid (58.5% $P_2O_5$) was placed into a beaker and 0.7 grams of cobaltic oxide (71% Co) was added with stirring. Then 37 grams of copper hydroxide carbonate was added with stirring. The beaker was placed in an oil bath and heated for 75 minutes with constant stirring until the liquid temperature reached 105° C. It was then taken out of the heating unit and 50 milliliters of water were added with stirring. Then 13 grams of magnesium oxide was added. This was mixed well in a blender and dried in a tray drier at 80° C. The dried material was powdered in a pulveriser to 150 mesh. It was sky blue in color.

Figure 22:
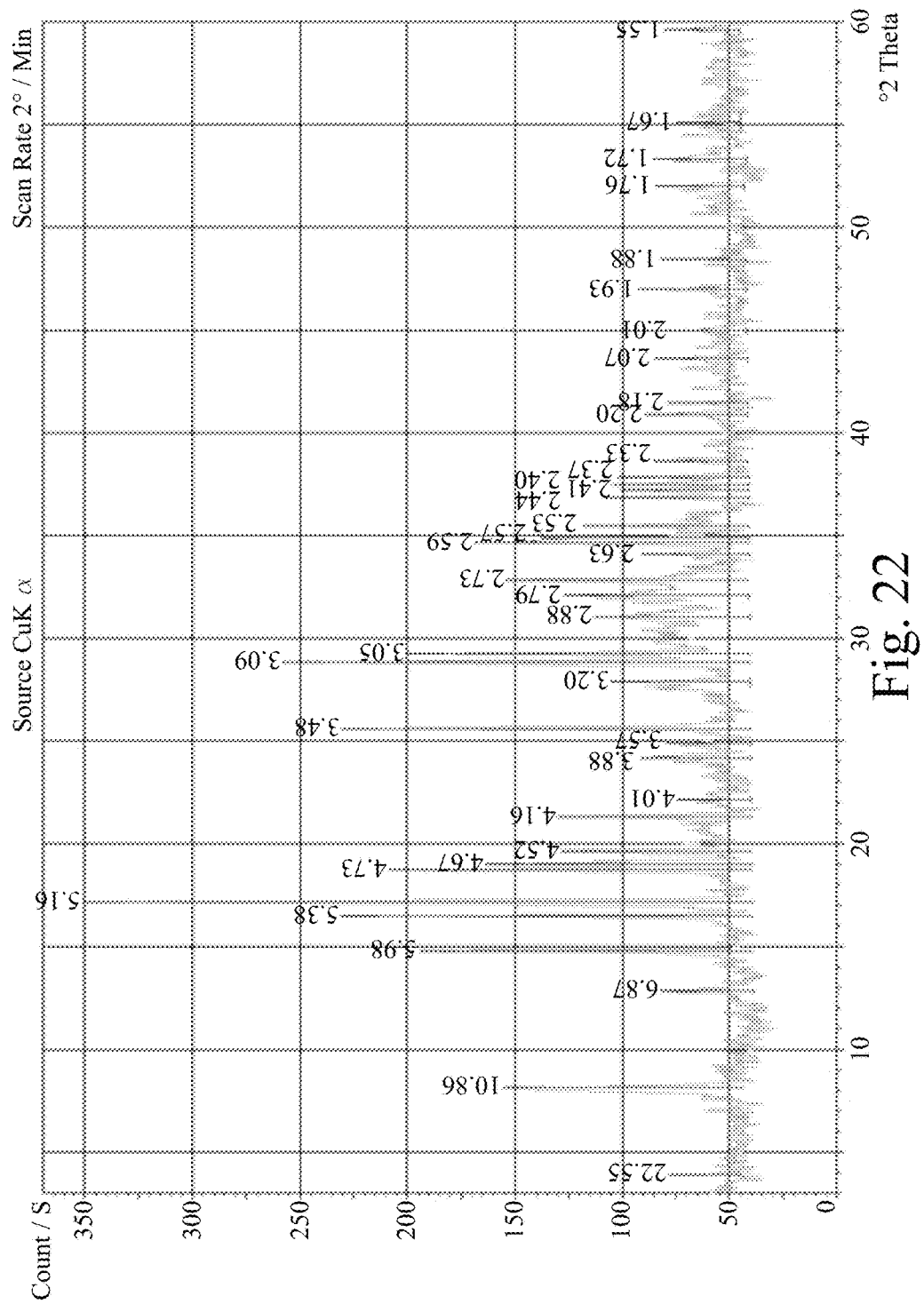
FIG. 22 shows the x-ray diffraction diagram for micronutrient polyphosphate material prepared in Example 27.

The product included 18.1 weight percent copper, 0.45 weight percent cobalt and 17.2 weight percent phosphorus. The ratio of the equivalents of (Cu) to equivalents of phosphorus for this product was 0.356. In 2 weight percent citric acid the product released 100% of copper and 100% of cobalt within 5 minutes. In 0.005M DTPA the product released 100% of copper and 100% of cobalt within 30 minutes. The x-ray diffraction diagram for the product appears in FIG. 22 and a list of the reflections appears in Table 1.

Example 28

Zinc-Iodine Fertilizer

Zn:I:P Molar Ratio 1:0.05:1.75

The Fertilizer of this Example was Produced from Phosphoric acid, zinc oxide and potassium iodate. Commercial grade phosphoric acid (58.5% $P_2O_5$), 65 grams, was placed in a borosilicate beaker. It was heated in an oil bath for 20 minutes until the temperature of the acid reached 120° C. Then 25 grams of commercial grade zinc oxide (80% Zn) was added to it with continuous stirring of the mixture. Heating and stirring were continued for 5 minutes until the temperature of the liquid was 130° C. Then 10 milliliters water was added and it was heated for 20 minutes till liquid temperature reached 125° C. Then 3.3 grams potassium iodate (59.3% I) dissolved in 20 milliliters of water was added to the liquid with stirring. Further heating was done for 30 minutes until the temperature of the liquid reached 160° C. The beaker was then taken out of the heating unit; there were a few white particles in the liquid, which was otherwise nearly transparent. When the liquid temperature cooled to 100° C., 100 milliliters of water was added to it with stirring. Then 12 grams of magnesium oxide was added whereupon a white suspension was formed. This was mixed well in a blender and dried in a tray drier at 80° C. The dried material was powdered in a pulverizer to pass through 150 mesh.

Example 29

Process with Alternative Raw Materials

The fertilizers could also be produced using sulfate or chloride salts. The process would be essentially the same as with oxides. A first difference would be that the amount of ammonia required for neutralization increases in proportion to the amount of sulfate (2 moles of ammonia required for each mole of sulfate). A second difference would be the introduction of ammonium sulfate into the system, and removal of ammonium sulfate by washing.

Example 30

Process with Anionic Micronutrients

The anions selenium or iodine could be included in the fertilizers. To include selenium, selenium dioxide or the selenite salts could be added to the reaction at the initial or the final stage. To include iodine, the iodide salt could be added after the final stage of heating or the iodate salt may be added at the initial stage of heating.

Example 31

Process with Chromium

Chromium may be required in very small amounts. To distribute this over a large area of soil, the chromium content of the fertilizer should preferably be low. This could be achieved by producing the fertilizer with phosphoric acid, chromate salt and magnesium, calcium, sodium or potassium carbonate or hydroxide. The alkali/alkaline earth metal cations would form the major percentage of cations and chromium constitutes only a small percentage (less than about 3 weight percent). The reaction stages would be similar to those described above. Alternately, a desired amount of chromate salt could be added during the process of production of any of the micronutrient fertilizers.

Example 32

Process with Manganese

The process would be similar to that described in the examples for zinc fertilizer. Phosphoric acid and manganese carbonate would be reacted at molar ratios of Mn:P<1:2. After a period of heating, when the reaction liquid reaches a temperature of from about 100° C. to about 140° C., water would be added and heating would be continued until the appropriate stage of polymerization is reached. The product would be mixed with water and neutralized. It would be subsequently dried and ground.

Example 33

Process with Copper

The process would also be similar to that described in the examples for zinc fertilizer. Phosphoric acid and copper carbonate would be reacted at molar ratios of Cu:P<1:2. After a period of heating, when the reaction liquid reaches a temperature of from about 100° C. to about 140° C., water would be added and heating would be continued until the appropriate stage of polymerization is reached. The product would be mixed with water and neutralized. It would be subsequently dried and ground.

Example 34

Process with Cobalt

Cobalt may be utilized in very small amounts. To distribute cobalt over a large area of soil, the cobalt content of the fertilizer should preferably be low. This could be achieved by producing the fertilizer with phosphoric acid, cobalt oxide and magnesium, calcium, sodium or potassium carbonate or hydroxide. The alkali/alkaline earth metal cations would form the major percentage of cations and cobalt constitute only a small percentage (less than about one weight percent). The reaction stages would be similar to those described above. Alternately, a desired amount of cobalt oxide could be added during the process of production of any of the micronutrient fertilizers.

Example 35

Iron-Manganese Fertilizer Using Yellow Oxide of Iron (Goethite) and $MnCO_3$

Fe:Mn:P Molar Ratio 1:0.51:3.88

The fertilizer of this example was produced from phosphoric acid, yellow oxide of iron (goethite), manganese carbonate, and ammonium hydroxide. The total amount of phosphoric acid was 1.9 moles phosphorus for every mole of manganese and 2.85 moles phosphorus for every mole of iron. Accordingly, the total amount of phosphoric acid was [1.9*(mole manganese)]+[2.85*mole iron]. This amount was less than the stoichiometric requirement for the complete conversion of cations to the dihydrogen orthophosphates.

84 grams of phosphoric acid (58.5% $P_2O_5$) and 16 grams of goethite (62.2% Fe) were placed into a beaker, which was placed in an oil bath and heated for 14 minutes with constant stirring until the liquid temperature reached 134° C. Then heating was stopped and 10.46 grams manganese carbonate (47.8% Mn) and 30 milliliters of water were added with stirring. Heating was continued for 12 minutes till the temperature of the liquid reached 115° C. At this stage, it was then taken out of the heating unit and when the liquid temperature dropped to 90° C., 100 milliliters of water were added with stirring. Then 14 grams of magnesium oxide (60% Mg) was added. This was mixed well in a blender and dried in a tray drier at 60° C. The dried material was powdered in a pulveriser to 150 mesh.

The product included 8 weight percent iron, 3.84 weight percent manganese, 8.2 weight percent magnesium and 17.1 weight percent phosphorus. The ratio of the equivalents of (Fe+Mn) to equivalents of phosphorus for this product was 0.351. Number average chain length of the product was 6.9. In 2 weight percent citric acid, the product released 89% of total iron and 93% of manganese in 60 minutes. In 2 weight percent citric acid in 60 minutes, the product released 92% of total iron and 95% of total manganese with respect to the amount dissolved by 0.1N HCl. In 0.005 M DTPA, the product released 95% of iron and 98% of manganese in 180 minutes.

Having described the invention in detail, it will be apparent that modifications and variations are possible without departing the scope of the invention defined in the appended claims. Furthermore, it should be appreciated that all examples in the present disclosure are provided as non-limiting examples.

TABLE 1

| | | | | | | | | X-RAY diffraction reflections (Å) | | | | | | | | |
|---|---|---|---|---|---|---|---|---|---|---|---|---|---|---|---|---|
| Example 11 | Example 12 | Example 13 | Example 15 | Example 14 | Example 17 | Example 16 | Example 26 | Example 19 | Example 20 | Example 24 | Example 5 | Example 10 | Example 9 | Example 21 | Example 22 | Example 27 |
| 10.769 | 9.230 | 8.560 | 8.640 | 15.590 | 8.520 | 11.290 | 5.350 | 7.290 | 6.370 | 4.270 | 9.331 | 5.943 | 8.940 | 7.290 | 12.700 | 10.860 |
| 9.102 | 7.280 | 7.600 | 8.720 | 8.720 | 7.570 | 10.320 | 4.270 | 5.340 | 5.370 | 3.350 | 5.944 | 5.348 | 5.924 | 5.980 | 8.880 | 6.870 |
| 5.917 | 6.880 | 6.820 | 6.890 | 7.740 | 4.500 | 9.020 | 3.770 | 4.590 | 4.680 | 2.150 | 5.348 | 4.721 | 5.334 | 5.350 | 8.170 | 5.980 |
| 5.327 | 6.350 | 4.960 | 4.980 | 6.910 | 4.230 | 5.930 | 3.350 | 3.760 | 4.420 | 1.750 | 5.091 | 4.608 | 4.708 | 4.720 | 6.030 | 5.380 |
| 5.067 | 5.990 | 4.530 | 4.560 | 4.570 | 3.380 | 5.360 | 3.080 | 3.350 | 3.960 | | 4.935 | 4.494 | 4.486 | 4.270 | 5.360 | 5.160 |
| 4.920 | 5.650 | 4.420 | 4.450 | 4.200 | 3.110 | 5.070 | 2.660 | 3.080 | 3.770 | | 4.722 | 4.148 | 4.132 | 4.040 | 5.170 | 4.730 |
| 4.834 | 5.330 | 4.240 | 4.310 | 3.740 | 3.050 | 4.730 | 2.520 | 2.880 | 3.360 | | 4.604 | 3.654 | 3.960 | 3.560 | 4.820 | 4.670 |
| 4.699 | 5.020 | 4.160 | 4.190 | 3.430 | 2.950 | 4.610 | 2.290 | 2.670 | 3.230 | | 4.499 | 3.576 | 3.670 | 3.470 | 4.560 | 4.520 |
| 4.571 | 4.640 | 3.720 | 3.740 | 3.380 | 2.790 | 4.500 | 2.130 | 2.430 | 3.090 | | 4.148 | 3.464 | 3.458 | 3.350 | 4.420 | 4.160 |
| 4.481 | 4.360 | 3.400 | 3.420 | 3.200 | 2.090 | 4.140 | 2.010 | 2.010 | 2.800 | | 3.901 | 3.194 | 3.081 | 2.710 | 4.300 | 4.010 |
| 4.400 | 4.080 | 3.360 | 3.370 | 2.820 | 1.790 | 3.920 | 1.850 | 1.770 | 2.730 | | 3.657 | 3.087 | 3.040 | 2.520 | 4.120 | 3.880 |
| 4.136 | 3.990 | 3.210 | 3.220 | 2.600 | | 3.680 | 1.610 | 1.720 | 2.670 | | 3.575 | 3.043 | 2.844 | 2.380 | 4.060 | 3.570 |
| 3.991 | 3.750 | 3.160 | 3.180 | 2.500 | | 3.570 | | 1.600 | 2.630 | | 3.468 | 2.817 | 2.791 | 1.960 | 3.760 | 3.480 |
| 3.877 | 3.700 | 3.120 | 3.120 | 2.430 | | 3.460 | | | 2.010 | | 3.393 | 2.794 | 2.718 | 1.840 | 3.660 | 3.200 |
| 3.797 | 3.580 | 3.110 | 3.020 | 2.330 | | 3.080 | | | 1.920 | | 3.192 | 2.723 | 2.581 | | 3.440 | 3.090 |
| 3.640 | 3.490 | 3.050 | 2.970 | 2.270 | | 3.040 | | | 1.800 | | 3.087 | 2.586 | 2.383 | | 3.290 | 3.050 |
| 3.569 | 3.330 | 3.010 | 2.820 | 2.000 | | 2.850 | | | 1.780 | | 3.044 | 2.527 | 2.197 | | 3.260 | 2.880 |
| 3.456 | 3.250 | 2.960 | 2.790 | 1.910 | | 2.790 | | | 1.680 | | 2.917 | 2.410 | 2.065 | | 3.210 | 2.790 |
| 3.381 | 3.180 | 2.930 | 2.720 | 1.820 | | 2.720 | | | | | 2.852 | 2.371 | 1.927 | | 3.170 | 2.730 |
| 3.179 | 3.080 | 2.860 | 2.600 | 1.670 | | 2.700 | | | | | 2.800 | 2.207 | 1.720 | | 3.000 | 2.630 |
| 3.126 | 2.990 | 2.800 | 2.550 | 1.620 | | 2.580 | | | | | 2.725 | 2.178 | 1.680 | | 2.940 | 2.590 |
| 3.079 | 2.880 | 2.780 | 2.480 | | | 2.520 | | | | | 2.635 | 2.142 | | | 2.870 | 2.570 |
| 3.035 | 2.770 | 2.630 | 2.430 | | | 2.390 | | | | | 2.585 | 2.047 | | | 2.850 | 2.530 |
| 2.959 | 2.740 | 2.600 | 2.330 | | | 2.370 | | | | | 2.528 | 1.985 | | | 2.710 | 2.440 |
| 2.911 | 2.710 | 2.590 | 2.270 | | | 2.200 | | | | | 2.410 | 1.934 | | | 2.670 | 2.410 |
| 2.849 | 2.670 | 2.550 | 2.090 | | | 2.050 | | | | | 2.371 | 1.883 | | | 2.570 | 2.400 |
| 2.786 | 2.620 | 2.520 | 1.990 | | | 1.930 | | | | | 2.300 | 1.802 | | | 2.520 | 2.370 |
| 2.718 | 2.560 | 2.480 | 1.910 | | | 1.840 | | | | | 2.201 | 1.759 | | | 2.440 | 2.330 |
| 2.643 | 2.520 | 2.420 | 1.850 | | | 1.800 | | | | | 2.179 | 1.721 | | | 2.410 | 2.200 |
| 2.609 | 2.460 | 2.380 | 1.830 | | | 1.760 | | | | | 2.140 | 1.684 | | | 2.380 | 2.180 |
| 2.580 | 2.440 | 2.320 | 1.820 | | | 1.600 | | | | | 2.094 | 1.668 | | | 2.310 | 2.070 |
| 2.540 | 2.370 | 2.290 | 1.720 | | | | | | | | 2.074 | 1.641 | | | 2.190 | 2.010 |
| 2.511 | 2.300 | 2.260 | 1.680 | | | | | | | | 2.045 | 1.567 | | | 2.160 | 1.930 |
| 2.425 | 2.280 | 2.210 | 1.660 | | | | | | | | 1.983 | | | | 2.060 | 1.880 |
| 2.366 | 2.240 | 2.170 | 1.620 | | | | | | | | 1.934 | | | | 2.010 | 1.760 |
| 2.338 | 2.120 | 2.150 | 1.610 | | | | | | | | 1.876 | | | | 1.960 | 1.720 |
| 2.291 | 2.010 | 2.080 | 1.590 | | | | | | | | 1.831 | | | | 1.900 | 1.670 |
| 2.269 | 1.970 | 2.010 | | | | | | | | | 1.798 | | | | 1.860 | 1.550 |
| | 1.920 | 1.990 | | | | | | | | | | | | | | |

TABLE 1-continued

X-RAY diffraction reflections (Å)

| Example 11 | Example 12 | Example 13 | Example 15 | Example 14 | Example 17 | Example 16 | Example 26 | Example 19 | Example 20 | Example 24 | Example 5 | Example 10 | Example 9 | Example 21 | Example 22 | Example 27 |
|---|---|---|---|---|---|---|---|---|---|---|---|---|---|---|---|---|
| 2.201 | 1.880 | 1.910 | | | | | | | | | 1.760 | | | | 1.840 | |
| 2.099 | 1.870 | 1.890 | | | | | | | | | 1.722 | | | | 1.820 | |
| 2.071 | 1.810 | 1.880 | | | | | | | | | 1.684 | | | | 1.780 | |
| 2.041 | 1.780 | 1.850 | | | | | | | | | 1.659 | | | | 1.760 | |
| 1.999 | 1.750 | 1.810 | | | | | | | | | 1.642 | | | | 1.750 | |
| 1.940 | 1.720 | 1.720 | | | | | | | | | 1.600 | | | | 1.720 | |
| 1.871 | 1.680 | 1.680 | | | | | | | | | 1.565 | | | | 1.690 | |
| 1.823 | 1.660 | 1.660 | | | | | | | | | | | | | 1.640 | |
| 1.797 | 1.640 | 1.610 | | | | | | | | | | | | | 1.620 | |
| 1.731 | 1.630 | 1.580 | | | | | | | | | | | | | 1.580 | |
| 1.696 | 1.620 | 1.550 | | | | | | | | | | | | | 1.570 | |
| 1.668 | 1.600 | | | | | | | | | | | | | | | |
| 1.638 | 1.580 | | | | | | | | | | | | | | | |
| 1.615 | 1.560 | | | | | | | | | | | | | | | |
| 1.594 | | | | | | | | | | | | | | | | |

What is claimed is:

1. A method of producing a fertilizer comprising:
   a. preheating phosphoric acid to a temperature between about 60° C. and about 140° C.;
   b. combining at least one reactive metal compound with the pre-heated phosphoric acid to form a first mixture;
   c. heating the first mixture to a temperature between about 100° C. and about 160° C.; and
   d. discontinuing the step of heating the first mixture to between about 100° C. and about 160° C. when the first mixture is soluble in 2 wt. % citric acid;
   wherein the at least one reactive metal compound comprises zinc, and the molar ratio of phosphorus to zinc is less than about 2:1.

2. The method of producing a fertilizer of claim 1, wherein the at least one reactive metal compound comprises zinc oxide.

3. A method of producing a fertilizer comprising:
   a. preheating phosphoric acid to a temperature between about 60° C. and about 140° C.;
   b. combining at least one lesser reactive metal compound with the pre-heated phosphoric acid to form a first mixture;
   c. heating the first mixture to a temperature between about 100° C. and about 160° C.;
   d. combining at least one higher reactive metal compound with the first mixture to form a second mixture;
   e. heating the second mixture to between about 100° C. and about 140° C.; and
   f. discontinuing the step of heating the second mixture to between about 100° C. and about 140° C. when the second mixture is soluble in 2 wt. % citric acid;
   wherein the at least one lesser reactive metal compound comprises zinc, and the molar ratio of phosphorus to zinc is less than about 2:1.

4. The method of producing a fertilizer of claim 1, wherein the first mixture is heated to a temperature between about 100° C. and about 140° C.

5. The method of producing a fertilizer of claim 3, wherein the method further comprises mixing the second mixture with a neutralizing base selected from the group consisting of magnesium oxides, magnesium carbonates, calcium oxides, calcium carbonates, ammonium hydroxides, ammonium carbonates, and combinations thereof.

6. The method of producing a fertilizer of claim 1, wherein the molar ratio of phosphorus to zinc is about 1.7:1.

7. The method of producing a fertilizer of claim 1, wherein the at least one reactive metal compound further comprises iron, and the molar ratio of phosphorus to iron is less than about 3:1.

8. The method of producing a fertilizer of claim 1, wherein the at least one reactive metal compound further comprises ferric iron, and the molar ratio of phosphorus to ferric iron is about 2.85:1.

9. The method of producing a fertilizer of claim 1, wherein step (a) comprises preheating phosphoric acid, sulfuric acid, and water to a temperature between about 60° C. and about 140° C.

10. The method of producing a fertilizer of claim 1, wherein step (b) comprises combining the at least one reactive metal compound and water with the pre-heated phosphoric acid to form the first mixture.

11. The method of producing a fertilizer of claim 1, wherein the reactive metal compound further comprises iron oxide, manganese oxide, copper oxide, chromium oxide, cobalt oxide, or mixtures thereof.

12. The method of producing a fertilizer of claim 3, wherein the at least one higher reactive metal compound is selected from the group consisting of magnesium oxides, carbonates of magnesium, carbonates of copper, carbonates of manganese, carbonates of ferrous iron, and mixtures thereof.

13. The method of producing a fertilizer of claim 3, wherein a sufficient amount of neutralizing base is added to bring the pH of the second mixture to between about 3 and about 7.

14. The method of producing a fertilizer of claim 3, wherein the second mixture is dried, neutralized, and ground to a powder having an average particle size of less than about 100 mesh.

15. The method of producing a fertilizer of claim 3, wherein step (a) comprises preheating phosphoric acid, sulfuric acid, and water to a temperature between about 60° C. and about 140° C.

16. The method of producing a fertilizer of claim 3, wherein step (b) comprises combining the at least one lesser reactive metal compound and water with the pre-heated phosphoric acid to form the first mixture.

17. The method of producing a fertilizer of claim 3, wherein step (d) comprises combining the at least one higher reactive metal compound and at least one secondary micronutrient with the first mixture to form the second mixture.

18. The method of producing a fertilizer of claim 3, wherein step (d) comprises combining the at least one higher reactive metal compound, at least one secondary micronutrient, and water with the first mixture to form the second mixture.

19. The method of producing a fertilizer of claim 3, wherein the lesser reactive metal compound further comprises iron oxide, manganese oxide, copper oxide, chromium oxide, cobalt oxide, or mixtures thereof.

20. The method of producing a fertilizer of claim 3, wherein the at least one lesser reactive metal compound comprises zinc oxide.

21. The method of producing a fertilizer of claim 3, wherein the first mixture is heated to a temperature between about 100° C. and about 140° C.

22. The method of producing a fertilizer of claim 3, wherein the molar ratio of phosphorus to zinc is about 1.7:1.

23. The method of producing a fertilizer of claim 3, wherein the at least one lesser reactive metal compound further comprises iron, and the molar ratio of phosphorus to iron is less than about 3:1.

24. The method of producing a fertilizer of claim 3, wherein the at least one lesser reactive metal compound further comprises ferric iron, and the molar ratio of phosphorus to ferric iron is about 2.85:1.

25. The method of producing a fertilizer of claim 3, wherein a sufficient amount of neutralizing base is added to bring the pH of the second mixture to between about 4 and about 4.5.

* * * * *